(12) United States Patent
Zhang et al.

(10) Patent No.: US 12,069,239 B2
(45) Date of Patent: Aug. 20, 2024

(54) SUB-BLOCK BASED MOTION CANDIDATE SELECTION AND SIGNALING

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/321,802

(22) Filed: May 17, 2021

(65) Prior Publication Data

US 2021/0274188 A1    Sep. 2, 2021

Related U.S. Application Data

(63) Continuation of application No. PCT/CN2019/120314, filed on Nov. 22, 2019.

(30) Foreign Application Priority Data

Nov. 22, 2018  (WO) ................ PCT/CN2018/116889
Dec. 29, 2018  (WO) ................ PCT/CN2018/125420
(Continued)

(51) Int. Cl.
H04N 19/159   (2014.01)
H04N 19/105   (2014.01)
(Continued)

(52) U.S. Cl.
CPC ......... *H04N 19/105* (2014.11); *H04N 19/139* (2014.11); *H04N 19/159* (2014.11);
(Continued)

(58) Field of Classification Search
CPC .. H04N 19/105; H04N 19/139; H04N 19/159; H04N 19/17; H04N 19/176; H04N 19/189; H04N 19/46; H04N 19/52
See application file for complete search history.

(56) References Cited

U.S. PATENT DOCUMENTS 9,215,470 B2   12/2015   Karczewicz et al.
9,596,448 B2   3/2017    Thirumalai et al.
(Continued)

FOREIGN PATENT DOCUMENTS

CN    1843037 A      10/2006
CN    101877785 A    11/2010
(Continued)

OTHER PUBLICATIONS

Blasi et al. "Non-CE4: CIIP Using Triangular Partitions," Joint Video Experts Team (JVET) of ITU-T SG 16 WP 3 and ISO/IEC JTV 1/SC 29/WG 11, 15th Meeting: Gothenburg, SE, Jul. 3-12, 2019, document JVET-O0522, 2019.
(Continued)

*Primary Examiner* — Dave Czekaj
*Assistant Examiner* — Berteau Joisil
(74) *Attorney, Agent, or Firm* — Perkins Coie LLP

(57) ABSTRACT

Devices, systems and methods for digital video coding, which include sub-block based inter prediction methods, are described. An exemplary method for video processing includes determining, for a conversion between a current block of video and a bitstream representation of the video, a maximum number of candidates in a sub-block based merge candidate list and/or whether to add sub-block based
(Continued)

temporal motion vector prediction (SbTMVP) candidates to the sub-block based merge candidate list based on whether temporal motion vector prediction (TMVP) is enabled for use during the conversion or whether a current picture referencing (CPR) coding mode is used for the conversion, and performing, based on the determining, the conversion.

13 Claims, 42 Drawing Sheets

(30) Foreign Application Priority Data

| Aug. 13, 2019 | (WO) | ................ | PCT/CN2019/100396 |
| Sep. 22, 2019 | (WO) | ................ | PCT/CN2019/107159 |

(51) Int. Cl.
*H04N 19/139* (2014.01)
*H04N 19/17* (2014.01)
*H04N 19/176* (2014.01)
*H04N 19/189* (2014.01)
*H04N 19/46* (2014.01)
*H04N 19/52* (2014.01)

(52) U.S. Cl.
CPC ........... *H04N 19/17* (2014.11); *H04N 19/176* (2014.11); *H04N 19/189* (2014.11); *H04N 19/46* (2014.11); *H04N 19/52* (2014.11)

(56) References Cited

U.S. PATENT DOCUMENTS

| 9,628,795 | B2 | 4/2017 | Zhang et al. |
| 9,756,336 | B2 | 9/2017 | Zhang et al. |
| 9,906,813 | B2 | 2/2018 | Zhang et al. |
| 9,955,186 | B2 | 4/2018 | Chon et al. |
| 10,165,252 | B2 | 12/2018 | An et al. |
| 10,230,980 | B2 | 3/2019 | Liu et al. |
| 10,244,253 | B2 | 3/2019 | Chen et al. |
| 10,271,048 | B2 | 4/2019 | Zhang et al. |
| 10,271,064 | B2 | 4/2019 | Chien et al. |
| 10,334,281 | B2 | 6/2019 | Zhang et al. |
| 10,390,044 | B2 | 8/2019 | Karczewicz et al. |
| 10,587,859 | B2 | 3/2020 | An et al. |
| 10,609,423 | B2 | 3/2020 | Chuang et al. |
| 10,708,591 | B2 | 7/2020 | Zhang et al. |
| 10,742,972 | B1 | 8/2020 | Li et al. |
| 10,771,811 | B2 | 9/2020 | Liu et al. |
| 10,778,997 | B2 | 9/2020 | Zhang et al. |
| 10,812,806 | B2 | 10/2020 | Zhang et al. |
| 11,140,386 | B2 | 10/2021 | Zhang et al. |
| 11,431,964 | B2 | 8/2022 | Zhang et al. |
| 11,632,541 | B2 | 4/2023 | Zhang et al. |
| 11,671,587 | B2 | 6/2023 | Zhang et al. |
| 11,695,946 | B2 | 7/2023 | Zhang et al. |
| 2008/0175439 | A1 | 7/2008 | Kurata |
| 2010/0150231 | A1 | 6/2010 | Huang et al. |
| 2012/0039386 | A1 | 2/2012 | Srinivasamurthy et al. |
| 2012/0257678 | A1 | 10/2012 | Zhou et al. |
| 2012/0300839 | A1 | 11/2012 | Sze et al. |
| 2013/0148737 | A1 | 6/2013 | Tourapis et al. |
| 2013/0182755 | A1 | 7/2013 | Chen et al. |
| 2013/0208804 | A1 | 8/2013 | Lin et al. |
| 2013/0215968 | A1 | 8/2013 | Jeong et al. |
| 2013/0243093 | A1 | 9/2013 | Chen et al. |
| 2013/0336407 | A1 | 12/2013 | Chen et al. |
| 2014/0133580 | A1 | 5/2014 | Chang et al. |
| 2014/0328398 | A1 | 11/2014 | Chen et al. |
| 2014/0362902 | A1 | 12/2014 | Seregin et al. |
| 2015/0156501 | A1 | 6/2015 | Hannuksela |
| 2015/0271487 | A1 | 9/2015 | Li et al. |
| 2015/0326876 | A1 | 11/2015 | Tsai et al. |
| 2015/0373343 | A1 | 12/2015 | Hendry et al. |
| 2016/0050430 | A1 | 2/2016 | Xiu et al. |
| 2016/0057420 | A1 | 2/2016 | Pang et al. |
| 2016/0057444 | A1 | 2/2016 | Gisquet et al. |
| 2016/0100189 | A1 | 4/2016 | Pang et al. |
| 2016/0105670 | A1 | 4/2016 | Pang et al. |
| 2016/0191931 | A1 | 6/2016 | Hannuksela |
| 2016/0219278 | A1 | 7/2016 | Chen et al. |
| 2016/0227214 | A1 | 8/2016 | Rapaka et al. |
| 2016/0234492 | A1 | 8/2016 | Li et al. |
| 2016/0286232 | A1 | 9/2016 | Li et al. |
| 2016/0337662 | A1 | 11/2016 | Pang et al. |
| 2017/0214932 | A1 | 7/2017 | Huang |
| 2017/0238005 | A1 | 8/2017 | Chien et al. |
| 2017/0289569 | A1 | 10/2017 | Park et al. |
| 2017/0295370 | A1 | 10/2017 | Xu et al. |
| 2017/0302951 | A1 | 10/2017 | Joshi et al. |
| 2017/0310961 | A1 | 10/2017 | Liu et al. |
| 2017/0332095 | A1 | 11/2017 | Zou et al. |
| 2017/0332099 | A1 | 11/2017 | Lee et al. |
| 2017/0353718 | A1 | 12/2017 | Rodriguez et al. |
| 2018/0041769 | A1 | 2/2018 | Chuang et al. |
| 2018/0084260 | A1 | 3/2018 | Chien et al. |
| 2018/0098087 | A1 | 4/2018 | Li et al. |
| 2018/0124398 | A1 | 5/2018 | Park et al. |
| 2018/0192069 | A1* | 7/2018 | Chen ................... H04N 19/176 |
| 2018/0192072 | A1 | 7/2018 | Chen et al. |
| 2018/0199057 | A1 | 7/2018 | Chuang et al. |
| 2018/0242012 | A1 | 8/2018 | Chiu et al. |
| 2018/0255316 | A1 | 9/2018 | Zhang et al. |
| 2018/0270500 | A1 | 9/2018 | Li et al. |
| 2018/0288410 | A1 | 10/2018 | Park et al. |
| 2018/0310017 | A1 | 10/2018 | Chen et al. |
| 2018/0332284 | A1 | 11/2018 | Liu et al. |
| 2018/0352223 | A1 | 12/2018 | Chen et al. |
| 2018/0359483 | A1 | 12/2018 | Chen et al. |
| 2019/0158870 | A1* | 5/2019 | Xu ....................... H04N 19/176 |
| 2019/0182491 | A1 | 6/2019 | Lee |
| 2019/0182502 | A1 | 6/2019 | Xu et al. |
| 2019/0191171 | A1 | 6/2019 | Ikai |
| 2019/0191180 | A1 | 6/2019 | An et al. |
| 2019/0222865 | A1 | 7/2019 | Zhang et al. |
| 2019/0246103 | A1 | 8/2019 | Jun et al. |
| 2019/0306502 | A1 | 10/2019 | Gadde et al. |
| 2019/0356922 | A1 | 11/2019 | Park et al. |
| 2020/0007889 | A1 | 1/2020 | Chao et al. |
| 2020/0036980 | A1 | 1/2020 | Huang et al. |
| 2020/0036997 | A1* | 1/2020 | Li ....................... H04N 19/436 |
| 2020/0045306 | A1 | 2/2020 | Lee |
| 2020/0045307 | A1 | 2/2020 | Jang |
| 2020/0045308 | A1 | 2/2020 | Panusopone et al. |
| 2020/0045336 | A1 | 2/2020 | Xiu et al. |
| 2020/0112738 | A1 | 4/2020 | Lee |
| 2020/0213622 | A1 | 7/2020 | Xu et al. |
| 2020/0221097 | A1 | 7/2020 | Laroche et al. |
| 2020/0221122 | A1 | 7/2020 | Ye et al. |
| 2020/0236362 | A1 | 7/2020 | Lee et al. |
| 2020/0244968 | A1 | 7/2020 | Jun et al. |
| 2020/0260071 | A1 | 8/2020 | Hannuksela et al. |
| 2020/0267408 | A1 | 8/2020 | Lee et al. |
| 2020/0267418 | A1 | 8/2020 | Chuang et al. |
| 2020/0275094 | A1* | 8/2020 | Lee ....................... H04N 19/176 |
| 2020/0280735 | A1 | 9/2020 | Lim et al. |
| 2020/0336738 | A1 | 10/2020 | Xiu et al. |
| 2020/0366888 | A1 | 11/2020 | Seregin et al. |
| 2020/0374543 | A1 | 11/2020 | Liu et al. |
| 2021/0006790 | A1 | 1/2021 | Zhang et al. |
| 2021/0006803 | A1 | 1/2021 | Zhang et al. |
| 2021/0029356 | A1 | 1/2021 | Zhang et al. |
| 2021/0029366 | A1 | 1/2021 | Zhang et al. |
| 2021/0029368 | A1 | 1/2021 | Zhang et al. |
| 2021/0029372 | A1 | 1/2021 | Zhang et al. |
| 2021/0051348 | A1 | 2/2021 | Zhang et al. |
| 2021/0051349 | A1 | 2/2021 | Zhang et al. |
| 2021/0058618 | A1 | 2/2021 | Zhang et al. |
| 2021/0058637 | A1 | 2/2021 | Zhang et al. |
| 2021/0058647 | A1 | 2/2021 | Zhang et al. |
| 2021/0076029 | A1 | 3/2021 | Han et al. |
| 2021/0076050 | A1 | 3/2021 | Zhang et al. |
| 2021/0092378 | A1 | 3/2021 | Zhang et al. |

(56) References Cited

U.S. PATENT DOCUMENTS

| | | | |
|---|---|---|---|
| 2021/0092416 | A1 | 3/2021 | Choi et al. |
| 2021/0092431 | A1 | 3/2021 | Zhang et al. |
| 2021/0092436 | A1 | 3/2021 | Zhang et al. |
| 2021/0112248 | A1 | 4/2021 | Zhang et al. |
| 2021/0120243 | A1 | 4/2021 | Zhang et al. |
| 2021/0152816 | A1 | 5/2021 | Zhang et al. |
| 2021/0160531 | A1 | 5/2021 | Zhang et al. |
| 2021/0185338 | A1 | 6/2021 | Xiu et al. |
| 2021/0185346 | A1 | 6/2021 | Zhang et al. |
| 2021/0235079 | A1 | 7/2021 | Chuang et al. |
| 2021/0258601 | A1 | 8/2021 | Kim |
| 2021/0377521 | A1 | 12/2021 | Zhang et al. |
| 2022/0109868 | A1 | 4/2022 | Zhang et al. |
| 2022/0217382 | A1 | 7/2022 | Zhang et al. |

FOREIGN PATENT DOCUMENTS

| | | | | |
|---|---|---|---|---|
| CN | 102223526 | A | 10/2011 | |
| CN | 103621090 | A | 3/2014 | |
| CN | 103891290 | A | 6/2014 | |
| CN | 104170381 | A | 11/2014 | |
| CN | 104604223 | A | 5/2015 | |
| CN | 104768015 | A | 7/2015 | |
| CN | 105075259 | A | 11/2015 | |
| CN | 105493505 | A | 4/2016 | |
| CN | 105976395 | A | 9/2016 | |
| CN | 106576171 | A | 4/2017 | |
| CN | 107079157 | A | 8/2017 | |
| CN | 107105232 | A | 8/2017 | |
| CN | 107534778 | A | 1/2018 | |
| CN | 107852506 | A | 3/2018 | |
| CN | 108347616 | A | 7/2018 | |
| CN | 108353166 | A | 7/2018 | |
| CN | 108353184 | A | 7/2018 | |
| CN | 108370441 | A | 8/2018 | |
| CN | 108432250 | A | 8/2018 | |
| CN | 108462873 | A | 8/2018 | |
| CN | 108605137 | A | 9/2018 | |
| CN | 108683922 | A | 10/2018 | |
| CN | 108781289 | A | 11/2018 | |
| CN | 109076236 | A | 12/2018 | |
| GB | 201815443 | | 11/2018 | |
| GB | 201815564 | | 11/2018 | |
| JP | 2017528984 | A | 9/2017 | |
| JP | 2020017970 | A | 1/2020 | |
| JP | 2022511637 | A | 2/2022 | |
| TW | 201742465 | A | 12/2017 | |
| WO | 2012119776 | A1 | 9/2012 | |
| WO | 2014107853 | A1 | 7/2014 | |
| WO | 2014166109 | A1 | 10/2014 | |
| WO | 2015109598 | A1 | 7/2015 | |
| WO | 2016050219 | A1 | 4/2016 | |
| WO | 2016056587 | A1 | 4/2016 | |
| WO | 2016119104 | A1 | 8/2016 | |
| WO | 2016123081 | A1 | 8/2016 | |
| WO | 2016165069 | A1 | 10/2016 | |
| WO | 2017057953 | A1 | 4/2017 | |
| WO | 2017118409 | A1 | 7/2017 | |
| WO | 2017131900 | A1 | 8/2017 | |
| WO | 2017147765 | A1 | 9/2017 | |
| WO | 2017171107 | A1 | 10/2017 | |
| WO | 2017195608 | A1 | 11/2017 | |
| WO | 2017209328 | A1 | 12/2017 | |
| WO | 2018030773 | A1 | 2/2018 | |
| WO | 2018066867 | A1 | 4/2018 | |
| WO | 2018099269 | A1 | 6/2018 | |
| WO | 2018129539 | A1 | 7/2018 | |
| WO | 2018177418 | A1 | 10/2018 | |
| WO | 2018192574 | A1 | 10/2018 | |
| WO | 2019073112 | A1 | 4/2019 | |
| WO | 2020001578 | A1 | 1/2020 | |
| WO | WO-2020077003 | A1 * | 4/2020 | .......... H04N 19/105 |
| WO | 2020088324 | A1 | 5/2020 | |

OTHER PUBLICATIONS

Bross et al. "Versatile Video Coding (Draft 3)," Joint Video Experts Team (JVET) of ITU-T SG 16 WP 3 and ISO/IEC ITC 1/SC 29/WG 11, 12th Meeting, Macao, CN, Oct. 3-12, 2018, document JVET-L1001, 2018.
Bross et al. "Versatile Video Coding (Draft 6)," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O2001, 2019.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chen et al.CE4: Affine Merge Enhancement with Simplification (Test 4.2.2), Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0368, 2018.
Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.
Chen et al. "Algorithm Description for Versatile Video Coding and Test Model 3 (VTM 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1002, 2018.
Choi et al. "AHG8: Signaling and Filtering for Reference Picture Resampling," Joint Video Experts Team (JVET) of ITU-T SG16 WP 3 and ISO/IEC JTC 1/SC 29/WG 11, 15th Meeting, Gothenburg, SE Jul. 3-12, 2019, document JVET-O0332, 2019.
JEM-7.0: https://jvet.hhi.fraunhofer.de/svn/svn_HMJEMSoftware/tags/ HM-16.6-JEM-7.0.(only website).
https://vcgit.hhi.fraunhofer.de/jvet/VVCSoftware_VTM/tags/VTM-3.0rc1.
Han et al. "CE4.1.3: Affine Motion Compensation Prediction," Joint Video Exploration Team (JVET) of ITU-T SG 16 WP 3 and ISO/IEC JTC 1/SC 29/WG 11, 11th meeting, Ljubljana, SI, Jul. 10-18, 2018, document JVET-K0337, 2018.
Hannuksela et al. "AHG12: Sub-Picture-based Picture Partitioning and Decoding," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0046, 2019.
He et al. "AHG8: On Adaptive Resolution Change Contraint," Joint Video Experts Team (JVET) of ITU-T SG 16 WP 3 and ISO/IEC JTC 1/SC 29/WG 11, 15th Meeting, Gothenburg, SE, SE Jul. 3-12, 2019, document JVET-O0184, 2019.
Hong et al. "AHG8: Support for Reference Picture Resampling—Handling of Picture Size Signalling, Conformance Windows, and DPB Management," Joint Video Experts Team (JVET) of ITU-T SG 16 WP 3 and ISO/IEC JTC 1/SC 29/ WG 11, 15th Meeting, Gothemburg, SE, Jul. 3-12, 2019, document JVET-O0133, 2019.
Huang et al. "CE4.2.5: Simplification of Affine Merge List Construction and Move ATMVP to Affine Merge List," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0278, 2018.
"Information Technology—High Efficiency Coding and Media Delivery in Heterogeneous Environments—Part 2: High Efficiency Video Coding" Apr. 20, 2018, ISO/DIS 23008, 4th Edition.
Lee et al. "CE4: Simplification of the Common Base for Affine Merge (Test 4.2.2)," Joint Video Experts Team (JVET) of ITU-T SG 16 WP 3 and ISO/IEC JTC 1/SC 29/WG 11, 12th Meeting, Macau, CN, Oct. 8-12, 2012, document JVET-L0142, 2018.
Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.

(56) References Cited

OTHER PUBLICATIONS

Lin et al. "CE4-Related: Simplification for SbTMVP," Joint Video Experts Team (JVET) of ITU-T SG 16 WP 3 and ISO/IEC JTC 1/SC 29/WG 11, 15th Meeting: Gothenburg, SE, Jul. 3-12, 2019, document JVET-00283, 2019.

Rosewarne C. et al. "High Efficiency Video Coding (HEVC) Test Model 16 (HM16) Improved Encoder Description Update 7," Joint Collaborative Team on Video Coding (JCT-VC) of ITU-T SG.16 WP3 and ISO/IEC JTC1/SC29/WG11, 25th Meeting, Chengdu, CN, Oct. 14-21, 2016, document JCTVC-Y1002, 2016.

Xiu et al. "CE2/4-Related: Unification of MV Rounding," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0335, 2019.

Yang et al. "Description of CE4: Inter Prediction and Motion Vector Coding," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J1024, 2018.

Zhang et al. "CE4-Related: History-based Motion Vector Prediction," Joint Video Experts Team (JVET) of ITU-T SG WP 3 and ISO/IEC JTC 1/SC 29/WG 11, 11th Meeting: Ljubljana, SI, Jul. 10-1, 2018, document JVET-K0104, 2018.

Zhao et al. "Non-CE4: On SbTMVP Base Motion Data Derivation," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0167, 2019.

International Search Report and Written Opinion from International Patent Application No. PCT/CN2019/120301 dated Feb. 18, 2020 (9 pages).

International Search Report and Written Opinion from International Patent Application No. PCT/CN2019/120306 dated Feb. 27, 2020 (10 pages).

International Search Report and Written Opinion from International Patent Application No. PCT/CN2019/120311 dated Feb. 12, 2020 (10 pages).

International Search Report and Written Opinion from International Patent Application No. PCT/CN2019/120314 dated Feb. 26, 2020 (11 pages).

International Search Report and Written Opinion from International Patent Application No. PCT/CN2019/128219 dated Feb. 5, 2020 (13 pages).

International Search Report and Written Opinion from International Patent Application No. PCT/CN2020/108805 dated Oct. 26, 2020 (10 pages).

International Search Report and Written Opinion from International Patent Application No. PCT/CN2020/116701 dated Dec. 2, 2020 (10 pages).

International Search Report and Written Opinion from International Patent Application No. PCT/CN2020/116703 dated Dec. 23, 2020 (12 pages).

International Search Report and Written Opinion from International Patent Application No. PCT/CN2020/116704 dated Dec. 23, 2020 (9 pages).

International Search Report and Written Opinion from International Patent Application No. PCT/CN2020/116705 dated Dec. 21, 2020 (10 pages).

Non Final Office Action from U.S. Appl. No. 17/161,316 dated Mar. 17, 2021.

Non Final Office Action from U.S. Appl. No. 17/161,198 dated Apr. 1, 2021.

Non Final Office Action from U.S. Appl. No. 17/161,106 dated Apr. 8, 2021.

Final Office Action from U.S. Appl. No. 17/161,316 dated Jul. 9, 2021.

Final Office Action from U.S. Appl. No. 17/161,198 dated Aug. 13, 2021.

Bossen, Frank. "VVC VTM reference software (VTM-3.0rc1)—file : source/Lib/DecoderLib/VLCReader.cpp", Nov. 9, 2018 (Nov. 9, 2018), XP055852041, Retrieved from the Internet: URL:https://vcgit.hhi.fraunhofer.de/jvet/VVCSoftware_VTM/-/blob/VTM-3.0rc1/source/Li b/DecoderLib/VLCReader.cpp [retrieved on Oct. 18, 2021] * line 1785-line 1808 * * line 793 *.

Bossen, Frank. "VVC VTM reference software (VTM-3.0rc1)—file : \source\App\EncoderApp\EncAppCfg.cpp", Nov. 9, 2018 (Nov. 9, 2018), XP055852138, Retrieved from the Internet: URL:https://vcgit.hhi.fraunhofer.de/jvet/VVCSoftware_VTM/-/blob/VTM-3.0rc1/source/App/EncoderApp/EncAppCfg.cpp[retrieved on Oct. 18, 2021] * line 818.

Extended European Search Report from European Patent Application No. 19888228.4 dated Oct. 28, 2021.

Bross et al. "Versatile Video Coding (Draft 4)," Joint Video Experts Team (JVET) of ITU-T SG 16 WP 3 and ISO/IEC ITC 1/SC 29/WG 11, 13th Meeting, Marrakech, MA Jan. 9-18, 2019, document JVET-M1001, 2019.

Chen et al. "CE4: Separate List for Sub-Block Merge Candidates (Test 4.2.8)," Joint Video Experts Team (JVET) of ITU-T SG 16 WP 3 and ISO/IEC JTC 1/SC 29/WG 11 12th Meeting: Macao, CN, Oct. 3-12, 2018, Document JVET-L0369, 2018.

Notice of Allowance from U.S. Appl. No. 17/161,198 dated Feb. 25, 2022.

Non Final Office Action from U.S. Appl. No. 17/554,294 dated Mar. 3, 2022.

Final Office Action from U.S. Appl. No. 17/161,316 dated Apr. 4, 2022.

Examination Report from Indian Patent Application No. 202227015841 dated Sep. 7, 2022 (7 pages).

Non Final Office Action from U.S. Appl. No. 17/698,141 dated Oct. 25, 2022.

Lee et al. "Non-CE4: On Sub-Block Merge Candidate List," Joint Video Experts Team (JVET) of ITU-T SG 16 WP 3 and ISO/IEC JTC 1/SC 29/WG 11 15th Meeting, Gothenburg, SE, Jul. 3-12, 2019, document JVET-O0328, 2019.

Marpe et al."Context-Based Adaptive Binary Arithmetic Coding in the H.264/AVC Video Compression Standard," IEEE Transactions on Circuits and Systems for Video Technology, Jul. 2003, 13(7):620-636.

Extended European Search Report from European Patent Application No. 20852949.5 dated Apr. 20, 2023.

Non Final Office Action from U.S. Appl. No. 17/554,294 dated Apr. 11, 2023.

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.

Zhang et al. "CE4.4.11: Combined Average Merge Candidates," Joint Video Experts Team (JVET)of ITU-T SG 16 WP 3 and ISO/IEC JTC 1/SC 29/WG 11 12th Meeting: Macao, CN, Oct. 3-12, 2018, document JVET-L0071, 2018.

Joshi et al. "Screen content Coding Test Model 7 (SCM 7)," Joint Collaborative Team on Video Coding (JCT-VC) of ITU-T SG 16 WP 3 and ISO/IEC JTC 1/SC 29/WG 11 23rd Meeting: San Diego, USA, Feb. 19-26, 2016, document JCTVC-W1014, 2016.

Xu et al. "On Stored Decoded Motion Vector Resolution," Joint Collaborative Team on Video Coding (JCT-VC) of ITU-T SG 16 WP 3 and ISO/IEC JTC 1/SC 29/WG 11 21st Meeting: Warsaw, PL, Jun. 19-26, 2015, document JCTVC-U0107, 2015.

Chen et al. "CE9-Related: Simplification of Cascading DMVR and BDOF Processes," Joint Video Experts Team (JVET) of ITU-T SG 16 WP 3 and ISO/IEC JTC 1/SC 29/WG 11 14th Meeting: Geneva, CH, Mar. 19-27, 2019, JVET-N0097, 2019.

Laroche et al. CE2: On Subblock Merge index coding (Test CE2.2.2), Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0381, 2019. pp. 1-6.

Murakami, "High-efficiency Image Symbolization Technology HEVC/H.265 Application." HEVC/H.265, First Edition, Japan, Aimo Co., Ltd. Feb. 25, 2013, pp 125-136.

"Recommendation ITU-T H.265 (Feb. 2018)" High Efficiency Video Coding, Series H: AudioVisual and Multimedia Systems, Infrastructure of Audiovisual Services—Coding of Moving Video, ITU-T , Feb. 2018 , Pages 46-48, 99, 127.

Notification to Grant Patent Right for Invention from Chinese Patent Application No. 201980076060.2 mailed Mar. 25, 2024.

(56) References Cited

OTHER PUBLICATIONS

Decision to Grant a Patent from Japanese Patent Application No. 2022-508597 mailed Mar. 26, 2024.

* cited by examiner

3300 —

3310 — Performing a conversion between a current block of a video that is coded using a sub-block based temporal motion vector prediction (SbTMVP) tool or a temporal motion vector prediction (TMVP) tool and a bitstream representation of the video, a coordinate of a corresponding position of the current block or a sub-block of the current block being selectively masked using a mask based on a compression of motion vectors associated with the SbTMVP tool or the TMVP tool, and an application of the mask comprising computing a bitwise AND operation between a value of the coordinate and a value of the mask

3610: Inferring, for a current block of a video segment of a video, that a sub-block based temporal motion vector prediction (SbTMVP) tool or a temporal motion vector prediction (TMVP) tool is disabled for the video segment in case that a current picture of the current block is a reference picture with an index set to M in a reference picture list X 3620: Performing, based on the inferring, a conversion between the current block and a bitstream representation of the video

3710 — Determining, for a current block of a video, that an application of an sub-block based temporal motion vector prediction (SbTMVP) tool is enabled in case that a current picture of the current block is a reference picture with an index set to M in a reference picture list X 3720 — Performing, based on the determining, a conversion between the current block and a bitstream representation of the video

3810 Performing a conversion between a current block of a video and a bitstream representation of the video, the current block being coded using a sub-block based coding tool, and wherein performing the conversion comprises using a plurality of bins (N) to code a sub-block merge index with a unified method in case that a sub-block based temporal motion vector prediction (SbTMVP) tool is enabled or disabled

FIG. 38

SUB-BLOCK BASED MOTION CANDIDATE SELECTION AND SIGNALING

CROSS-REFERENCE TO RELATED APPLICATIONS

This application is a continuation of international No. PCT/CN2019/120314, filed on Nov. 22, 2019, which claims the priority to and benefits of International Patent Application No. PCT/CN2018/116889, filed on Nov. 22, 2018, International Patent Application No. PCT/CN2018/125420, filed on Dec. 29, 2018, International Patent Application No. PCT/CN2019/100396, filed on Aug. 13, 2019, and International Patent Application No. PCT/CN2019/107159, filed on Sep. 22, 2019. The entire disclosures of the aforementioned applications are incorporated by reference as part of the disclosure of this application.

TECHNICAL FIELD

This patent document relates to image and video coding and decoding.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, which include sub-block based inter prediction methods, are described. The described methods may be applied to both the existing video coding standards (e.g., High Efficiency Video Coding (HEVC) and/or Versatile Video Coding (VVC)) and future video coding standards or video codecs.

In one representative aspect, the disclosed technology may be used to provide a method for video processing. This method includes determining, for a conversion between a current block of video and a bitstream representation of the video, a maximum number of candidates (ML) in a sub-block based merge candidate list and/or whether to add sub-block based temporal motion vector prediction (SbTMVP) candidates to the sub-block based merge candidate list based on whether temporal motion vector prediction (TMVP) is enabled for use during the conversion or whether a current picture referencing (CPR) coding mode is used for the conversion; and performing, based on the determining, the conversion.

In another representative aspect, the disclosed technology may be used to provide a method for video processing. This method includes determining, for a conversion between a current block of video and a bitstream representation of the video, a maximum number of candidates (ML) in a sub-block based merge candidate list based on whether a temporal motion vector prediction (TMVP), a sub-block based temporal motion vector prediction (SbTMVP), and an affine coding mode are enabled for use during the conversion; and performing, based on the determining, the conversion.

In yet another representative aspect, the disclosed technology may be used to provide a method for video processing. This method includes determining, for a conversion between a current block of a first video segment of a video and a bitstream representation of the video, that a sub-block based motion vector prediction (SbTMVP) mode is disabled for the conversion due to a temporal motion vector prediction (TMVP) mode being disabled at a first video segment level; and performing the conversion based on the determining, wherein the bitstream representation complies with a format that specifies whether an indication of the SbTMVP mode is included and/or a position of the indication of the SbTMVP mode in a merge candidate list, with respect to an indication of the TMVP mode.

In yet another representative aspect, the disclosed technology may be used to provide a method for video processing. This method includes performing a conversion between a current block of a video that is coded using a sub-block based temporal motion vector prediction (SbTMVP) tool or a temporal motion vector prediction (TMVP) tool and a bitstream representation of the video, wherein a coordinate of a corresponding position of the current block or a sub-block of the current block is selectively masked using a mask based on a compression of motion vectors associated with the SbTMVP tool or the TMVP tool, and wherein an application of the mask comprises computing a bitwise AND operation between a value of the coordinate and a value of the mask.

In yet another representative aspect, the disclosed technology may be used to provide a method for video processing. This method includes determining, based on one or more characteristics of a current block of a video segment of a video, a valid corresponding region of the current block for an application of a sub-block based motion vector prediction (SbTMVP) tool on the current block; and performing, based on the determining, a conversion between the current block and a bitstream representation of the video.

In yet another representative aspect, the disclosed technology may be used to provide a method for video processing. This method includes determining, for a current block of a video that is coded using a sub-block based temporal motion vector prediction (SbTMVP) tool, a default motion vector; and performing, based on the determining, a conversion between the current block and a bitstream representation of the video, wherein the default motion vector is determined in case that a motion vector is not obtained from a block covering a corresponding position in the collocated picture that is associated with a center position of the current block.

In yet another representative aspect, the disclosed technology may be used to provide a method for video processing. This method includes inferring, for a current block of a video segment of a video, that a sub-block based temporal motion vector prediction (SbTMVP) tool or a temporal motion vector prediction (TMVP) tool is disabled for the video segment in case that a current picture of the current block is a reference picture with an index set to M in a reference picture list X, wherein M and X are integers, and wherein X=0 or X=1; and performing, based on the inferring, a conversion between the current block and a bitstream representation of the video.

In yet another representative aspect, the disclosed technology may be used to provide a method for video processing. This method includes determining, for a current block of a video, that an application of an sub-block based temporal motion vector prediction (SbTMVP) tool is enabled in case that a current picture of the current block is a reference picture with an index set to M in a reference picture list X, wherein M and X are integers; and performing, based on the determining, a conversion between the current block and a bitstream representation of the video.

In yet another representative aspect, the disclosed technology may be used to provide a method for video processing. This method includes performing a conversion between a current block of a video and a bitstream representation of the video, wherein the current block is coded using a sub-block based coding tool, and wherein performing the conversion comprises using a plurality of bins (N) to code a sub-block merge index with a unified method in case that a sub-block based temporal motion vector prediction (SbTMVP) tool is enabled or disabled.

In yet another representative aspect, the disclosed technology may be used to provide a method for video processing. This method includes determining, for a current block of a video coded using a subblock-based temporal motion vector prediction (SbTMVP) tool, a motion vector used by the SbTMVP tool to locate a corresponding block in a picture different from a current picture comprising the current block; and performing, based on the determining, a conversion between the current block and a bitstream representation of the video.

In yet another representative aspect, the disclosed technology may be used to provide a method for video processing. This method includes determining, for a conversion between a current block of a video and a bitstream representation of the video, whether a zero motion affine merge candidate is inserted into a sub-block merge candidate list based on whether affine prediction is enabled for the conversion of the current block; and performing, based on the determining, the conversion.

In yet another representative aspect, the disclosed technology may be used to provide a method for video processing. This method includes inserting, for a conversion between a current block of a video and a bitstream representation of the video that uses a sub-block merge candidate list, zero motion non-affine padding candidates into the sub-block merge candidate list in case that the sub-block merge candidate list is not fulfilled; and performing, subsequent to the inserting, the conversion.

In yet another representative aspect, the disclosed technology may be used to provide a method for video processing. This method includes determining, for a conversion between a current block of a video and a bitstream representation of the video, motion vectors using a rule that determines that the motion vectors are derived from one or more motion vectors of a block covering a corresponding position in a collocated picture; and performing, based on the motion vectors, the conversion.

In yet another example aspect, a video encoder apparatus is disclosed. The video encoder apparatus includes a processor that is configured to implement a method described herein.

In yet another example aspect, a video decoder apparatus is disclosed. The video decoder apparatus includes a processor that is configured to implement a method described herein.

In yet another aspect, a computer readable medium having code stored thereupon is disclosed. The code, when executed by a processor, causes the processor to implement a method described in the present document.

These, and other, aspects are described in the present document.

BRIEF DESCRIPTION OF THE DRAWINGS

FIGS. 30-42 are flowcharts for examples of method of video processing.

DETAILED DESCRIPTION

Figure 1:
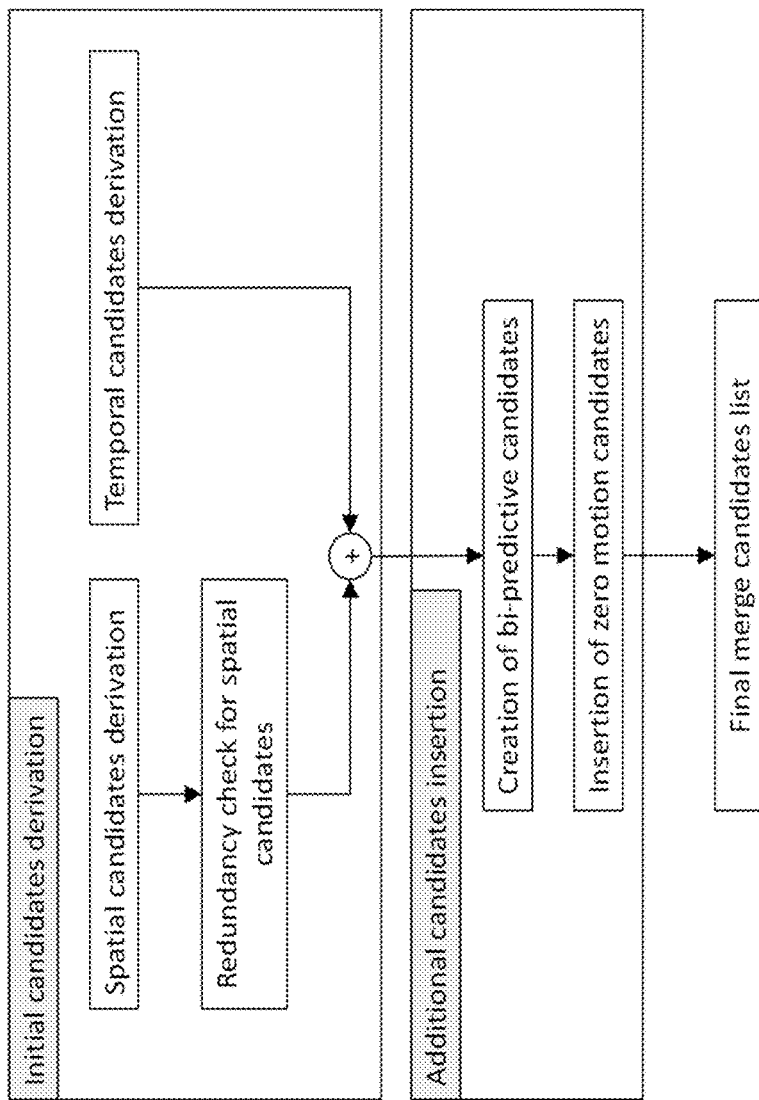
FIG. 1 is an example of derivation process for merge candidates list construction.

The present document provides various techniques that can be used by a decoder of video bitstreams to improve the quality of decompressed or decoded digital video or images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This patent document is related to video coding technologies. Specifically, it is related to motion vector coding in video coding. It may be applied to the existing video coding standard like HEVC, or the standard (Versatile Video Coding) to be finalized. It may be also applicable to future video coding standards or video codec.

2. Introductory Remarks

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 3) is found at:
  http://phenix.it-sudparis.eu/jvet/doc_end_user/documents/12_Macao/wg11/JVET-L1001-v2.zip The latest reference software of VVC, named VTM, could be found at:
  https://vcgit.hhi.fraunhofer.de/jvet/VVCSoftware_VTM/tags/VTM-3.0rc1

2.1 Inter Prediction in HEVC/H.265

Each inter-predicted PU has motion parameters for one or two reference picture lists.

Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signalled explicitly per each PU. Such a mode is named advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode 2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
  Step 2: Additional candidates insertion
    Step 2.1: Creation of bi-predictive candidates
    Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2 Spatial Candidates Derivation

Figure 3:
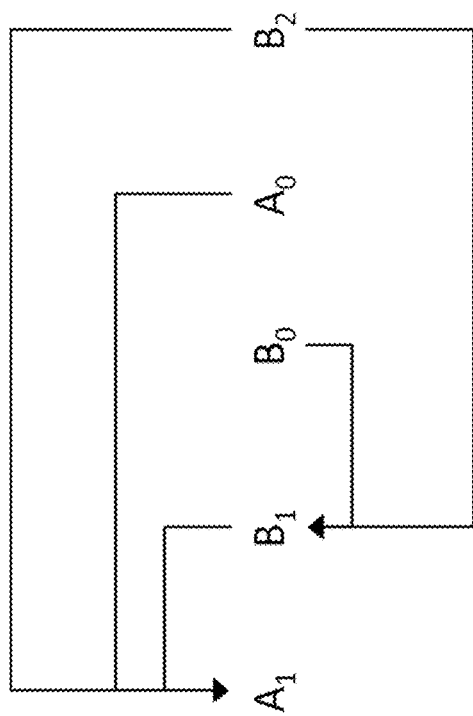
FIG. 3 shows an example of candidate pairs considered for redundancy check of spatial merge candidates.
Figure 2:
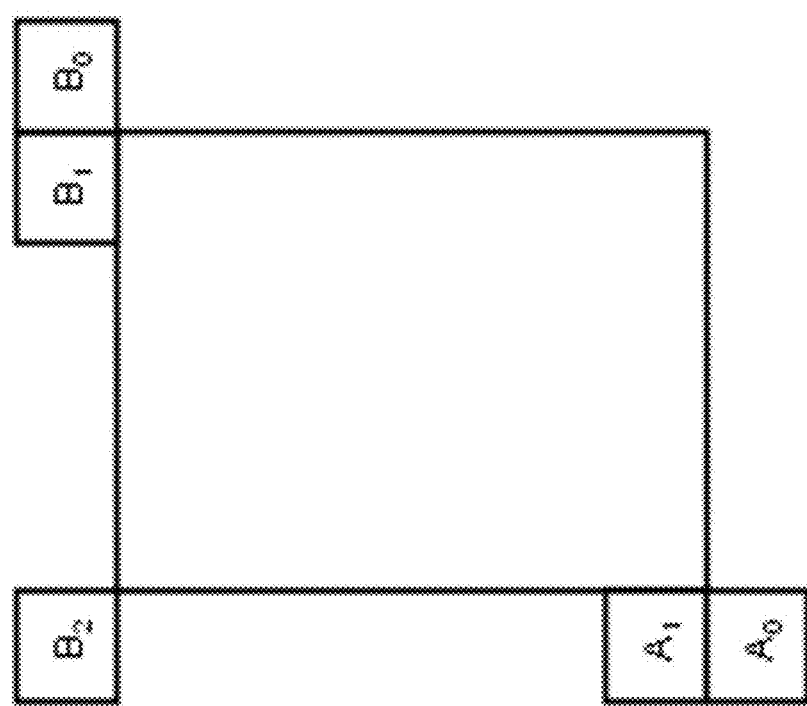
FIG. 2 shows example positions of spatial merge candidates.
Figure 4B:
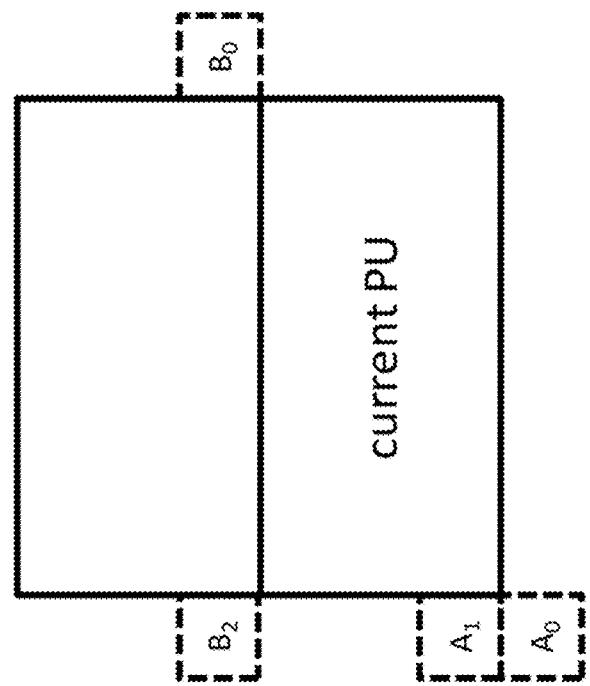
FIGS. 4A and 4B show example positions for a second prediction unit (PU) of N×2N and 2N×N partitions.
Figure 4A:
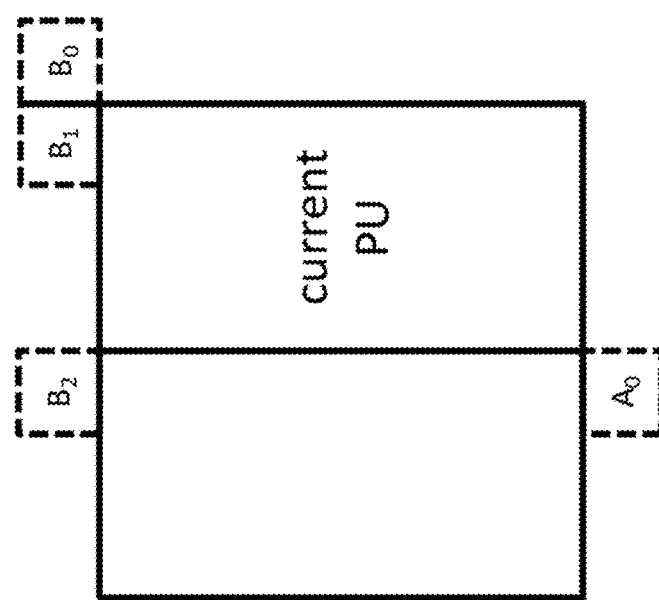

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A-4B depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3 Temporal Candidates Derivation

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 5:
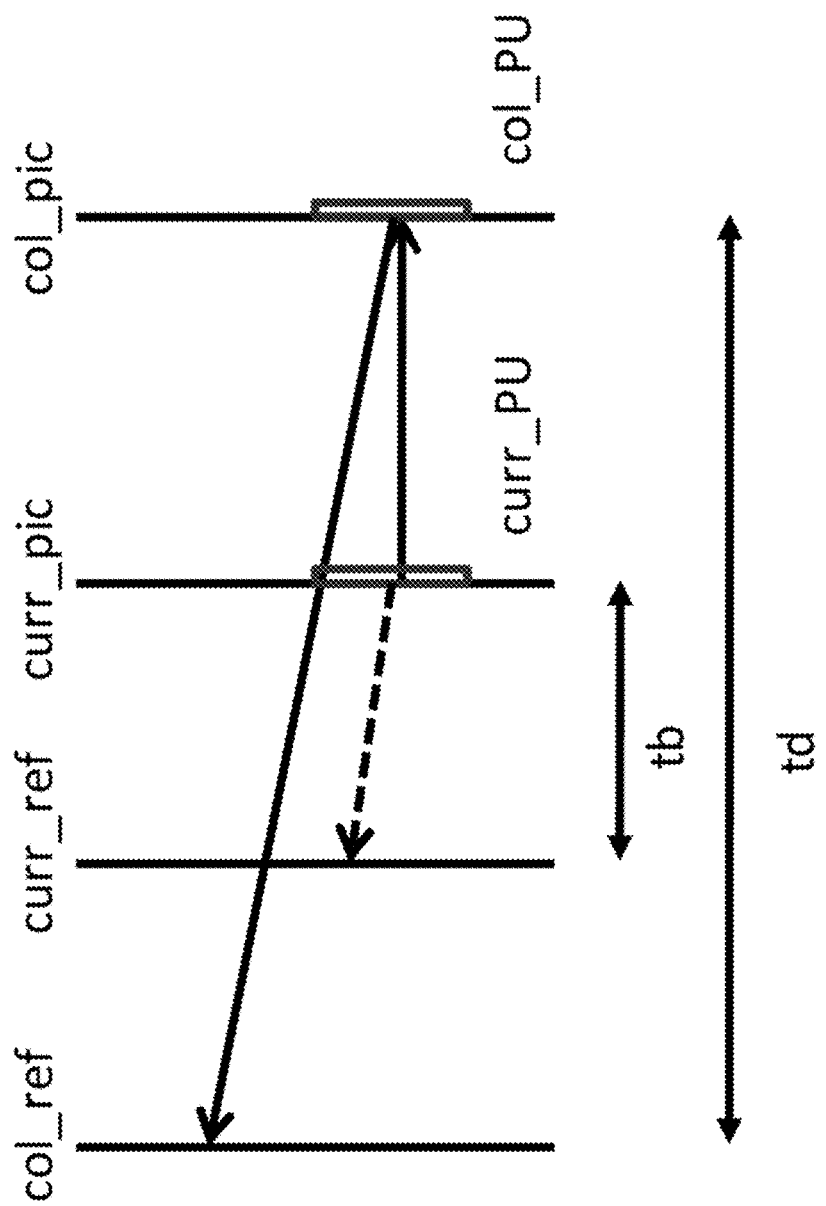
FIG. 5 is an example illustration of motion vector scaling for temporal merge candidate.

FIG. 5 is an illustration of motion vector scaling for temporal merge candidate.

Figure 6:
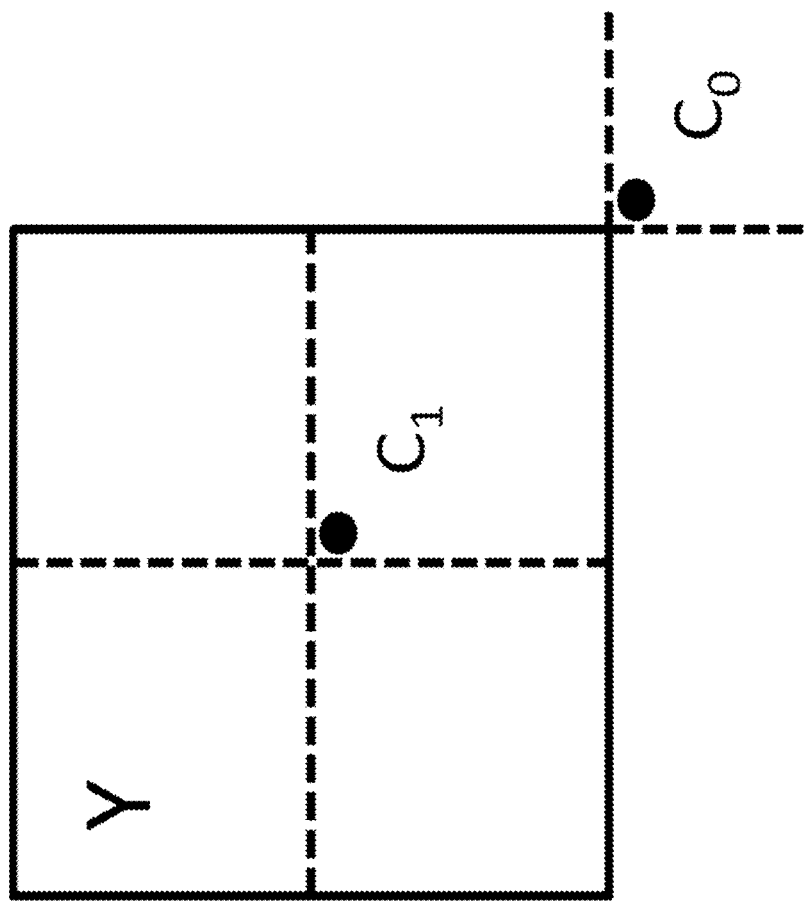
FIG. 6 shows example candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU aka. LCU, largest coding unit) row, position $C_1$ is used. Otherwise, position $C_0$ is used in the derivation of the temporal merge candidate.

FIG. 6 shows examples of candidate positions for temporal merge candidate, C0 and C1.

2.1.2.4 Additional Candidates Insertion

Figure 7:
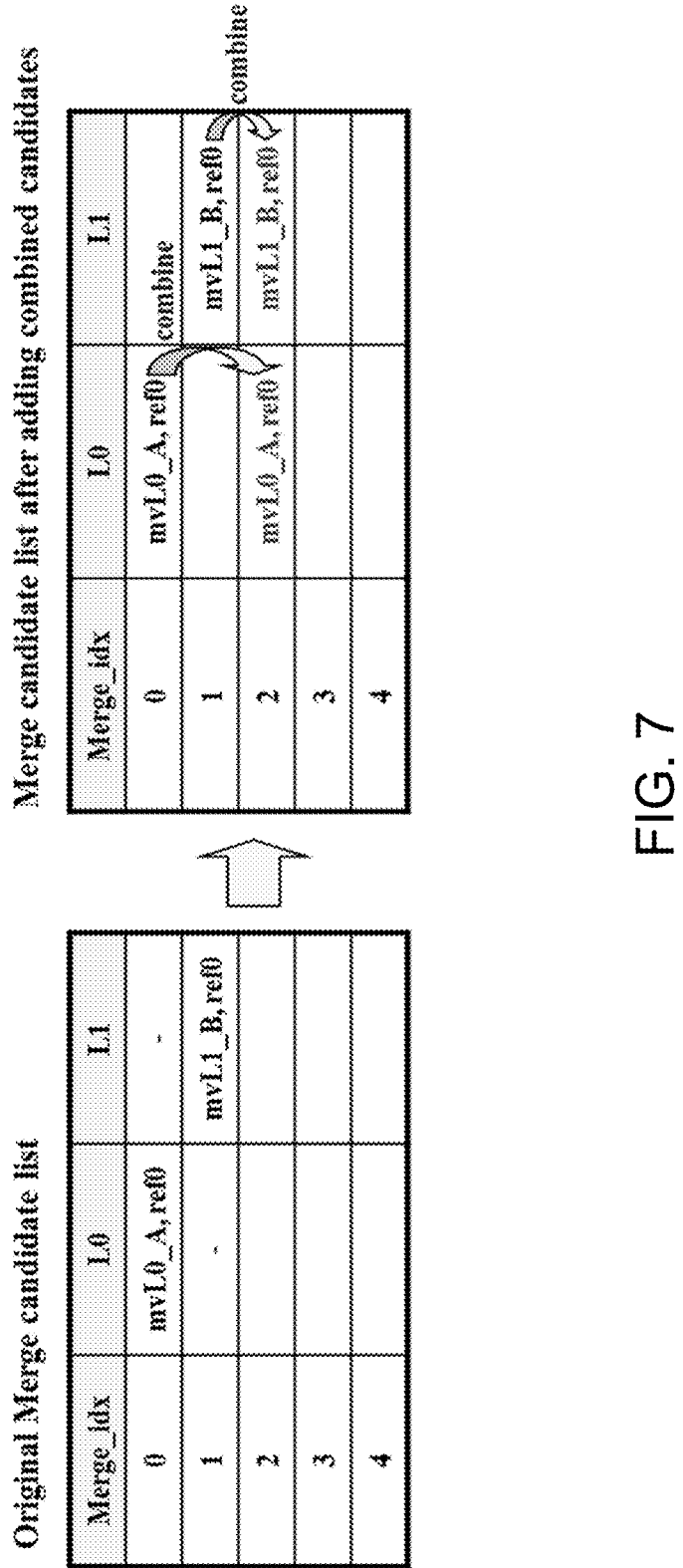
FIG. 7 shows an example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list.

More specifically, the following steps are performed in order till the merge list is full:

1. Set variable numRef to either number of reference picture associated with list 0 for P slice, or the minimum number of reference pictures in two lists for B slice;
2. Add non-repeated zero motion candidates:
   For variable i being 0 . . . numRef−1, add a default motion candidate with MV set to (0, 0) and reference picture index set to i for list 0 (if P slice), or for both lists (if B slice).
3. Add repeated zero motion candidates with MV set to (0, 0), reference picture index of list 0 set to 0 (if P slice) and reference picture indices of both lists set to 0 (if B slice).

Finally, no redundancy check is performed on these candidates.

2.1.3 Advanced Motion Vector Prediction (AMVP)

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
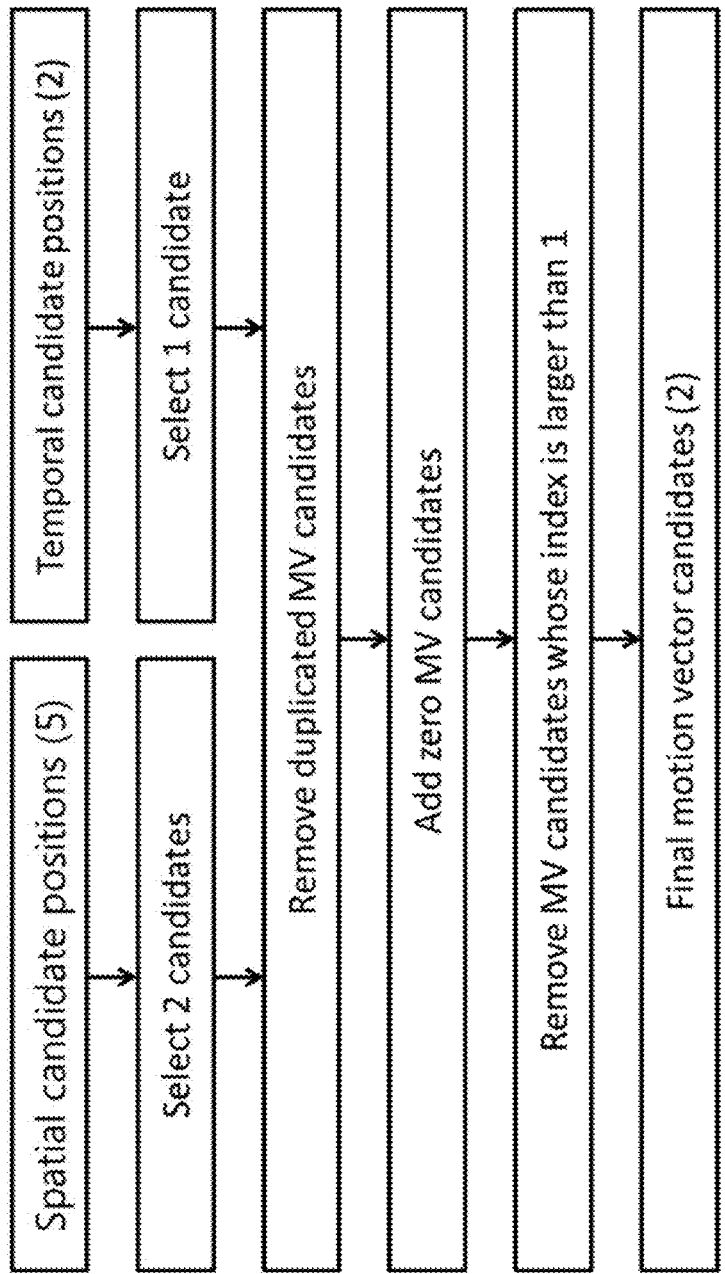
FIG. 8 shows an example derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0, A_1$, and scaled $A_0$, scaled $A_1$. The order of derivation for the above side of the current PU is defined as $B_0, B_1, B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
  (1) Same reference picture list, and same reference picture index (same POC)
  (2) Different reference picture list, but same reference picture (same POC)
Spatial scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
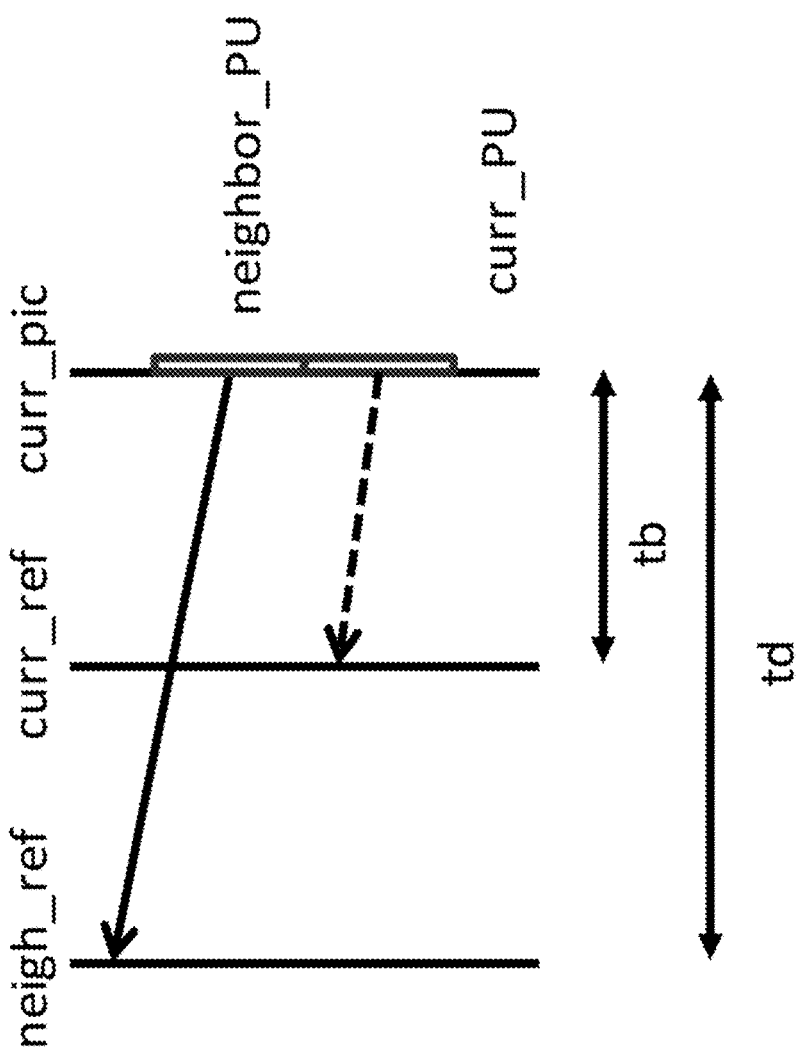
FIG. 9 is an example illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 Sub-CU Based Motion Vector Prediction Methods in JEM

In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

Figure 10:
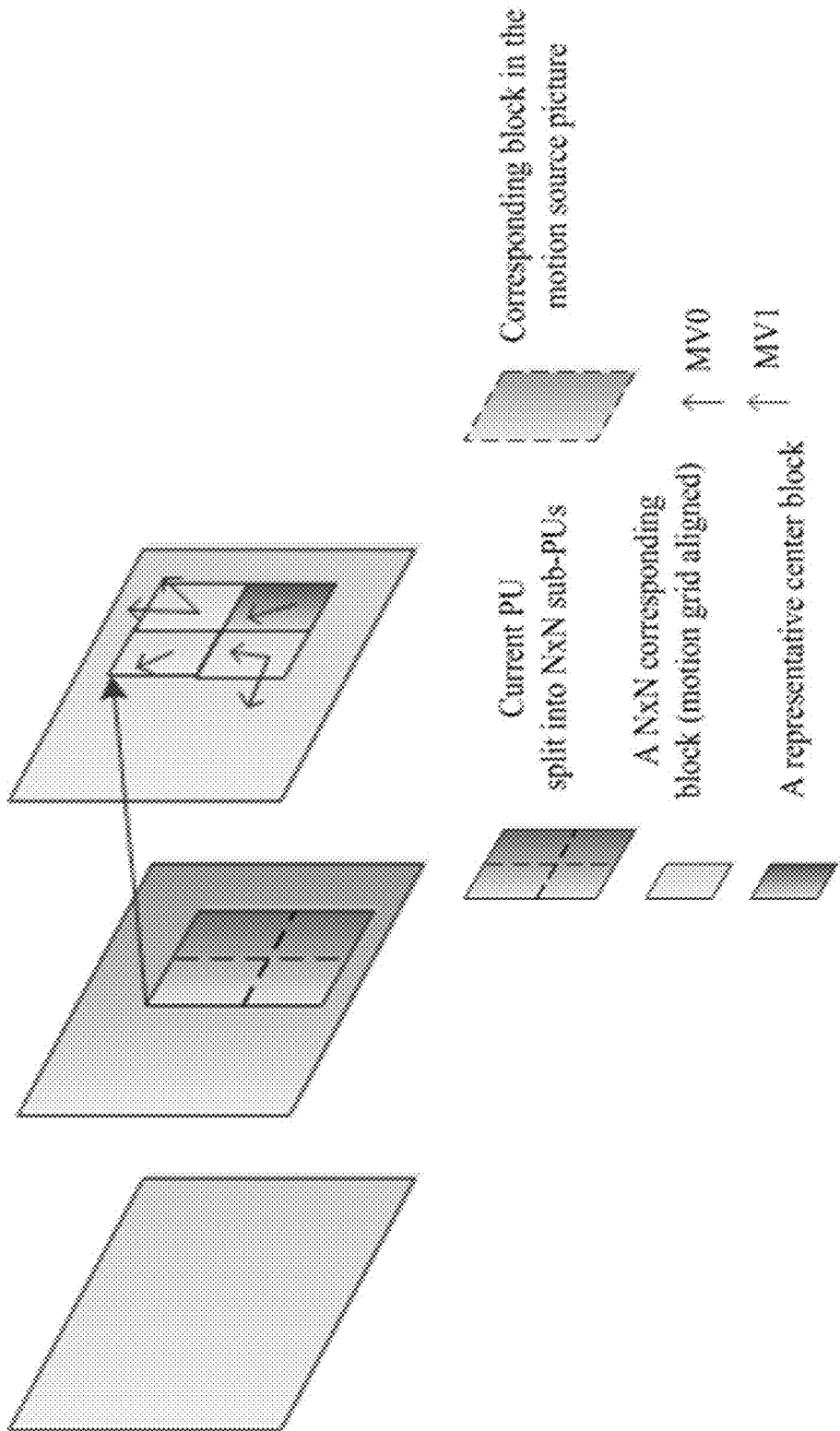
FIG. 10 shows an example of alternative temporal motion vector prediction (ATMVP) motion prediction for a CU.

FIG. 10 shows an example of ATMVP motion prediction for a CU.

2.2.1 Alternative Temporal Motion Vector Prediction

In the alternative temporal motion vector prediction (ATMVP) method, the motion vectors temporal motion vector prediction (TMVP) is modified by fetching multiple sets of motion information (including motion vectors and reference indices) from blocks smaller than the current CU. In some implementations, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1-X) for each sub-CU.

2.2.2 Spatial-Temporal Motion Vector Prediction (STMVP)

Figure 11:
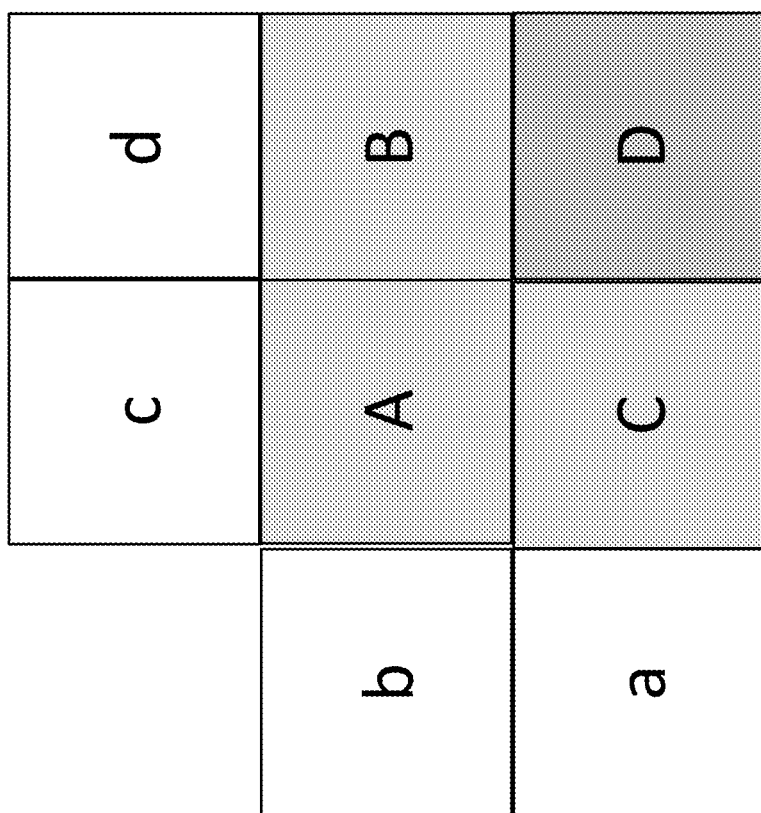
FIG. 11 shows an example of one CU with four sub-blocks (A-D) and its neighbouring blocks (a-d).

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

2.2.3 Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context coded by CABAC. While in HEVC, only the first bin is context coded and the remaining bins are context by-pass coded.

2.3 Inter Prediction Methods in VVC

There are several new coding tools for inter prediction improvement, such as Adaptive motion vector difference resolution (AMVR) for signaling MVD, affine prediction mode, Triangular prediction mode (TPM), ATMVP, Generalized Bi-Prediction (GBI), Bi-directional Optical flow (BIO).

2.3.1 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the VVC, a locally adaptive motion vector resolution (LAMVR) is introduced. In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Figure 12:
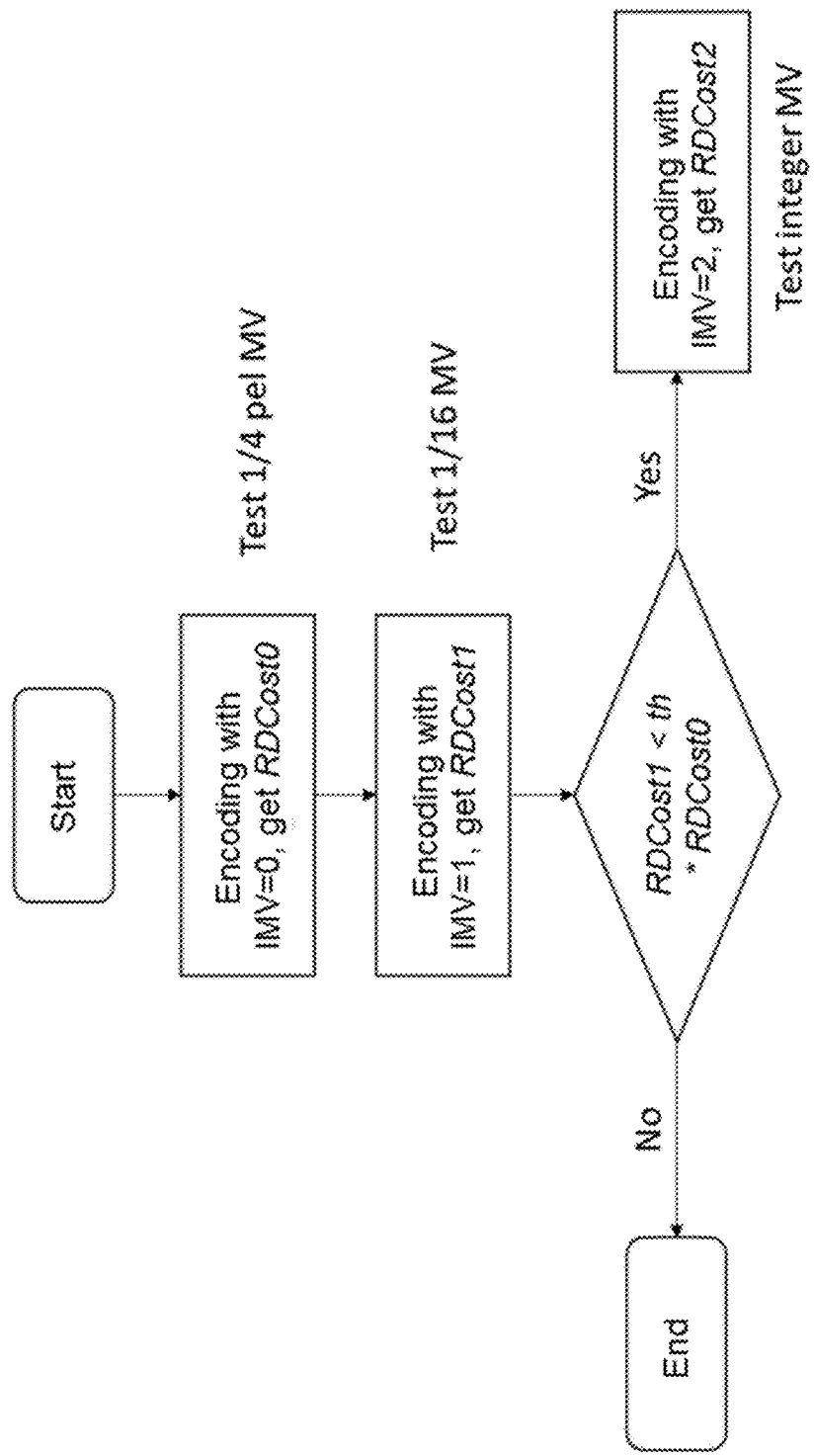
FIG. 12 is a flowchart of an example of encoding with different MV precision

The encoding process is shown in FIG. 12. First, ¼ pel MV is tested and the RD cost is calculated and denoted as RDCost0, then integer MV is tested and the RD cost is denoted as RDCost1. If RDCost1<th*RDCost0 (wherein th is a positive value), then 4-pel MV is tested; otherwise, 4-pel MV is skipped. Basically, motion information and RD cost etc. are already known for ¼ pel MV when checking integer or 4-pel MV, which can be reused to speed up the encoding process of integer or 4-pel MV.

2.3.2 Triangular Prediction Mode

Figure 13A:
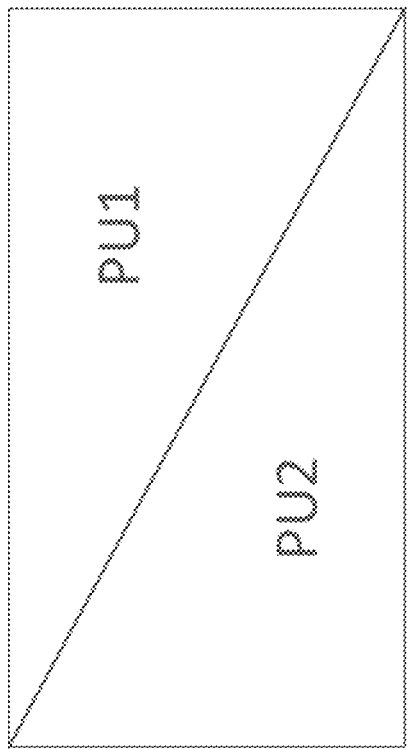
FIGS. 13A and 13B show 135 degree partition type (splitting from top-left corner to bottom-right corner) and 45 degree splitting patterns, respectively.
Figure 13B:
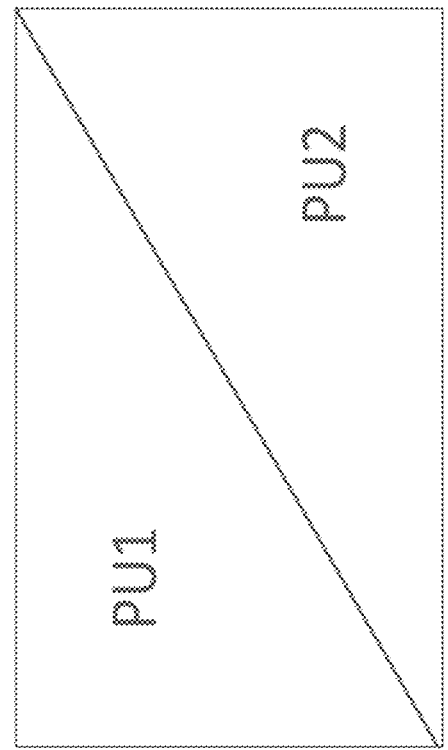

The concept of the triangular prediction mode (TPM) is to introduce a new triangular partition for motion compensated prediction. As shown in FIGS. 13A-13B, it splits a CU into two triangular prediction units, in either diagonal or inverse diagonal direction. Each triangular prediction unit in the CU is inter-predicted using its own uni-prediction motion vector and reference frame index which are derived from a single uni-prediction candidate list. An adaptive weighting process is performed to the diagonal edge after predicting the triangular prediction units. Then, the transform and quantization process are applied to the whole CU. It is noted that this mode is only applied to merge mode (note: skip mode is treated as a special merge mode).

FIG. 13A-13B are an illustration of splitting a CU into two triangular prediction units (two splitting patterns): FIG. 13A: 135 degree partition type (splitting from top-left corner to bottom-right corner); FIG. 13B: 45 degree splitting patterns.

2.3.2.1 Uni-Prediction Candidate List for TPM

Figure 14:
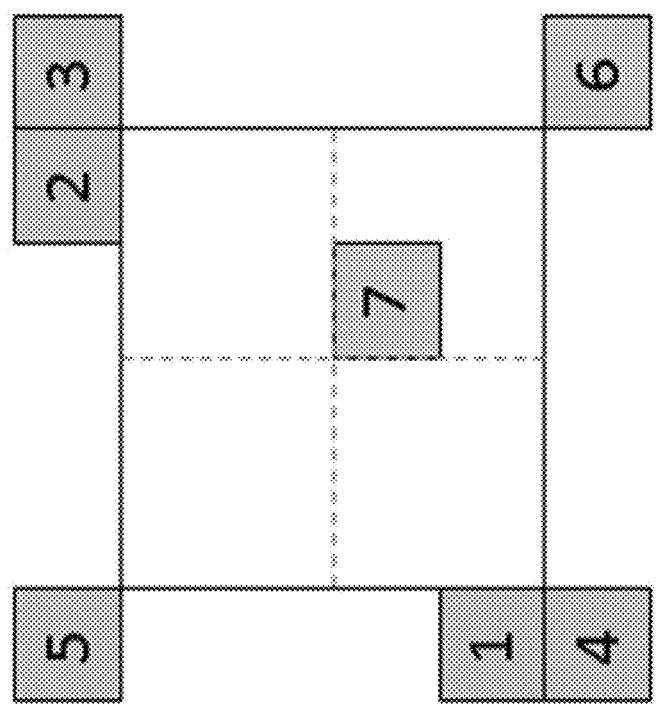
FIG. 14 shows an example of position of the neighboring blocks.

The uni-prediction candidate list, named TPM motion candidate list, consists of five uni-prediction motion vector candidates. It is derived from seven neighboring blocks including five spatial neighboring blocks (1 to 5) and two temporal co-located blocks (6 to 7), as shown in FIG. 14. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list for TPM are called TPM candidates, motion information derived from spatial/temporal blocks are called regular motion candidates.

More specifically, the following steps are involved:
1) Obtain regular motion candidates from $A_1$, $B_1$, $B_0$, $A_0$, $B_2$, Col and Col2 (corresponding to block 1-7 in FIG. 14) with full pruning operations when adding a regular motion candidate from spatial neighboring blocks.
2) Set variable numCurrMergeCand=0
3) For each regular motion candidates derived from $A_1$, $B_1$, $B_0$, $A_0$, $B_2$, Col and Col2, if not pruned and numCurrMergeCand is less than 5, if the regular motion candidate is uni-prediction (either from List 0 or List 1), it is directly added to the merge list as an TPM candidate with numCurrMergeCand increased by 1. Such a TPM candidate is named 'originally uni-predicted candidate'.

Full pruning is applied.

4) For each motion candidates derived from $A_1$, $B_1$, $B_0$, $A_0$, $B_2$, Col and Col2, if not pruned, and numCurrMergeCand is less than 5, if the regular motion candidate is bi-prediction, the motion information from List 0 is added to the TPM merge list (that is, modified to be uni-prediction from List 0) as a new TPM candidate and numCurrMergeCand increased by 1. Such a TPM candidate is named 'Truncated List0-predicted candidate'.

Full pruning is applied.

5) For each motion candidates derived from $A_1$, $B_1$, $B_0$, $A_0$, $B_2$, Col and Col2, if not pruned, and numCurrMergeCand is less than 5, if the regular motion candidate is bi-prediction, the motion information from List 1 is added to the TPM merge list (that is, modified to be uni-prediction from List 1) and numCurrMergeCand increased by 1. Such a TPM candidate is named 'Truncated List1-predicted candidate'.

Full pruning is applied.

6) For each motion candidates derived from $A_1$, $B_1$, $B_0$, $A_0$, $B_2$, Col and Col2, if not pruned, and numCurrMergeCand is less than 5, if the regular motion candidate is bi-prediction, If List 0 reference picture's slice QP is smaller than List 1 reference picture's slice QP, the motion information of List 1 is firstly scaled to List 0 reference picture, and the average of the two MVs (one is from original List 0, and the other is the scaled MV from List 1) is added to the TPM merge list, such a candidate is called averaged uni-prediction from List 0 motion candidate and numCurrMergeCand increased by 1.

Otherwise, the motion information of List 0 is firstly scaled to List 1 reference picture, and the average of the two MVs (one is from original List 1, and the other is the scaled MV from List 0) is added to the TPM merge list, such a TPM candidate is called averaged uni-prediction from List 1 motion candidate and numCurrMergeCand increased by 1.

Full pruning is applied.

7) If numCurrMergeCand is less than 5, zero motion vector candidates are added.

When inserting a candidate to the list, if it has to be compared to all previously added candidates to see whether it is identical to one of them, such a process is called full pruning.

2.3.2.2 Adaptive Weighting Process

After predicting each triangular prediction unit, an adaptive weighting process is applied to the diagonal edge between the two triangular prediction units to derive the final prediction for the whole CU. Two weighting factor groups are defined as follows:

$1^{st}$ weighting factor group: {7/8, 6/8, 4/8, 2/8, 1/8} and {7/8, 4/8, 1/8} are used for the luminance and the chrominance samples, respectively;

$2^{nd}$ weighting factor group: {7/8, 6/8, 5/8, 4/8, 3/8, 2/8, 1/8} and {6/8, 4/8, 2/8} are used for the luminance and the chrominance samples, respectively.

Weighting factor group is selected based on the comparison of the motion vectors of two triangular prediction units. The $2^{nd}$ weighting factor group is used when the reference pictures of the two triangular prediction units are different from each other or their motion vector difference is larger than 16 pixels. Otherwise, the $1^{st}$ weighting factor group is used.

2.3.2.3 Signaling of Triangular Prediction Mode (TPM)

One bit flag to indicate whether TPM is used may be firstly signaled. Afterwards, the indications of two splitting patterns (as depicted in FIGS. 13A-13B), and selected merge indices for each of the two partitions are further signaled.

2.3.2.3.1 Signaling of TPM Flag

Let's denote one luma block's width and height by W and H, respectively. If W*H<64, triangular prediction mode is disabled.

When one block is coded with affine mode, triangular prediction mode is also disabled.

When one block is coded with merge mode, one bit flag may be signaled to indicate whether the triangular prediction mode is enabled or disabled for the block.

Figure 15:
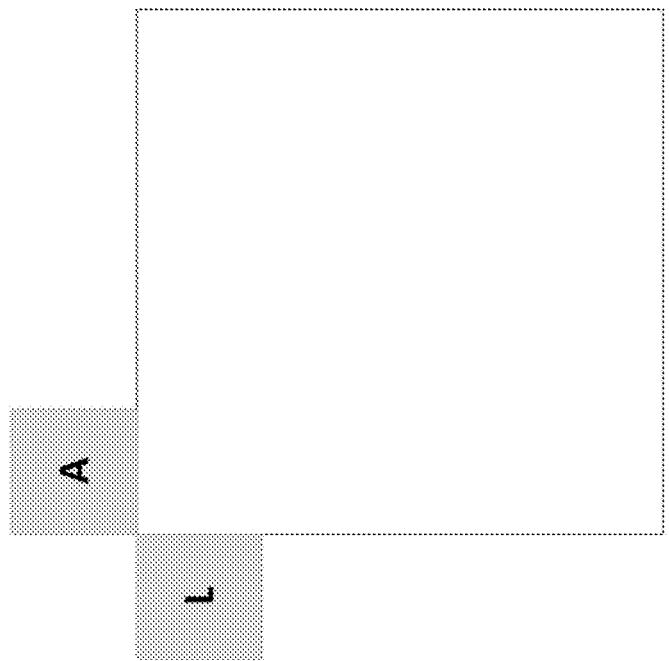
FIG. 15 shows examples of above and left blocks.

The flag is coded with 3 contexts, based on the following equation:

Ctxindex=((left block $L$ available && $L$ is coded with TPM?)1:0)+((Above block $A$ available && $A$ is coded with TPM?)1:0);

FIG. 15 shows examples of neighboring blocks (A and L) used for context selection in TPM flag coding.

2.3.2.3.2 Signaling of an Indication of Two Splitting Patterns (as Depicted in FIG. 13), and Selected Merge Indices for Each of the Two Partitions It is noted that splitting patterns, merge indices of two partitions are jointly coded. In an existing implementation, it is restricted that the two partitions couldn't use the same reference index. Therefore, there are 2 (splitting patterns)*N (maximum number of merge candidates)*(N−1) possibilities wherein N is set to 5. One indication is coded and the mapping between the splitting patterns, two merge indices and coded indication are derived from the array defined below:

const uint 8_t g_TriangleCombination[TRIANGLE_MAX_NUM_CANDS][3]={{0,1,0},{1,0,1},{1,0,2},{0,0,1},{0,2,0},{1,0,3},{1,0,4},{1,1,0},{0,3,0},{0,4,0},{0,0,2},{0,1,2},{1,1,2},{0,0,4},{0,0,3},{0,1,3},{0,1,4},{1,1,4},{1,1,3},{1,2,1},{1,2,0},{0,2,1},{0,4,3},{1,3,0},{1,3,2},{1,3,4},{1,4,0},{1,3,1},{1,2,3},{1,4,1},{0,4,1},{0,2,3},{1,4,2},{0,3,2},{1,4,3},{0,3,1},{0,2,4},{1,2,4},{0,4,2},{0,3,4}};

splitting patterns (45 degree or 135 degree)=g_TriangleCombination[signaled indication][0];

Merge index of candidate $A$=g_TriangleCombination[signaled indication][1];

Merge index of candidate $B$=g_TriangleCombination[signaled indication][2];

Once the two motion candidates A and B are derived, the two partitions' (PU1 and PU2) motion information could be set either from A or B. Whether PU1 uses the motion information of merge candidate A or B is dependent on the prediction directions of the two motion candidates. Table 1 shows the relationship between two derived motion candidates A and B, with the two partitions.

TABLE 1

Derivation of partitions' motion information from derived two merge candidates (A, B)

| Prediction direction of A | Prediction direction of B | PU1's motion information | PU2's motion information |
|---|---|---|---|
| L0 | L0 | A (L0) | B (L0) |
| L1 | L1 | B (L1) | A (L1) |

TABLE 1-continued

| Derivation of partitions' motion information from derived two merge candidates (A, B) | | | |
|---|---|---|---|
| Prediction direction of A | Prediction direction of B | PU1's motion information | PU2's motion information |
| L0 | L1 | A (L0) | B (L1) |
| L1 | L0 | B (L0) | A (L1) |

2.3.2.3.3 Entropy Coding of the Indication (Denoted by Merge_Triangle_Idx)

merge triangle idx is within the range [0, 39], inclusively. K-th order Exponential Golomb (EG) code is used for binarization of merge_triangle_idx wherein K is set to 1.

K-Th Order EG

To encode larger numbers in fewer bits (at the expense of using more bits to encode smaller numbers), this can be generalized using a nonnegative integer parameter k. To encode a nonnegative integer x in an order-k exp-Golomb code:

1. Encode $\lfloor x/2^k \rfloor$ using order-0 exp-Golomb code described above, then
2. Encode x mod $2^k$ in binary

TABLE 1

| Exp-Golomb-k coding examples | | | |
|---|---|---|---|
| x | k = 0 | k = 1 | k = 2 |
| 0 | 1 | 10 | 100 |
| 1 | 010 | 11 | 101 |
| 2 | 011 | 0100 | 110 |
| 3 | 00100 | 0101 | 111 |
| 4 | 00101 | 0110 | 01000 |
| 5 | 00110 | 0111 | 01001 |
| 6 | 00111 | 001000 | 01010 |
| 7 | 0001000 | 001001 | 01011 |
| 8 | 0001001 | 001010 | 01100 |
| 9 | 0001010 | 001011 | 01101 |
| 10 | 0001011 | 001100 | 01110 |
| 11 | 0001100 | 001101 | 01111 |
| 12 | 0001101 | 001110 | 0010000 |
| 13 | 0001110 | 001111 | 0010001 |
| 14 | 0001111 | 00010000 | 0010010 |
| 15 | 000010000 | 00010001 | 0010011 |
| 16 | 000010001 | 00010010 | 0010100 |
| 17 | 000010010 | 00010011 | 0010101 |
| 18 | 000010011 | 00010100 | 0010110 |
| 19 | 000010100 | 00010101 | 0010111 |

2.3.3 Affine Motion Compensation Prediction

Figure 16A:
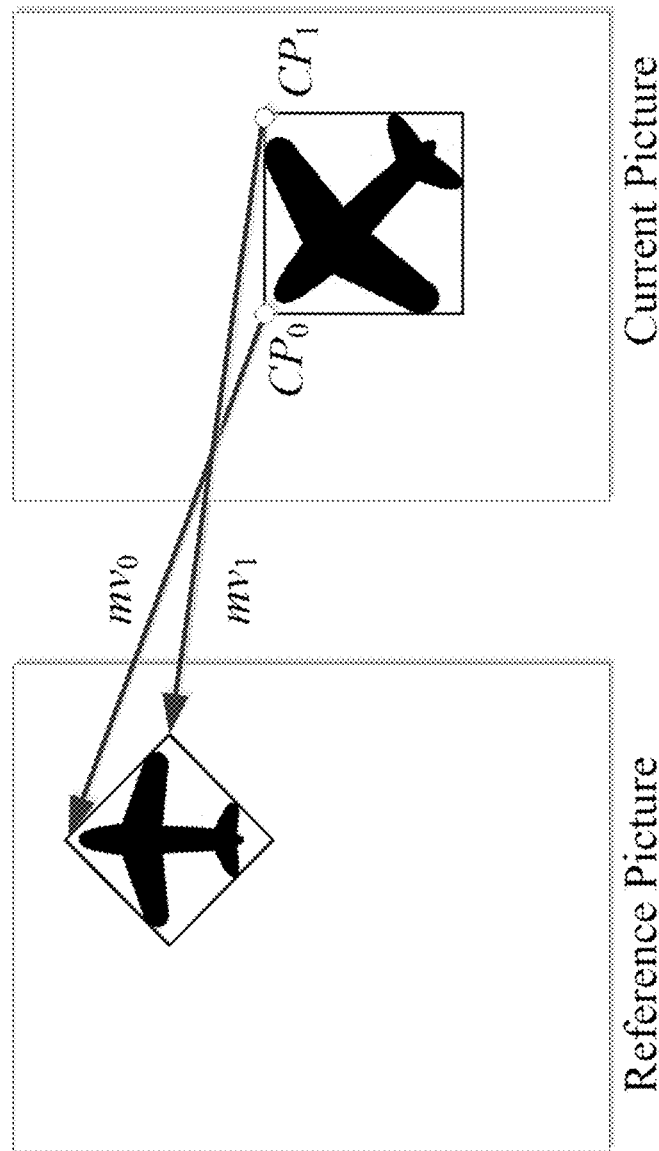
FIGS. 16A and 16B show examples of 2 control point motion vectors (CPMVs) and 3 CPMVs, respectively.
Figure 16B:
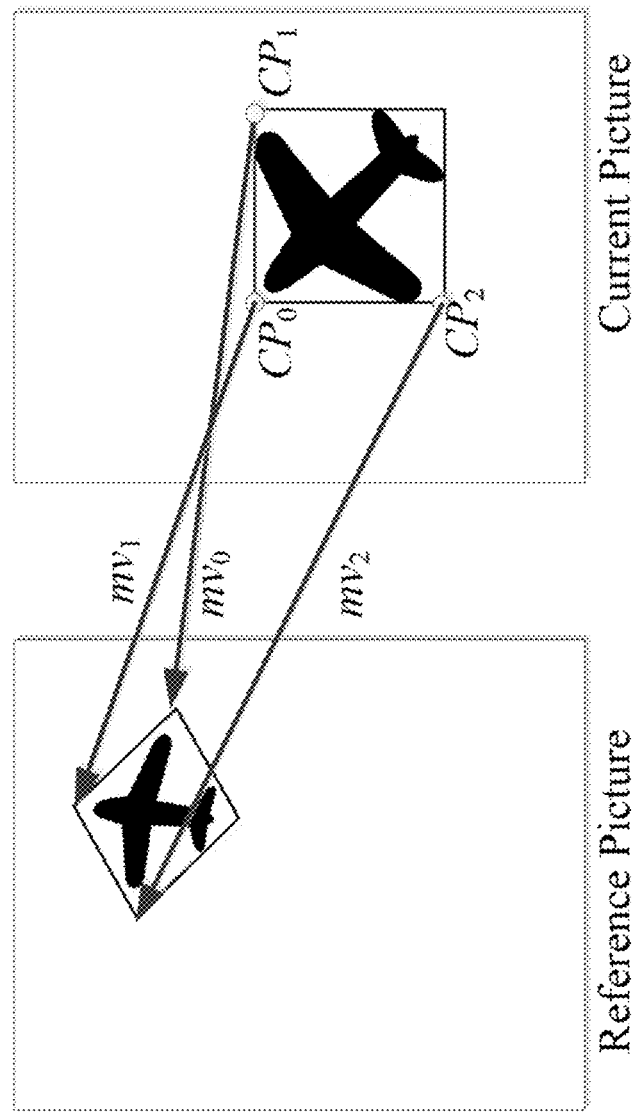

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIGS. 16A-16B, the affine motion field of the block is described by two control point motion vectors (CPMVs) for the 4-parameter affine model (FIG. 16A) and 3 CPMVs for the 6-parameter affine model (FIG. 16B).

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 17:
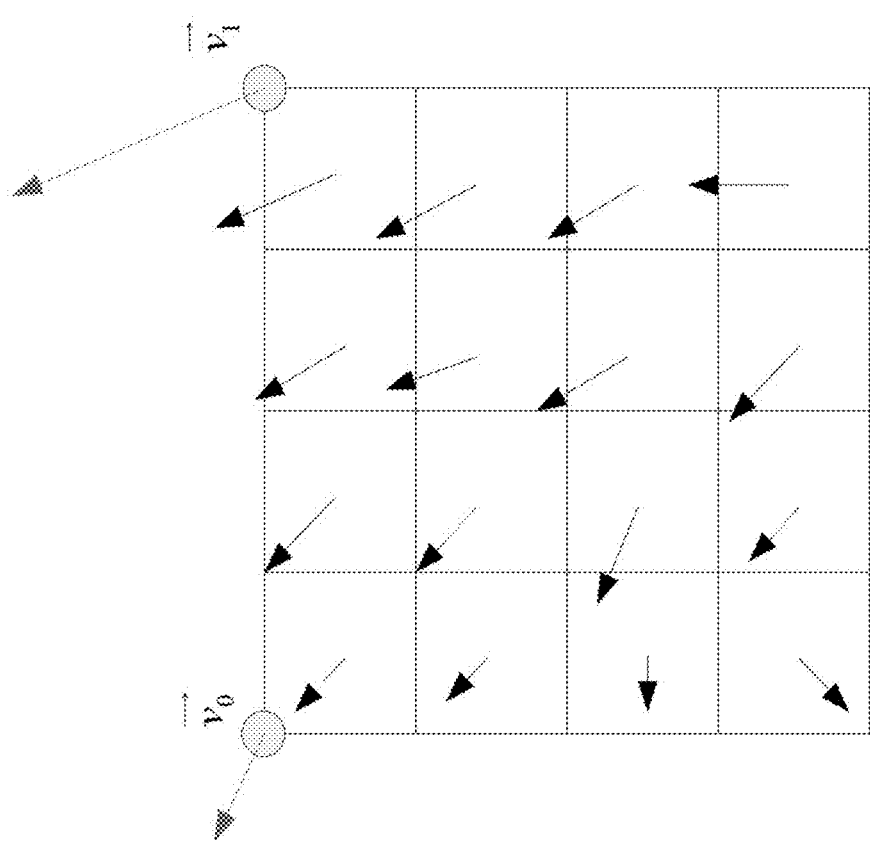
FIG. 17 shows an example of affine motion vector field (MVF) per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 17, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.3.3.1 Signaling of Affine Prediction

Similar to the translational motion model, there are also two modes for signaling the side information due affine prediction. They are AFFINE_INTER and AFFINE_MERGE modes.

2.3.3.2 AF_INTER Mode

For CUs with both width and height larger than 8, AF_INTER mode can be applied. An affine flag in CU level is signalled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 20) and the estimated CPMVs are signalled. In addition, the index of affine AMVP candidate from which the estimated CPMVs are derived is further signalled.

1) Inherited Affine Motion Predictors

Figure 19:
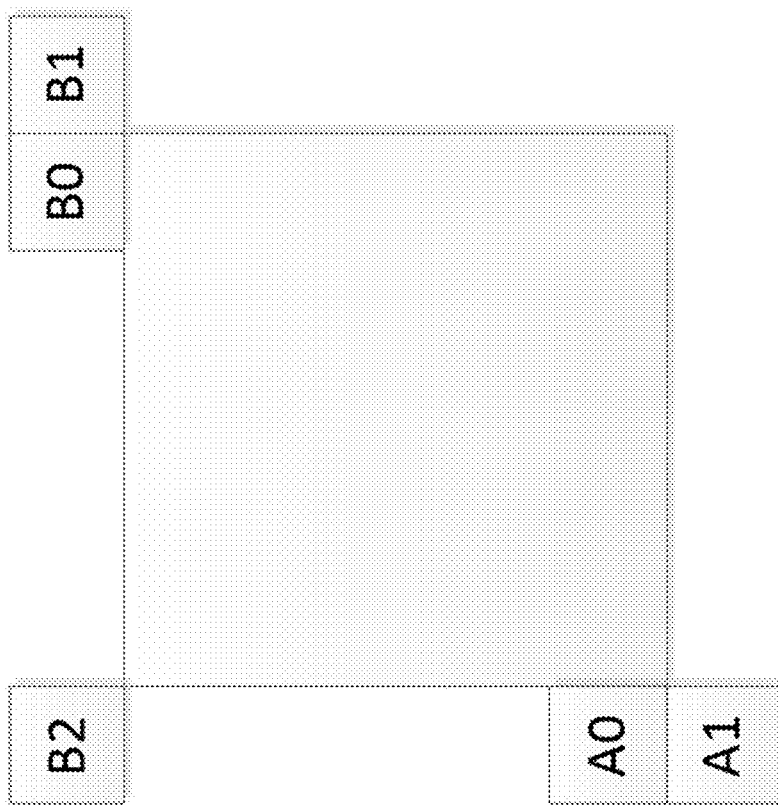
FIG. 19 shows an example of MVP for AF_INTER for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 19.

Figures 21A, 21B:
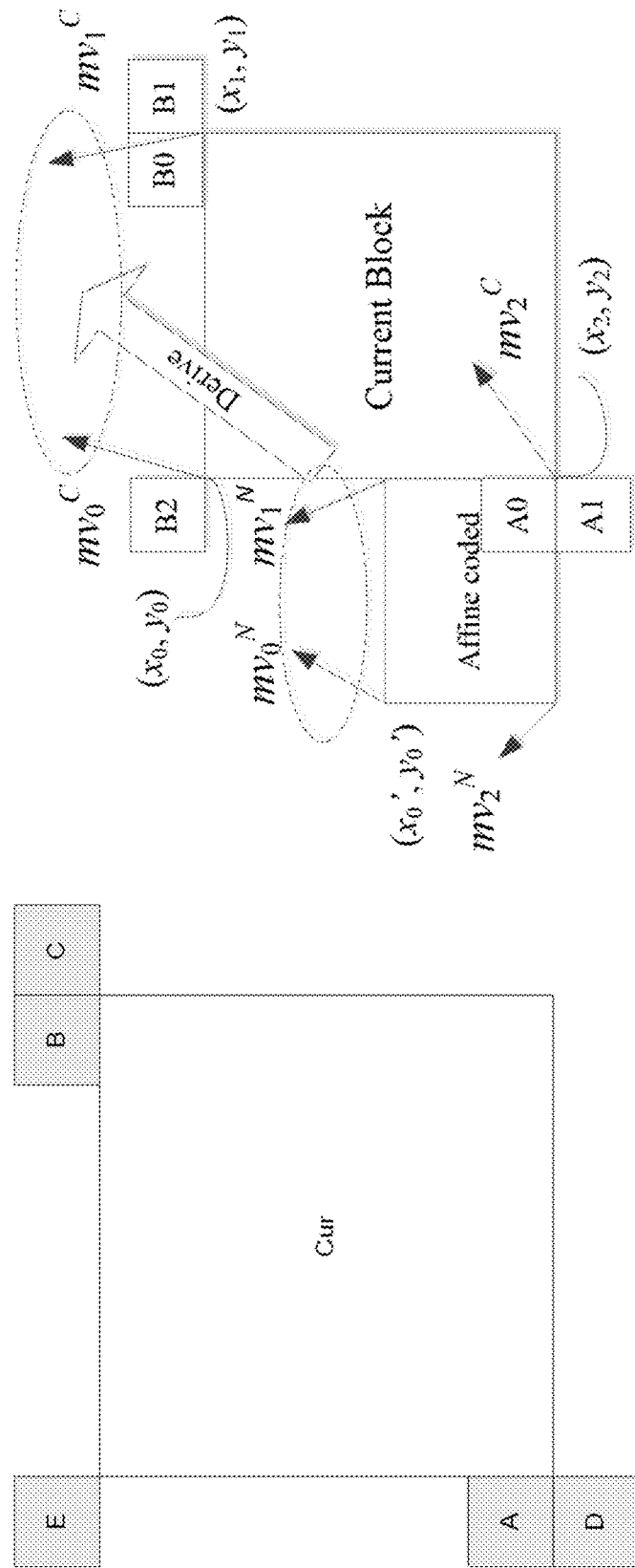
FIGS. 21A and 21B show examples of control point motion vectors in affine coding in AF_MERGE.

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 21B are utilized to derive the estimated CPMVs of current block, denoted by $MV_0^C$, $MV_0^C$, $MV_2^C$ for the top-left (with coordinate (x0, y0)), top-right (with coordinate (x1, y1)) and bottom-right positions (with coordinate (x2, y2)) of current block.

2) Constructed Affine Motion Predictors

Figure 20:
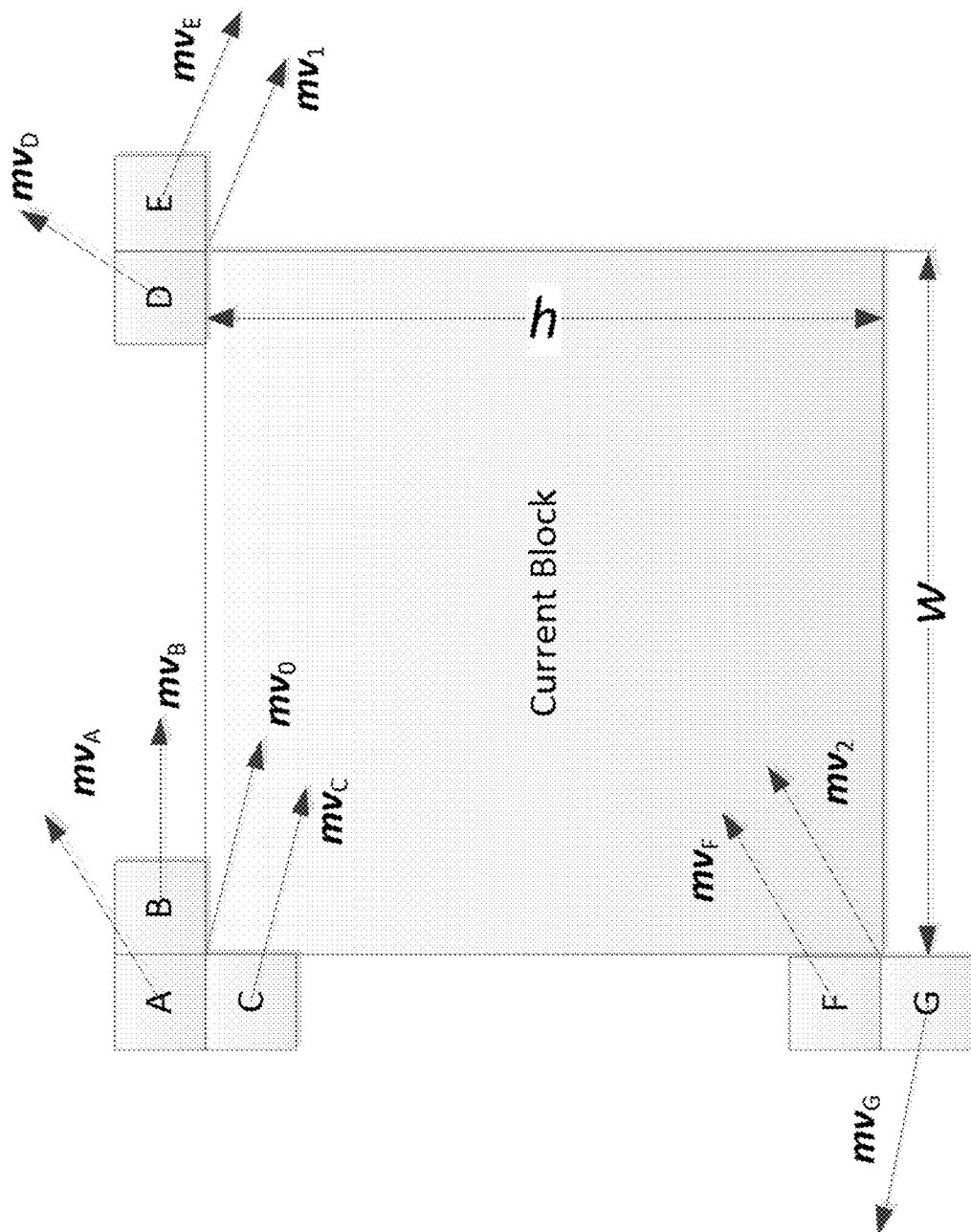
FIG. 20 shows an example of constructing affine motion predictors in AF_INTER.

A constructed affine motion predictor consists of control-point motion vectors (CPMVs) that are derived from neighboring inter coded blocks, as shown in FIG. 20, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

- If the current affine motion model is 4-parameter affine, then a constructed affine motion predictor is inserted into the candidate list only if both $\overline{mv}_0$ and $\overline{mv}_1$ mare founded, that is, $\overline{mv}_0$ and $\overline{mv}_1$ are used as the estimated CPMVs for top-left (with coordinate (x0, y0)), top-right (with coordinate (x1, y1)) positions of current block.
- If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.

1) Derive an affine motion predictor by setting all CPMVs equal to $\overline{mv}_2$ if available.
2) Derive an affine motion predictor by setting all CPMVs equal to $\overline{mv}_1$ if available.
3) Derive an affine motion predictor by setting all CPMVs equal to $\overline{mv}_0$ if available.
4) Derive an affine motion predictor by setting all CPMVs equal to HEVC TMVP if available.
5) Derive an affine motion predictor by setting all CPMVs to zero MV.

Note that $\overline{mv}_i$ is already derived in constructed affine motion predictor.

Figure 18B:
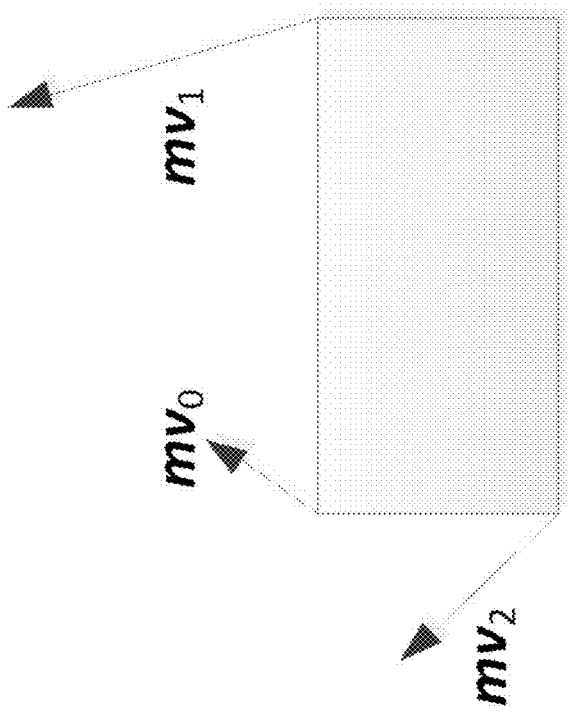
FIGS. 18A and 18B show examples of 4 and 6 parameter affine models, respectively.
Figure 18A:
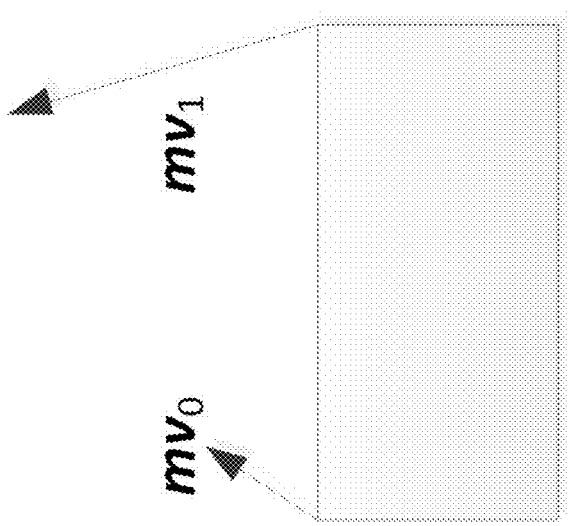

FIG. 18A shows an example of a 4-parameter affine model. FIG. 18B shows an example of a 6-parameter affine model.

FIG. 19 shows an example of MVP for AF_INTER for inherited affine candidates.

FIG. 20 shows an example of MVP for AF_INTER for constructed affine candidates.

In AF_INTER mode, when 4/6-parameter affine mode is used, 2/3 control points are required, and therefore 2/3 MVD needs to be coded for these control points, as shown in FIG. 18. In an existing implementation, it is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 18B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.3.3.3 AF_MERGE Mode

When a CU is applied in AF_MERGE mode, it gets the first block coded with affine mode from the valid neighbour reconstructed blocks. And the selection order for the candidate block is from left, above, above right, left bottom to above left as shown in FIG. 21A (denoted by A, B, C, D, E in order). For example, if the neighbour left bottom block is coded in affine mode as denoted by A0 in FIG. 21B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) located at the top-left corner stores mv0, the sub-block located at the top-right corner stores $mv_1$ if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU $mv_0^C$, $mv_1^C$ and $mv_2^C$ are derived, according to the simplified affine motion model Equation (1) and (2), the MVF of the current CU is generated. In order to identify whether the current CU is coded with AF_MERGE mode, an affine flag is signalled in the bitstream when there is at least one neighbour block is coded in affine mode.

In some existing implementations, an affine merge candidate list is constructed with following steps:

1) Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

2) Insert Constructed Affine Candidates

If the number of candidates in affine merge candidate list is less than MaxNumAffineCand (e.g., 5), constructed affine candidates are inserted into the candidate list.

Figures 22, 23:
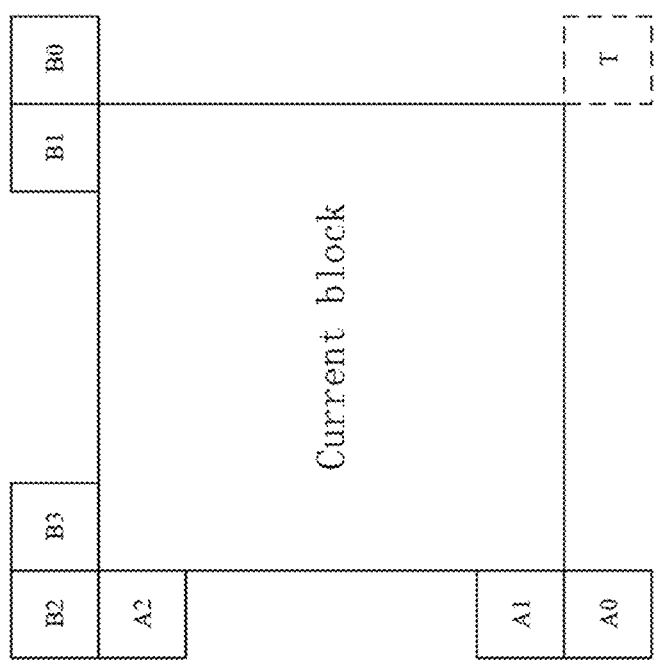
FIG. 22 shows examples of candidate positions for affine merge mode.
FIG. 23 shows an example of intra-picture block copy operation.

Constructed affine candidate means the candidate is constructed by combining the neighbor motion information of each control point.

a) The motion information for the control points is derived firstly from the specified spatial neighbors and temporal neighbor shown in FIG. 22. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.
For CP3, the checking priority is A1→A0.
For CP4, T is used.

b) Secondly, the combinations of controls points are used to construct an affine merge candidate.

I. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

II. Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

III. The combinations of constructed affine candidates are inserted into to candidate list as following order:
{CP1, CP2, CP3}, {CP1, CP2, CP4}, {CP1, CP3, CP4}, {CP2, CP3, CP4}, {CP1, CP2}, {CP1, CP3} i. For each combination, the reference indices of list X for each CP are checked, if they are all the same, then this combination has valid CPMVs for list X. If the combination does not have valid CPMVs for both list 0 and list 1, then this combination is marked as invalid. Otherwise, it is valid, and the CPMVs are put into the sub-block merge list.

3) Padding with Zero Motion Vectors

If the number of candidates in affine merge candidate list is less than 5, zero motion vectors with zero reference indices are insert into the candidate list, until the list is full.

More specifically, for the sub-block merge candidate list, a 4-parameter merge candidate with MVs set to (0, 0) and prediction direction set to uni-prediction from list 0 (for P slice) and bi-prediction (for B slice).

2.3.4 Current Picture Referencing

Intra block copy (a.k.a. IBC, or intra picture block compensation), also named current picture referencing (CPR) was adopted in HEVC screen content coding extensions (SCC). This tool is very efficient for coding of screen content video in that repeated patterns in text and graphics rich content occur frequently within the same picture. Having a previously reconstructed block with equal or similar pattern as a predictor can effectively reduce the prediction error and therefore improve coding efficiency. An example of the intra block compensation is illustrated in FIG. 23.

Similar to the design of CRP in HEVC SCC, In VVC, The use of the IBC mode is signaled at both sequence and picture level. When the IBC mode is enabled at sequence parameter set (SPS), it can be enabled at picture level. When the IBC mode is enabled at picture level, the current reconstructed picture is treated as a reference picture. Therefore, no syntax change on block level is needed on top of the existing VVC inter mode to signal the use of the IBC mode.

Main features:

It is treated as a normal inter mode. Therefore, merge and skip modes are also available for the IBC mode. The merge candidate list construction is unified, containing merge candidates from the neighboring positions that are either coded in the IBC mode or the HEVC inter mode. Depending on the selected merge index, the current block under merge or skip mode can merge into either an IBC mode coded neighbor or otherwise an normal inter mode coded one with different pictures as reference pictures.

Block vector prediction and coding schemes for the IBC mode reuse the schemes used for motion vector prediction and coding in the HEVC inter mode (AMVP and MVD coding).

The motion vector for the IBC mode, also referred as block vector, is coded with integer-pel precision, but stored in memory in 1/16-pel precision after decoding as quarter-pel precision is required in interpolation and deblocking stages. When used in motion vector prediction for the IBC mode, the stored vector predictor will be right shifted by 4.

Search range: it is restricted to be within the current CTU.
CPR is disallowed when affine mode/triangular mode/GBI/weighted prediction is enabled.

2.3.5 Merge List Design in VVC

There are three different merge list construction processes supported in VVC:

1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.

2) Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. Please note the transform is performed in the whole block level, even two partitions may use different motion vectors for generating their own prediction blocks. Uni-Prediction TPM merge list size is fixed to be 5.
3) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6.

2.3.5.1 Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

2.3.5.1.1 Another ATMVP Embodiment

In this contribution, the ATMVP merge candidate in the normal merge list is moved to the first position of the affine merge list. Such that all the merge candidates in the new list (i.e., sub-block based merge candidate list) are based on sub-block coding tools.

2.3.5.1.2 ATMVP in VTM-3.0

In VTM-3.0, a special merge candidate list, known as sub-block merge candidate list (a.k.a affine merge candidate list) is added besides the regular merge candidate list. The sub-block merge candidate list is filled with candidates in the following order:
   b. ATMVP candidate (maybe available or unavailable);
   c. Inherited Affine candidates;
   d. Constructed Affine candidates;
   e. Padding as zero MV 4-parameter affine model The maximum number of candidates (denoted as ML) in the sub-block merge candidate list derived as below:
   1) If the ATMVP usage flag (e.g. the flag may be named as "sps_sbtmvp_enabled_flag") is on (equal to 1), but the affine usage flag (e.g. the flag may be named as "sps_affine_enabled_flag") is off (equal to 0), then ML is set equal to 1.
   2) If the ATMVP usage flag is off (equal to 0), and the affine usage flag is off (equal to 0), then ML is set equal to 0. In this case, the sub-block merge candidate list is not used.
   3) Otherwise (the affine usage flag is on (equal to 1), the ATMVP usage flag is on or off), ML is signaled from the encoder to the decoder. Valid ML is 0<=ML<=5.

When construct the sub-block merge candidate list, ATMVP candidate is checked first. If any one of the following conditions is true, ATMVP candidate is skipped and not put into the sub-block merge candidate list.

1) The ATMVP usage flag is off;
2) Any TMVP usage flag (e.g. the flag may be named as "slice_temporal_mvp_enabled_flag" when signaled at slice level) is off;
3) The reference picture with reference index 0 in reference list 0 is identical to the current picture (It is a CPR)

ATMVP in VTM-3.0 is much simpler than in JEM. When an ATMVP merge candidate is generated, the following process is applied:
   a. Check neighbouring blocks A1, B1, B0, A0 as shown in FIG. 22 in order, to find the first inter-coded, but not CPR-coded block, denoted as block X;
   b. Initialize TMV=(0,0). If there is a MV (denoted as MV') of block X, referring to the collocated reference picture (as signaled in the slice header), TMV is set equal to MV'.
   c. Suppose the center point of the current block is (x0, y0), then locate a corresponding position of (x0,y0) as M=(x0+MV'x, y0+MV'y) in the collocated picture. Find the block Z covering M.
      i. If Z is intra-coded, then ATMVP is unavailable;
      ii. If Z is inter-coded, MVZ_0 and MVZ_1 for the two lists of block Z are scaled to (Reflist 0 index 0) and (Reflist 1 index 0) as MVdefault0, MVdefault1, and stored.
   d. For each 8×8 sub-block, suppose its center point is (xOS, yOS), then locate a corresponding position of (xOS, yOS) as MS=(xOS+MV'x, yOS+MV'y) in the collocated picture. Find the block ZS covering MS.
      i. If ZS is intra-coded, MVdefault0, MVdefault1 are assigned to the sub-block;
      ii. If ZS is inter-coded, MVZS_0 and MVZS_1 for the two lists of block ZS are scaled to (Reflist 0 index 0) and (Reflist 1 index 0) and are assigned to the sub-block;

MV Clipping and Masking in ATMVP:

When locating a corresponding position such as M or MS in the collocated picture, it is clipped to be inside a pre-defined region. The CTU size is S×S, S=128 in VTM-3.0. Suppose the top-left position of the collocated CTU is (xCTU, yCTU), then the corresponding position M or MS at (xN, yN) will be clipped into the valid region xCTU<=xN<xCTU+S+4; yCTU<=yN<yCTU+S.

Besides Clipping, (xN, yN) is also masked as xNxN&MASK, yNyN&MASK, where MASK is an integer equal to ~($2^N$−1), and N=3, to set the lowest 3 bits to be 0. So xN and yN must be numbers which are times of 8. ("~" represents the bitwise complement operator).

Figure 24:
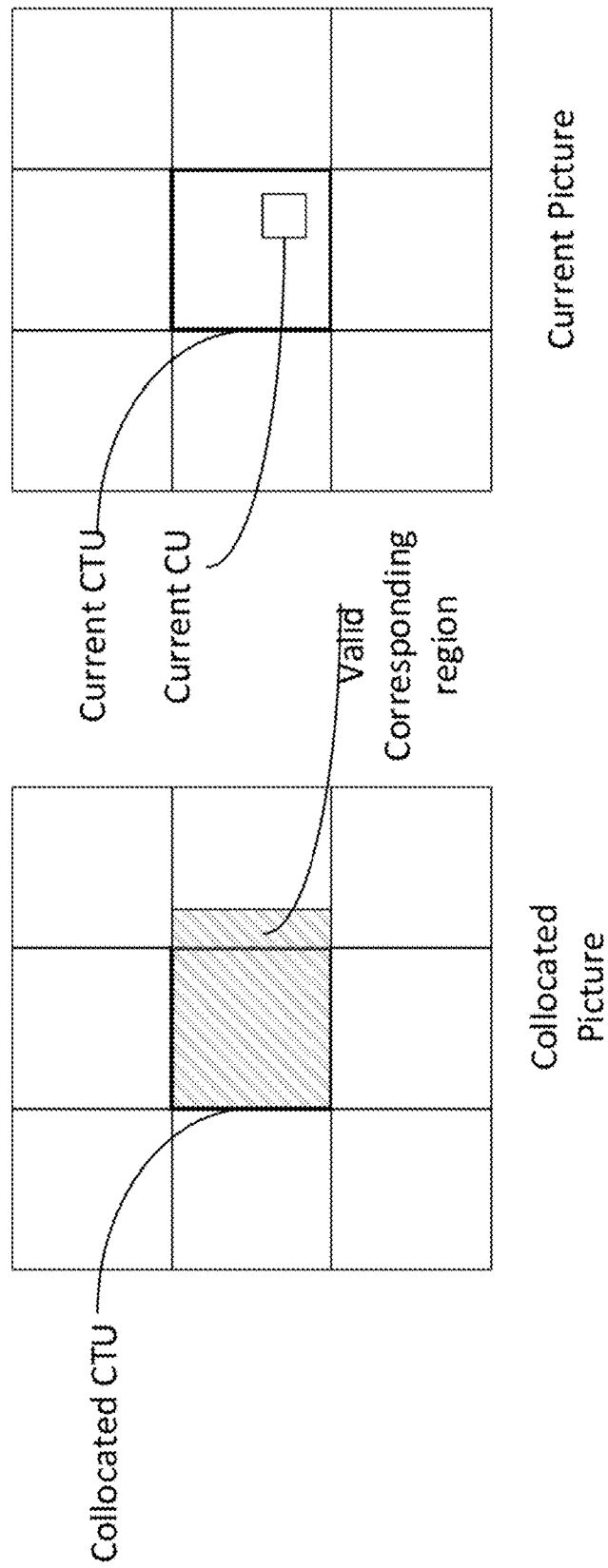
FIG. 24 shows an example of a valid corresponding region in the collocated picture.

FIG. 24 shows an example of a valid corresponding region in the collocated picture.

2.3.5.1.3 Syntax Design in Slice Header

```
if( sps_temporal_mvp_enabled_flag )
    slice_temporal_mvp_enabled_flag                                u(1)
if( slice_type = = B)
    mvd_l1_zero_flag                                               u(1)
if( slice_temporal_mvp_enabled_flag ) {
    if( slice_type = = B )
        collocated_from_l0_flag                                    u(1)
}
...
if(!sps_affine_enabled_flag){
    if(!sps_sbtmvp_enabled_flag)
        MaxSubBlockMergeListSize = 0
```

```
    else
        MaxSubBlockMergeListSize = 1
    }
    else {
        five_minus_max_num_affine_merge_cand                                    ue(v)
        MaxSubBlockMergeListSize = 5- five_minus_max_num_affine_merge_cand
    }
```

2.3.5.2 Regular Merge List

Different from the merge list design, in VVC, the history-based motion vector prediction (HMVP) method is employed.

Figure 25:
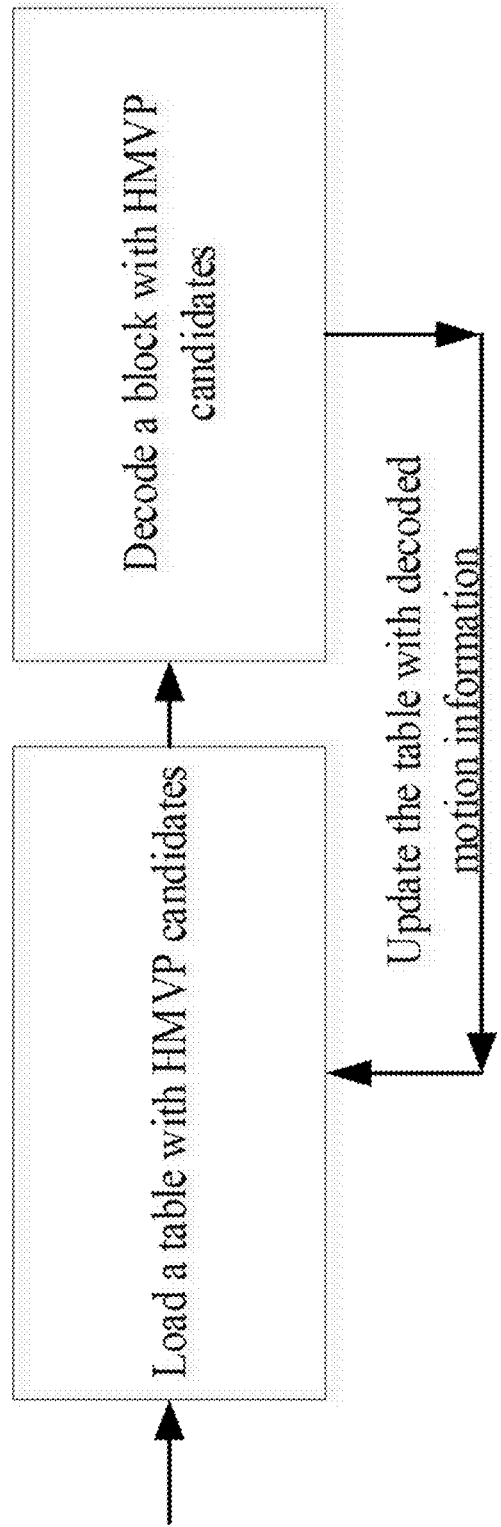
FIG. 25 shows an example flowchart for history based motion vector prediction.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new slice. Whenever there is an inter-coded block, the associated motion information is added to the last entry of the table as a new HMVP candidate. The overall coding flow is depicted in FIG. 25.

Figure 26:
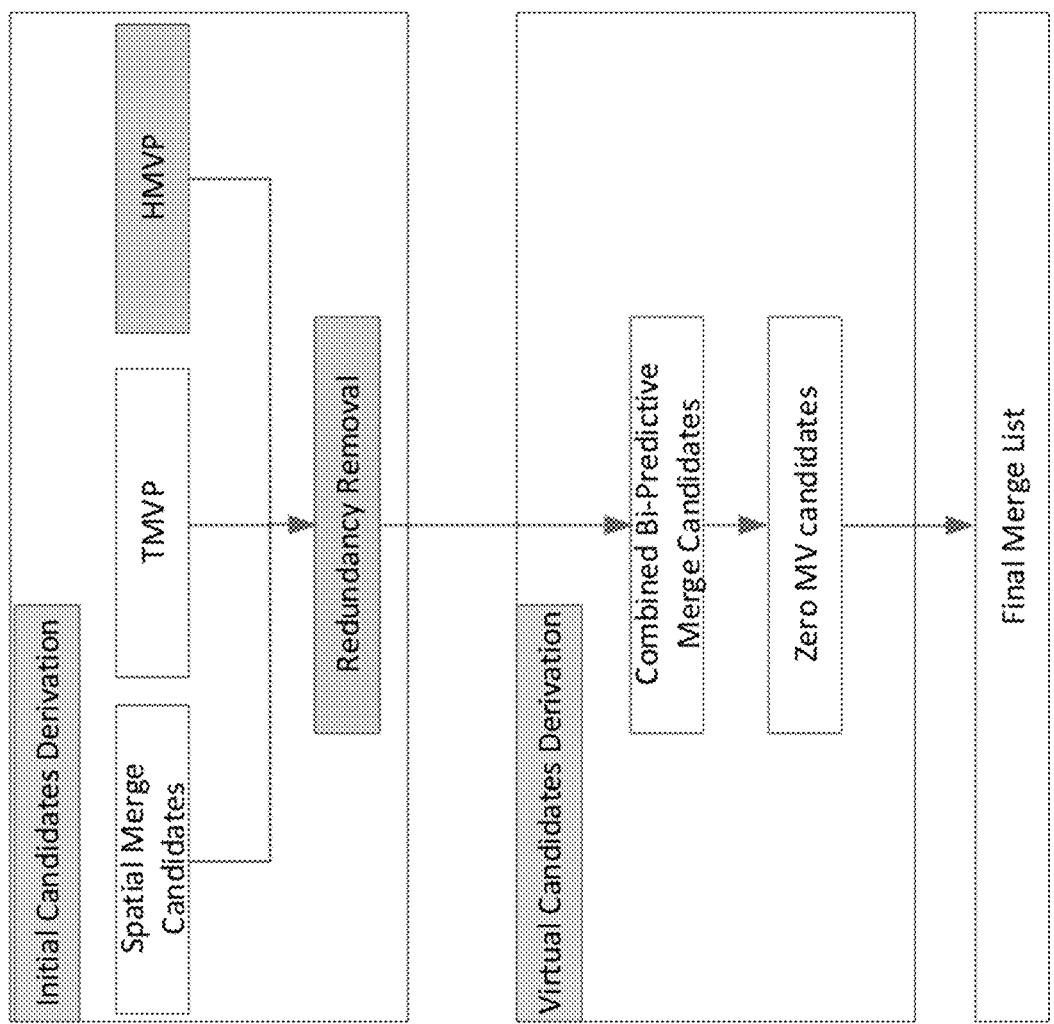
FIG. 26 shows modified merge list construction process.

HMVP candidates could be used in both AMVP and merge candidate list construction processes. FIG. 26 depicts the modified merge candidate list construction process (highlighted in blue). When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

2.4 MV Rounding

In VVC, when MV is right shifted, it is asked to be rounded toward zero. In a formulated way, for a MV(MVx, MVy) to be right shifted with N bits, the result MV'(MVx', MVy') will be derived as:

$$MVx'=(MVx+(1<<N)>>1)-(MVx>=0?1:0))>>N;$$

$$MVy'=(MVy+(1<<N)>>1)-(MVy>=0?1:0))>>N;$$

2.5 Embodiments of Reference Picture Resampling (RPR)

ARC, a.k.a. reference picture resampling (RPR) has been incorporated in some existing and upcoming video standards.

In some embodiments of RPR, TMVP is disabled if the collocated picture has a different resolution to the current picture. Besides, BDOF and DMVR are disabled when the reference picture has a different resolution to the current picture.

To handle the normal MC when the reference picture has a different resolution than the current picture, the interpolation section is defined as below:

8.5.6.3 Fractional Sample Interpolation Process
8.5.6.3.1 General
Inputs to this process are:
a luma location (xSb, ySb) specifying the top-left sample of the current coding subblock relative to the top-left luma sample of the current picture,
a variable sbWidth specifying the width of the current coding subblock,
a variable sbHeight specifying the height of the current coding subblock,
a motion vector offset mvOffset,
a refined motion vector refMvLX,
the selected reference picture sample array refPicLX,
the half sample interpolation filter index hpelIfIdx,
the bi-directional optical flow flag bdofFlag,
a variable cIdx specifying the colour component index of the current block.

Outputs of this process are:
an (sbWidth+brdExtSize)×(sbHeight+brdExtSize) array predSamplesLX of prediction sample values.

The prediction block border extension size brdExtSize is derived as follows:

$$brdExtSize=(bdofFlag||(inter\_affine\_flag[xSb][ySb] \&\& sps\_affine\_prof\_enabled\_flag))?2:0 \quad (8\text{-}752)$$

The variable fRefWidth is set equal to the PicOutputWidthL of the reference picture in luma samples.
The variable fRefHeight is set equal to PicOutputHeightL of the reference picture in luma samples.
The motion vector mvLX is set equal to (refMvLX−mvOffset).

If cIdx is equal to 0, the following applies:
The scaling factors and their fixed-point representations are defined as $$hori\_scale\_fp=((fRefWidth<<14)+(PicOutputWidthL>>1))/PicOutputWidthL \quad (8\text{-}753)$$

$$vert\_scale\_fp=((fRefHeight<<14)+(PicOutputHeightL>>1))/PicOutputHeightL \quad (8\text{-}754)$$

Let (xIntL, yIntL) be a luma location given in full-sample units and (xFracL, yFracL) be an offset given in 1/16-sample units. These variables are used only in this clause for specifying fractional-sample locations inside the reference sample arrays refPicLX.

The top-left coordinate of the bounding block for reference sample padding $(xSbInt_L, ySbInt_L)$ is set equal to $(xSb+(mvLX[0]>>4), ySb+(mvLX[1]>>4))$.

For each luma sample location $(x_L=0 \ldots sbWidth-1+brdExtSize, y_L=0 \ldots sbHeight-1+brdExtSize)$ inside the prediction luma sample array predSamplesLX, the corresponding prediction luma sample value predSamplesLX$[x_L][y_L]$ is derived as follows:

Let $(refxSb_L, refySb_L)$ and $(refx_L, refy_L)$ be luma locations pointed to by a motion vector (refMvLX[0], refMvLX[1]) given in 1/16-sample units. The variables $refxSb_L$, $refx_L$, $refySb_L$, and $refy_L$ are derived as follows:

$$refxSb_L=((xSb<<4)+refMvLX[0])*hori\_scale\_fp \quad (8\text{-}755)$$

$$refx_L=((Sign(refxSb)*((Abs(refxSb)+128)>>8)+x_L* ((hori\_scale\_fp+8)>>4))+32)>>6 \quad (8\text{-}756)$$

$\mathrm{ref}ySb_L = ((ySb<<4) + \mathrm{ref}MvLX[1]) * \mathrm{vert\_scale\_fp}$ (8-757)

$\mathrm{ref}yL = ((\mathrm{Sign}(\mathrm{ref}ySb) * ((\mathrm{Abs}(\mathrm{ref}ySb) + 128) >> 8) + yL * ((\mathrm{vert\_scale\_fp} + 8) >> 4)) + 32) >> 6$ (8-758)

The variables $xInt_L$, $yInt_L$, $xFrac_L$ and $yFrac_L$ are derived as follows:

$xInt_L = \mathrm{ref}x_L >> 4$ (8-759)

$yInt_L = \mathrm{ref}y_L >> 4$ (8-760)

$xFrac_L = \mathrm{ref}x_L \ \& \ 15$ (8-761)

$yFrac_L = \mathrm{ref}y_L \ \& \ 15$ (8-762)

If bdofFlag is equal to TRUE or (sps_affine_prof_enabled_flag is equal to TRUE and inter_affine_flag[xSb][ySb] is equal to TRUE), and one or more of the following conditions are true, the prediction luma sample value predSamplesLX[$x_L$][$y_L$] is derived by invoking the luma integer sample fetching process as specified in clause 8.5.6.3.3 with ($xInt_L$+($xFrac_L>>3$)−1), $yInt_L$+($yFrac_L>>3$)−1) and refPicLX as inputs.
1. $x_L$ is equal to 0.
2. $x_L$ is equal to sbWidth+1.
3. $y_L$ is equal to 0.
4. $y_L$ is equal to sbHeight+1.

Otherwise, the prediction luma sample value predSamplesLX[xL][yL] is derived by invoking the luma sample 8-tap interpolation filtering process as specified in clause 8.5.6.3.2 with (xIntL−(brdExtSize>0?1:0), yIntL−(brdExtSize>0?1:0)), (xFracL, yFracL), (xSbInt$_L$, ySbInt$_L$), refPicLX, hpelIfIdx, sbWidth, sbHeight and (xSb, ySb) as inputs.

Otherwise (cIdx is not equal to 0), the following applies:
Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.

The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 . . . sbWidth−1, yC=0 . . . sbHeight−1) inside the prediction chroma sample arrays predSamplesLX, the corresponding prediction chroma sample value predSamplesLX[xC][yC] is derived as follows:
Let ($\mathrm{ref}xSb_C$, $\mathrm{ref}ySb_C$) and ($\mathrm{ref}x_C$, $\mathrm{ref}y_C$) be chroma locations pointed to by a motion vector (mvLX[0], mvLX[1]) given in 1/32-sample units. The variables $\mathrm{ref}xSb_C$, $\mathrm{ref}ySb_C$, $\mathrm{ref}x_C$ and $\mathrm{ref}y_C$ are derived as follows:

$\mathrm{ref}xSb_C = ((xSb/\mathrm{SubWidth}C<<5) + mvLX[0]) * \mathrm{hori\_scale\_fp}$ (8-763)

$\mathrm{ref}x_C = ((\mathrm{Sign}(\mathrm{ref}xSb_C) * ((\mathrm{Abs}(\mathrm{ref}xSb_C) + 256) >> 9) + xC * ((\mathrm{hori\_scale\_fp} + 8) >> 4)) + 16) >> 5$ (8-764)

$\mathrm{ref}ySb_C = ((ySb/\mathrm{SubHeight}C<<5) + mvLX[1]) * \mathrm{vert\_scale\_fp}$ (8-765)

$\mathrm{ref}y_C = ((\mathrm{Sign}(\mathrm{ref}ySb_C) * ((\mathrm{Abs}(\mathrm{ref}ySb_C) + 256) >> 9) + yC * ((\mathrm{vert\_scale\_fp} + 8) >> 4)) + 16) >> 5$ (8-766)

The variables $xInt_C$, $yInt_C$, $xFrac_C$ and $yFrac_C$ are derived as follows:

$xInt_C = \mathrm{ref}x_C >> 5$ (8-767)

$yInt_C = \mathrm{ref}y_C >> 5$ (8-768)

$xFrac_C = \mathrm{ref}x_C \ \& \ 31$ (8-769)

$yFrac_C = \mathrm{ref}y_C \ \& \ 31$ (8-770)

The prediction sample value predSamplesLX[xC][yC] is derived by invoking the process specified in clause 8.5.6.3.4 with ($xInt_C$, $yInt_C$), ($xFrac_C$, $yFrac_C$), (xSbIntC, ySbIntC), sbWidth, sbHeight and refPicLX as inputs.

8.5.6.3.2 Luma Sample Interpolation Filtering Process

Inputs to this Process are:
a luma location in full-sample units ($xInt_L$, $yInt_L$),
a luma location in fractional-sample units ($xFrac_L$, $yFrac_L$),
a luma location in full-sample units ($xSbInt_L$, $ySbInt_L$) specifying the top-left sample of the bounding block for reference sample padding relative to the top-left luma sample of the reference picture,
the luma reference sample array $\mathrm{refPicLx}_L$,
the half sample interpolation filter index hpelIfIdx,
a variable sbWidth specifying the width of the current subblock,
a variable sbHeight specifying the height of the current subblock,
a luma location (xSb, ySb) specifying the top-left sample of the current subblock relative to the top-left luma sample of the current picture, Output of this process is a predicted luma sample value $\mathrm{predSampleLx}_L$ The variables shift1, shift2 and shift3 are derived as follows:
The variable shift1 is set equal to Min(4, BitDepth$_Y$−8), the variable shift2 is set equal to 6 and the variable shift3 is set equal to Max(2, 14−BitDepth$_Y$).

The variable picW is set equal to pic_width_in_luma_samples and the variable picH is set equal to pic_height_in_luma_samples.

The luma interpolation filter coefficients $f_L[p]$ for each 1/16 fractional sample position p equal to $xFrac_L$ or $yFrac_L$ are derived as follows:
If MotionModelIdc[xSb][ySb] is greater than 0, and sbWidth and sbHeight are both equal to 4, the luma interpolation filter coefficients $f_L[p]$ are specified in Table 8-12.
Otherwise, the luma interpolation filter coefficients $f_L[p]$ are specified in Table 8-11 depending on hpelIfIdx.

The luma locations in full-sample units ($xInt_i$, $yInt_i$) are derived as follows for i=0 . . . 7:
If subpic_treated_as_pic_flag[SubPicIdx] is equal to 1, the following applies:

$xInt_i = \mathrm{Clip3}(\mathrm{SubPicLeftBoundaryPos}, \mathrm{SubPicRightBoundaryPos}, xInt_L + i - 3)$ (8-771)

$yInt_i = \mathrm{Clip3}(\mathrm{SubPicTopBoundaryPos}, \mathrm{SubPicBotBoundaryPos}, yInt_L + i - 3)$ (8-772)

Otherwise (subpic_treated_as_pic_flag[SubPicIdx] is equal to 0), the following applies:

$xInt_i = \mathrm{Clip3}(0, picW-1, \mathrm{sps\_ref\_wraparound\_enabled\_flag}?\mathrm{Clip}H((\mathrm{sps\_ref\_wraparound\_offset\_minus1}+1)*\mathrm{MinCbSize}Y, picW, xInt_L+i-3): xInt_L+i-3)$ (8-773)

$yInt_i = \mathrm{Clip3}(0, picH-1, yInt_L + i - 3)$ (8-774)

The luma locations in full-sample units are further modified as follows for i=0 . . . 7:

$$xInt_i = Clip3(xSbInt_L-3, xSbInt_L+sbWidth+4, xInt_i) \quad (8\text{-}775)$$

$$yInt_i = Clip3(ySbInt_L-3, ySbInt_L+sbHeight+4, yInt_i) \quad (8\text{-}776)$$

The predicted luma sample value predSampleLx$_L$ is derived as follows:

If both xFrac$_L$ and yFrac$_L$ are equal to 0, the value of predSampleLx$_L$ is derived as follows:

$$predSampleLx_L = refPicLx_L[xInt_3][yInt_3] << shift3 \quad (8\text{-}777)$$

Otherwise, if xFrac$_L$ is not equal to 0 and yFrac$_L$ is equal to 0, the value of predSampleLx$_L$ is derived as follows:

$$predSampleLX_L = \left(\sum_{i=0}^{7} f_L[xFrac_L][i] * refPicLX_L[xInt_i][yInt_3]\right) >> shift1 \quad (8\text{-}778)$$

Otherwise, if xFrac$_L$ is equal to 0 and yFrac$_L$ is not equal to 0, the value of predSampleLx$_L$ is derived as follows:

$$predSampleLX_L = \left(\sum_{i=0}^{7} f_L[yFrac_L][i] * refPicLX_L[xInt_3][yInt_i]\right) >> shift1 \quad (8\text{-}779)$$

Otherwise, if xFrac$_L$ is not equal to 0 and yFrac$_L$ is not equal to 0, the value of predSampleLx$_L$ is derived as follows:

The sample array temp[n] with n=0..7, is derived as follows:

$$temp[n] = \left(\sum_{i=0}^{7} f_L[xFrac_L][i] * refPicLX_L[xInt_i][yInt_n]\right) >> shift1 \quad (8\text{-}780)$$

The predicted luma sample value predSampleLx$_L$ is derived as follows:

$$predSampleLX_L = \left(\sum_{i=0}^{7} f_L[yFrac_L][i] * temp[i]\right) >> shift2 \quad (8\text{-}781)$$

TABLE 8-11

Specification of the luma interpolation filter coefficients f$_L$[ p ] for each 1/16 fractional sample position p.

| Fractional sample position p | interpolation filter coefficients | | | | | | | |
|---|---|---|---|---|---|---|---|---|
| | f$_L$[ p ][ 0 ] | f$_L$[ p ][ 1 ] | f$_L$[ p ][ 2 ] | f$_L$[ p ][ 3 ] | f$_L$[ p ][ 4 ] | f$_L$[ p ][ 5 ] | f$_L$[ p ][ 6 ] | f$_L$[ p ][ 7 ] |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 (hpelIfIdx == 0) | −1 | 4 | −11 | 40 | 40 | −11 | 4 | −1 |
| 8 (hpelIfIdx == 1) | 0 | 3 | 9 | 20 | 20 | 9 | 3 | 0 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

TABLE 8-12

Specification of the luma interpolation filter coefficients f$_L$[ p ] for each 1/16 fractional sample position p for affine motion mode.

| Fractional sample position p | interpolation filter coefficients | | | | | | | |
|---|---|---|---|---|---|---|---|---|
| | f$_L$[ p ][ 0 ] | f$_L$[ p ][ 1 ] | f$_L$[ p ][ 2 ] | f$_L$[ p ][ 3 ] | f$_L$[ p ][ 4 ] | f$_L$[ p ][ 5 ] | f$_L$[ p ][ 6 ] | f$_L$[ p ][ 7 ] |
| 1 | 0 | 1 | −3 | 63 | 4 | −2 | 1 | 0 |
| 2 | 0 | 1 | −5 | 62 | 8 | −3 | 1 | 0 |
| 3 | 0 | 2 | −8 | 60 | 13 | −4 | 1 | 0 |
| 4 | 0 | 3 | −10 | 58 | 17 | −5 | 1 | 0 |
| 5 | 0 | 3 | −11 | 52 | 26 | −8 | 2 | 0 |
| 6 | 0 | 2 | −9 | 47 | 31 | −10 | 3 | 0 |
| 7 | 0 | 3 | −11 | 45 | 34 | −10 | 3 | 0 |
| 8 | 0 | 3 | −11 | 40 | 40 | −11 | 3 | 0 |
| 9 | 0 | 3 | −10 | 34 | 45 | −11 | 3 | 0 |
| 10 | 0 | 3 | −10 | 31 | 47 | −9 | 2 | 0 |
| 11 | 0 | 2 | −8 | 26 | 52 | −11 | 3 | 0 |
| 12 | 0 | 1 | −5 | 17 | 58 | −10 | 3 | 0 |

TABLE 8-12-continued

Specification of the luma interpolation filter coefficients $f_L[\,p\,]$ for each 1/16 fractional sample position p for affine motion mode.

| Fractional sample position p | interpolation filter coefficients | | | | | | | |
|---|---|---|---|---|---|---|---|---|
| | $f_L[\,p\,][\,0\,]$ | $f_L[\,p\,][\,1\,]$ | $f_L[\,p\,][\,2\,]$ | $f_L[\,p\,][\,3\,]$ | $f_L[\,p\,][\,4\,]$ | $f_L[\,p\,][\,5\,]$ | $f_L[\,p\,][\,6\,]$ | $f_L[\,p\,][\,7\,]$ |
| 13 | 0 | 1 | −4 | 13 | 60 | −8 | 2 | 0 |
| 14 | 0 | 1 | −3 | 8 | 62 | −5 | 1 | 0 |
| 15 | 0 | 1 | −2 | 4 | 63 | −3 | 1 | 0 |

8.5.6.3.3 Luma Integer Sample Fetching Process

Inputs to this Process are:
- a luma location in full-sample units ($xnt_L$, $yInt_L$),
- the luma reference sample array $refPicLx_L$, Output of this process is a predicted luma sample value $predSampleLx_L$ The variable shift is set equal to Max(2, 14−$BitDepth_Y$).
The variable picW is set equal to pic_width_in_luma_samples and the variable picH is set equal to pic_height_in_luma_samples.
The luma locations in full-sample units (xInt, yInt) are derived as follows:

$xInt=Clip3(0,picW-1,sps\_ref\_wraparound\_$
$enabled\_flag?ClipH((sps\_ref\_wraparound\_off-$
$set\_minus1+1)*MinCbSizeY,picW,xIntL):xInt_L)$  (8-782)

$yInt=Clip3(0,picH-1,yInt_L)$  (8-783)

The predicted luma sample value $predSampleLx_L$ is derived as follows:

$predSampleLx_L=refPicLx_L[xInt][yInt]<<shift3$  (8-784)

8.5.6.3.4 Chroma Sample Interpolation Process

Inputs to this Process are:
- a chroma location in full-sample units ($xInt_C$, $yInt_C$),
- a chroma location in 1/32 fractional-sample units ($xFrac_C$, $yFrac_C$),
- a chroma location in full-sample units (xSbIntC, ySbIntC) specifying the top-left sample of the bounding block for reference sample padding relative to the top-left chroma sample of the reference picture,
- a variable sbWidth specifying the width of the current subblock,
- a variable sbHeight specifying the height of the current subblock,
- the chroma reference sample array $refPicLX_C$.

Output of this process is a predicted chroma sample value $predSampleLX_C$

The variables shift1, shift2 and shift3 are derived as follows:
  The variable shift1 is set equal to Min(4, $BitDepth_C$−8), the variable shift2 is set equal to 6 and the variable shift3 is set equal to Max(2, 14−$BitDepth_C$).
  The variable $picW_C$ is set equal to pic_width_in_luma_samples/SubWidthC and the variable $picH_C$ is set equal to pic_height_in_luma_samples/SubHeightC.

The chroma interpolation filter coefficients $f_C[p]$ for each 1/32 fractional sample position p equal to $xFrac_C$ or $yFrac_C$ are specified in Table 8-13.
The variable xOffset is set equal to (sps_ref_wraparound_offset_minus1+1)*MinCbSizeY)/SubWidthC.
The chroma locations in full-sample units ($xInt_i$, $yInt_i$) are derived as follows for i=0 . . . 3:

If subpic_treated_as_pic_flag[SubPicIdx] is equal to 1, the following applies:

$xInt_i=Clip3(SubPicLeftBoundaryPos/SubWidthC,$
$SubPicRightBoundaryPos/SubWidthC,xInt_L+i)$  (8-785)

$yInt_i=Clip3(SubPicTopBoundaryPos/SubHeightC,$
$SubPicBotBoundaryPos/SubHeightC,yInt_L+i)$  (8-786)

Otherwise (subpic_treated_as_pic_flag[SubPicIdx] is equal to 0), the following applies:

$xInt_i=Clip3(0,picW_C-1,sps\_ref\_wraparound\_$
$enabled\_flag?ClipH(xOffset,picW_C,xInt_C+i-1):$
$xInt_C+i-1)$  (8-787)

$yInt_i=Clip3(0,picH_C-1,yInt_C+i-1)$  (8-788)

The chroma locations in full-sample units ($xInt_i$, $yInt_i$) are further modified as follows for i=0 . . . 3:

$xInt_i=Clip3(xSbIntC-1,xSbIntC+sbWidth+2,xInt_i)$  (8-789)

$yInt_i=Clip3(ySbIntC-1,ySbIntC+sbHeight+2,yInt_i)$  (8-790)

The predicted chroma sample value $predSampleLX_C$ is derived as follows:
  If both $xFrac_C$ and $yFrac_C$ are equal to 0, the value of $predSampleLX_C$ is derived as follows:

$predSampleLX_C=refPicLX_C[xInt_1][yInt_1]<<shift3$  (8-791)

Otherwise, if $xFrac_C$ is not equal to 0 and $yFrac_C$ is equal to 0, the value of $predSampleLX_C$ is derived as follows:

$$predSampleLX_C = \left(\sum\nolimits_{i=0}^{3} fc[xFrac_C][i] * refPicLX_C[xInt_i][yInt_1]\right) >> shift1 \quad (8\text{-}792)$$

Otherwise, if $xFrac_C$ is equal to 0 and $yFrac_C$ is not equal to 0, the value of $predSampleLX_C$ is derived as follows:

$$predSampleLX_C = \left(\sum\nolimits_{i=0}^{3} fc[yFrac_C][i] * refPicLX_C[xInt_1][yInt_i]\right) >> shift1 \quad (8\text{-}793)$$

Otherwise, if $xFrac_C$ is not equal to 0 and $yFrac_C$ is not equal to 0, the value of $predSampleLX_C$ is derived as follows:
  The sample array temp[n] with n=0 . . . 3, is derived as follows:

$$temp[n] = \left(\sum\nolimits_{i=0}^{3} fc[xFrac_C][i] * refPicLX_C[xInt_i][yInt_n]\right) >> shift1 \quad (8\text{-}794)$$

The predicted chroma sample value $predSampleLX_C$ is derived as follows:

predSample$LX_C$=($f_C$[yFrac$_C$][0]*temp[0]+$f_C$[yFrac$_C$]
[1]*temp[1]+$f_C$[yFrac$_C$][2]*temp[2]+$f_C$[yFrac$_C$]
[3]*temp[3])>>shift2 (8-795)

TABLE 8-13

Specification of the chroma interpolation filter coefficients
$f_C$[ p ] for each 1/32 fractional sample position p.

| Fractional sample position p | interpolation filter coefficients | | | |
|---|---|---|---|---|
| | $f_C$[ p ][ 0 ] | $f_C$[ p ][ 1 ] | $f_C$[ p ][ 2 ] | $f_C$[ p ][ 3 ] |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

2.6 Embodiments Employing Sub-Pictures

With the current syntax design of sub-pictures in an existing implementation, the locations and dimensions of sub-pictures are derived as below:

| | |
|---|---|
| subpics_present_flag | u(1) |
| if( subpics_present_flag ) { | |
|   max_subpics_minus1 | u(8) |
|   subpic_grid_col_width_minus1 | u(v) |
|   subpic_grid_row_height_minus1 | u(v) |
|   for( i = 0; i < NumSubPicGridRows; i++ ) | |
|     for( j = 0; j < NumSubPicGridCols; j++ ) | |
|       subpic_grid_idx[ i ][ j ] | u(v) |
|   for( i = 0; i <= NumSubPics; i++ ) { | |
|     subpic_treated_as_pic_flag[ i ] | u(1) |
|     loop_filter_across_subpic_enabled_flag[ i ] | u(1) |
|   } | |
| } | | subpics_present_flag equal to 1 indicates that subpicture parameters are present in the present in the SPS RBSP syntax. subpics_present_flag equal to 0 indicates that sub-picture parameters are not present in the present in the SPS RBSP syntax.

NOTE 2—When a bitstream is the result of a sub-bitstream extraction process and contains only a subset of the subpictures of the input bitstream to the sub-bitstream extraction process, it might be required to set the value of subpics_present_flag equal to 1 in the RBSP of the SPSs.

max_subpics_minus1 plus 1 specifies the maximum number of subpictures that may be present in the CVS. max_subpics_minus1 shall be in the range of 0 to 254. The value of 255 is reserved for future use by ITU-T|ISO/IEC.

subpic_grid_col_width_minus1 plus 1 specifies the width of each element of the subpicture identifier grid in units of 4 samples. The length of the syntax element is Ceil(Log 2(pic_width_max_in_luma_samples/4)) bits.

The variable NumSubPicGridCols is derived as follows:

NumSubPicGridCols=(pic_width_max_in_lu-
ma_samples+subpic_grid_col_width_minus1*4+
3)/(subpic_grid_col_width_minus1*4+4) (7-5)

subpic_grid_row_height_minus1 plus 1 specifies the height of each element of the subpicture identifier grid in units of 4 samples. The length of the syntax element is Ceil(Log 2(pic_height_max_in_luma_samples/4)) bits.

The variable NumSubPicGridRows is derived as follows:

NumSubPicGridRows=(pic_height_max_in_lu-
ma_samples+subpic_grid_row_height_mi-
nus1*4+3)/(subpic_grid_row_height_minus1*4+
4) (7-6)

subpic_grid_idx[i][j] specifies the subpicture index of the grid position (i, j). The length of the syntax element is Ceil(Log 2(max_subpics_minus1+1)) bits.

The variables SubPicTop[subpic_grid_idx[i][j]], SubPicLeft[subpic_grid_idx[i][j]], SubPicWidth[subpic_grid_idx[i][j]], SubPicHeight[subpic_grid_idx[i][j]], and NumSubPics are derived as follows:

NumSubPics=0 for(*i*=0;*i*.<NumSubPicGridRows;*i*++){ for(*j*=0;*j*<NumSubPicGridCols;*j*++){ if(*i*==0)

SubPicTop[subpic_grid_idx[*i*][*j*]]=0 else if(subpic_grid_idx[*i*][*j*]!=subpic_grid_idx[*i*−1]
[*j*]){

SubPicTop[subpic_grid_idx[*i*][*j*]]=*i*

SubPicHeight[subpic_grid_idx[*i*−1][*j*]]=
*i*−SubPicTop[subpic_grid_idx[*i*−1][*j*]]

} if(*j*==0)

SubPicLeft[subpic_grid_idx[*i*][*j*]]=0 else if(subpic_grid_idx[*i*][*j*]!=subpic_grid_idx[*i*][*j*−
1]){

SubPicLeft[subpic_grid_idx[*i*][*j*]]=*j*

SubPicWidth[subpic_grid_idx[*i*][*j*]]=
*j*−SubPicLeft[subpic_grid_idx[*i*][*j*−1]]

} if(*i*==NumSubPicGridRows−1)

SubPicHeight[subpic_grid_idx[*i*][*j*]]=

*i*−SubPicTop[subpic_grid_idx[*i*−1][*j*]]+1
    if(*j*==NumSubPicGridRows−1)

SubPicWidth[subpic_grid_idx[*i*][*j*]]=

*j*−SubPicLeft[subpic_grid_idx[*i*][*j*−1]]+1 if(subpic_grid_idx[*i*][*j*]>NumSubPics)

NumSubPics=subpic_grid_idx[*i*][*j*]

}

}                                                                                                 (7-7)

subpic_treated_as_pic_flag[i] equal to 1 specifies that the i-th subpicture of each coded picture in the CVS is treated as a picture in the decoding process excluding in-loop filtering operations. subpic_treated_as_pic_flag[i] equal to 0 specifies that the i-th subpicture of each coded picture in the CVS is not treated as a picture in the decoding process excluding in-loop filtering operations. When not present, the value of subpic_treated_as_pic_flag[i] is inferred to be equal to 0.

2.7 Combined Inter-Intra Prediction (CIIP)

Combined Inter-Intra Prediction (CIIP) is adopted into VVC as a special merge candidate. It can only be enabled for a W×H block with W<=64 and H<=64.

3. Drawbacks of Existing Implementations

In the current design of VVC, ATMVP has following problems:
1) Whether to apply ATMVP is mismatched in slice level and in CU level;
2) In slice header, ATMVP may be enabled even if TMVP is disabled. Meanwhile, ATMVP flag is signaled before TMVP flag.
3) Masking is always done without considering whether MV is compressed;
4) The valid corresponding region may be too large;
5) The derivation of TMV is too complicated;
6) ATMVP may be unavailable in some cases and a better default MV is desirable.
7) The MV scaling methods in ATMVP may not be efficient;
8) ATMVP should consider the CPR cases;
9) A default zero affine merge candidate may be put into the list even when affine prediction is disabled.
10) Current picture is treated as a long-term reference picture while other pictures are treated as short-reference picture. For both ATMVP and TMVP candidates, the motion information from a temporal block in the collocated picture will be scaled to a reference picture with fixed reference index (i.e., 0 for each reference picture list in the current design). However, when CPR mode is enabled, the current picture is also treated as a reference picture and the current picture may be added to the reference picture list 0 (RefPicList0) with index equal to 0.
   a. For TMVP, if the temporal block is coded with CPR mode and reference picture of RefPicList0 is a short reference picture, the TMVP candidate is set to be unavailable.
   b. If the reference picture of the RefPicList0 with index equal to 0 is the current picture and current picture is the Intra Random Access Point (IRAP) picture, ATMVP candidate is set to be unavailable.
   c. For a ATMVP sub-block within a block, when deriving the sub-block's motion information from a temporal block, if the temporal block is coded with CPR mode, default ATMVP candidate (derived from a temporal block identified by the starting TMV and center position of the current block) is used to fill in the sub-block' motion information.
11) MV is right shifted to the integer precision, but not following the rounding rule in VVC.
12) The MV(MV$_x$, MV$_y$) used in ATMVP to locate a corresponding block in a different picture (e.g., the TMV in 0) is directly used since it points to the collocated picture. This is based on the assumption that all pictures are in the same resolution. However, when RPR is enabled, different picture resolutions may be utilized. Similar issues are existing for identification of corresponding blocks in a collocate picture to derive sub-block motion information.
13) If one block width or height is greater than 32, and max transform block size is 32, for a CIIP coded block, the intra prediction signal is generated with the CU size; while the inter prediction signal is generated with the TU size (recursively splitting current block to multiple 32×32 blocks). Using the CU to derive intra prediction signal results in less efficiency.

There are some problems with current design. Firstly, if the reference picture of the RefPicList0 with index equal to 0 is the current picture and current picture is not an IRAP picture, ATMVP procedure is still invoked, but it couldn't find any available ATMVP candidates since none of temporal motion vectors could be scaled to the current picture.

4. Examples of Embodiments and Techniques

Figure 27:
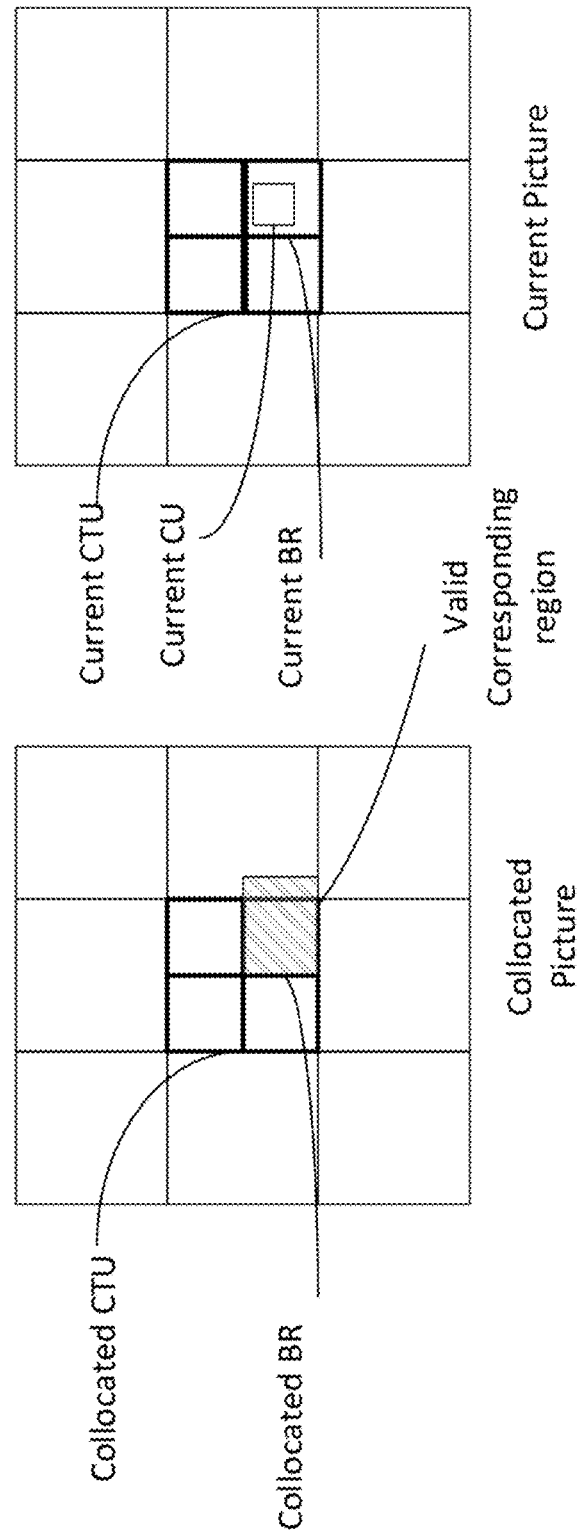
FIG. 27 shows an example embodiment of the proposed valid region when the current block is inside a basic region.

The itemized list of techniques and embodiments below should be considered as examples to explain general concepts. These techniques should not be interpreted in a narrow way. Furthermore, these techniques can be combined in any manner in encoder or decoder embodiments.
1. Whether TMVP is allowed and/or whether CPR is used should be considered to decide/parse the maximum number of candidates in the sub-block merge candidate list and/or to decide whether ATMVP candidate should be added to a candidate list. The maximum number of candidates in the sub-block merge candidate list is denoted as ML.
   a) In one example, ATMVP is inferred to be not applicable if either ATMVP usage flag is off (equal to 0), or TMVP is disabled, in the determination of or parsing the maximum number of candidates in the sub-block merge candidate list.
      i. In one example, the ATMVP usage flag is on (equal to 1) and TMVP is disabled, the ATMVP candidate is not added to the sub-block merge candidate list or the ATMVP candidate list.
      ii. In one example, the ATMVP usage flag is on (equal to 1) and TMVP is disabled, and the affine usage flag is off (equal to 0), then ML is set equal to 0, meaning that sub-block merge is not applicable.
      iii. In one example, the ATMVP usage flag is on (equal to 1) and TMVP is enabled, and the affine usage flag is off (equal to 0), then ML is set equal to 1.

b) In one example, ATMVP is inferred to be not applicable if either ATMVP usage flag is off (equal to 0), or the collocated reference picture of the current picture is the current picture itself, when decide or parse the maximum number of candidates in the sub-block merge candidate list.
   i. In one example, the ATMVP usage flag is on (equal to 1) and the collocated reference picture of the current picture is the current picture itself, the ATMVP candidate is not added to the sub-block merge candidate list or the ATMVP candidate list.
   ii. In one example, the ATMVP usage flag is on (equal to 1), and the collocated reference picture of the current picture is the current picture itself, and the affine usage flag is off (equal to 0), then ML is set equal to 0, meaning that sub-block merge is not applicable.
   iii. In one example, the ATMVP usage flag is on (equal to 1), and the collocated reference picture of the current picture is not the current picture itself, and the affine usage flag is off (equal to 0), then ML is set equal to 1.
c) In one example, ATMVP is inferred to be not applicable if ATMVP usage flag is off (equal to 0), or the reference picture with reference picture index 0 in reference list 0 is the current picture itself, when decide or parse the maximum number of candidates in the sub-block merge candidate list.
   i. In one example, the ATMVP usage flag is on (equal to 1) and the collocated reference picture with reference picture index 0 in reference list 0 is the current picture itself, the ATMVP candidate is not added to the sub-block merge candidate list or the ATMVP candidate list.
   ii. In one example, the ATMVP usage flag is on (equal to 1), and the reference picture with reference picture index 0 in reference list 0 is the current picture itself, and the affine usage flag is off (equal to 0), then ML is set equal to 0, meaning that sub-block merge is not applicable.
   iii. In one example, the ATMVP usage flag is on (equal to 1) and the reference picture with reference picture index 0 in reference list 0 is not the current picture itself, and the affine usage flag is off (equal to 0), then ML is set equal to 1.
d) In one example, ATMVP is inferred to be not applicable if ATMVP usage flag is off (equal to 0), or the reference picture with reference picture index 0 in reference list 1 is the current picture itself, when decide or parse the maximum number of candidates in the sub-block merge candidate list.
   i. In one example, the ATMVP usage flag is on (equal to 1) and the collocated reference picture with reference picture index 0 in reference list 1 is the current picture itself, the ATMVP candidate is not added to the sub-block merge candidate list or the ATMVP candidate list.
   ii. In one example, the ATMVP usage flag is on (equal to 1), and the reference picture with reference picture index 0 in reference list 1 is the current picture itself, and the affine usage flag is off (equal to 0), then ML is set equal to 0, meaning that sub-block merge is not applicable.
   iii. In one example, the ATMVP usage flag is on (equal to 1) and the reference picture with reference picture index 0 in reference list 1 is not the current picture itself, and the affine usage flag is off (equal to 0), then ML is set equal to 1.
2. It is proposed that ATMVP is disabled implicitly and no ATMVP flag is signaled if TMVP is disabled at slice/tile/picture level.
   a) In one example, ATMVP flag is signaled after the TMVP flag in slice header/tile header/PPS.
   b) In one example, ATMVP or/and TMVP flag may be not signaled in slice header/tile header/PPS and is only signaled in SPS header.
3. Whether and how to do mask the corresponding position in ATMVP depends on whether and how MVs are compressed. Suppose (xN, yN) is a corresponding position calculated with the coordinator of current block/sub-block and a starting motion vector (e.g., TMV) in the collocated picture
   a) In one example, (xN, yN) is not masked if MVs are not required to be compressed (e.g. sps_disable_motioncompression signaled in SPS is 1); Otherwise, (MVs are required to be compressed) (xN, yN) is masked as xN=xN&MASK, yN=yN& MASK, where MASK is an integer equal to $\sim(2^M-1)$, and M can be integers such as 3 or 4.
   b) Assume the MV compression method for MV storage result in each $2^K \times 2^K$ block share the same motion information and the mask in the ATMVP process is defined as $\sim(2^M-1)$. It is proposed that K may be unequal to M, e.g., M=K+1.
   c) The MASK used in ATMVP and TMVP may be the same, or they may be different.
4. In one example, the MV compression method can be flexible.
   a) In one example, the MV compression method can be selected between no compression, 8×8 compression (M=3 in Bullet 3.a), or 16×16 compression (M=4 in Bullet 3.a)
   b) In one example, the MV compression method may be signaled in VPS/SPS/PPS/slice header/tile group header.
   c) In one example, the MV compression method can be set differently in different standard profiles/levels/tiers.
5. The valid corresponding region in ATMVP may adaptive;
   a) For example, the valid corresponding region may depend on the width and height of the current block;
   b) For example, the valid corresponding region may depend on the MV compression method;
      i. In one example, the valid corresponding region is smaller if MV compression method is not used; the valid corresponding region is larger if MV compression method is used.
6. The valid corresponding region in ATMVP may be based on a basic region with size M×N smaller than a CTU region. For example, the CTU size in VTM-3.0 is 128×128, and the basic region size may be 64×64. Suppose the width and height of the current block is W and H.
   a) In one example, if W<=M and H<=N, meaning that the current block is inside a basic region, then the valid corresponding region in ATMVP is the collocated basic region and the extension in the collocated picture. FIG. 27 shows an example.
      i. For example, suppose the top-left position of the collocated basic region is (xBR, yBR), then the corresponding position at (xN, yN) will be clipped into the valid region xBR<=xN<xBR+M+4; yBR<=yN<yBR+N.

FIG. 27 shows an example embodiment of the proposed valid region when the current block is inside a Basic Region (BR).

Figure 28:
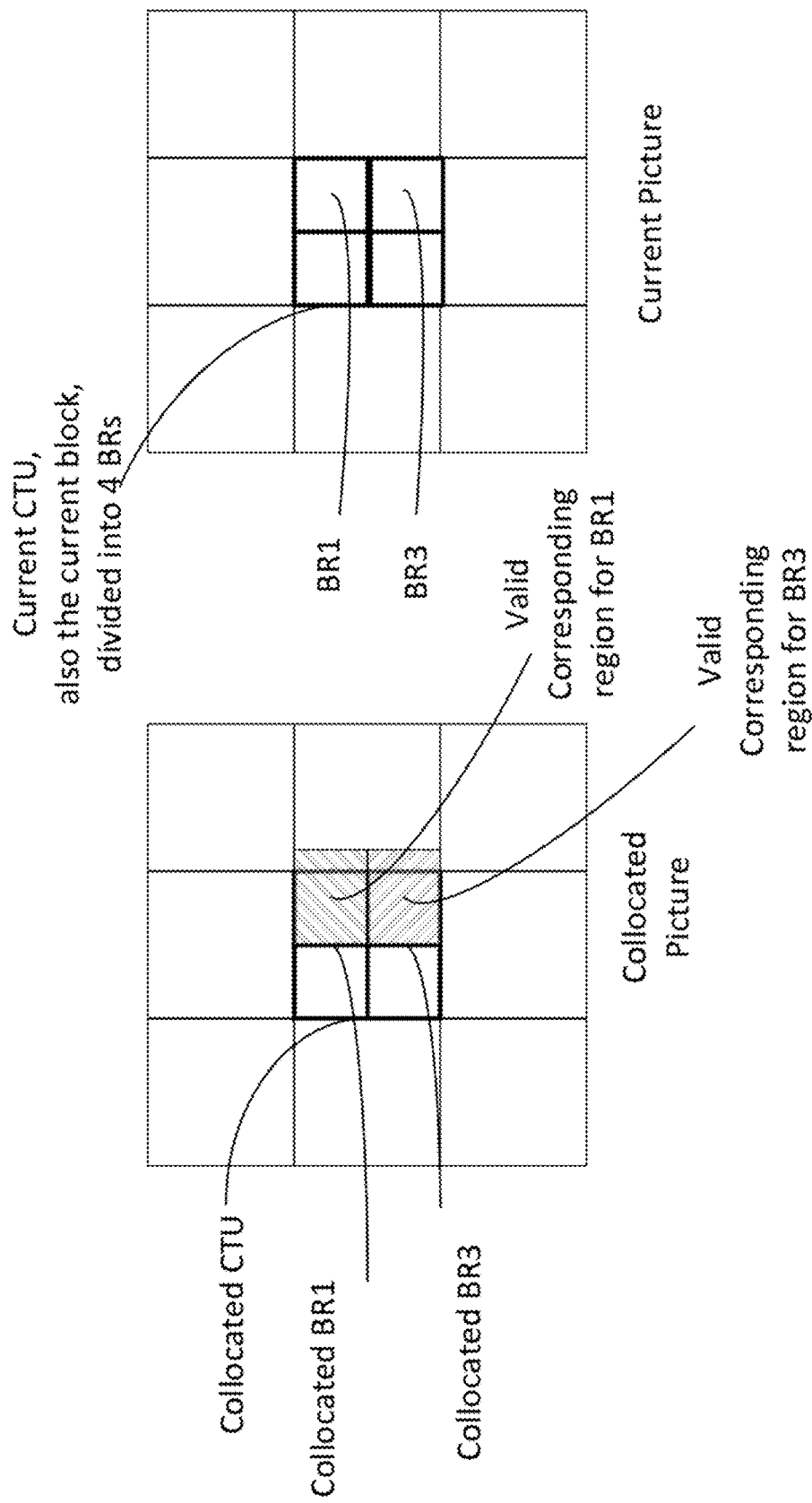
FIG. 28 shows an example embodiment of a valid region when the current block is not inside a basic region.

FIG. 28 shows an example embodiment of a valid region when the current block is not inside a basic region.

b) In one example, if W>M and H>N, meaning that the current block is not inside a basic region, then the current block is divided into several parts. Each part has an individual valid corresponding region in ATMVP. For a position A in the current block, its corresponding position B in the collocated block should be within the valid corresponding region of the part in which the position A locates.

i. For example, the current block is divided into non-overlapped basic regions. The valid corresponding region for one basic region is its collocated basic region and the extension in the collocated picture. FIG. 28 shows an example.

1. For example, suppose position A in the current block is in one basic region R. The collocated basic region of R in the collocated picture is denoted as CR. The corresponding position of A in the collocated block is position B. The top-left position of CR is (xCR, yCR), then position B at (xN, yN) will be clipped into the valid region xCR<=xN<xCR+M+4; yCR<=yN<yCR+N.

7. It is proposed the motion vector used in ATMVP to locate a corresponding block in a different picture (e.g., the TMV in 2.3.5.1.2) can be derived as:

a) In one example, TMV is always set equal to a default MV such as (0, 0).

i. In one example, the default MV is signaled in VPS/SPS/PPS/slice header/tile group header/CTU/CU.

b) In one example, TMV is set to be one MV stored in the HMVP table with the following methods;

i. If HMVP list is empty, TMV is set equal to a default MV such as (0, 0)

ii. Otherwise (HMVP list is not empty),

1. TMV may be set to equal to the first element stored in the HMVP table;

2. Alternatively, TMV may be set to equal to the last element stored in the HMVP table;

3. Alternatively, TMV may only be set equal to a specific MV stored in the HMVP table;

a. In one example, the specific MV refers to reference list 0.

b. In one example, the specific MV refers to reference list 1.

c. In one example, the specific MV refers to a specific reference picture in reference list 0, such as the reference picture with index 0.

d. In one example, the specific MV refers to a specific reference picture in reference list 1, such as the reference picture with index 0.

e. In one example, the specific MV refers to the collocated picture.

4. Alternatively, TMV may be set equal to the default MV if the specific MV (e.g., mentioned in bullet 3.) stored in the HMVP table cannot be found;

a. In one example, only the first element stored in the HMVP table is searched to find the specific MV.

b. In one example, only the last element stored in the HMVP table is searched to find the specific MV.

c. In one example, some or all elements stored in the HMVP table is searched to find the specific MV.

5. Alternatively, furthermore, TMV obtained from the HMVP cannot refer to the current picture itself.

6. Alternatively, furthermore, TMV obtained from the HMVP table may be scaled to the collocated picture if it does not refer to it.

c) In one example, TMV is set to be one MV of one specific neighbouring block. No other neighbouring blocks are involved.

i. The specific neighbouring block may be block A0, A1, B0, B1, B2 in FIG. 22.

ii. TMV may be set equal to the default MV if

1. The specific neighbouring block does not exist;

2. The specific neighbouring block is not inter-coded;

iii. TMV may only be set equal to a specific MV stored in the specific neighbouring block;

1. In one example, the specific MV refers to reference list 0.

2. In one example, the specific MV refers to reference list 1.

3. In one example, the specific MV refers to a specific reference picture in reference list 0, such as the reference picture with index 0.

4. In one example, the specific MV refers to a specific reference picture in reference list 1, such as the reference picture with index 0.

5. In one example, the specific MV refers to the collocated picture.

6. TMV may be set equal to the default MV if the specific MV stored in the specific neighbouring block cannot be found;

iv. TMV obtained from the specific neighbouring block may be scaled to the collocated picture if it does not refer to it.

v. TMV obtained from the specific neighbouring block cannot refer to the current picture itself.

8. MVdefault0 and MVdefault1 used in ATMVP as disclosed in 2.3.5.1.2 may be derived as a) In one example, MVdefault0 and MVdefault1 are set equal to (0,0);

b) In one example, MVdefaultX (X=0 or 1) is derived from HMVP, i. If HMVP list is empty, MVdefaultX is set equal to a predefined default MV such as (0, 0).

1. The predefined default MV may be signaled in VPS/SPS/PPS/slice header/tile group header/CTU/CU.

ii. Otherwise (HMVP list is not empty),

1. MVdefaultX may be set to equal to the first element stored in the HMVP table;

2. MVdefaultX may be set to equal to the last element stored in the HMVP table;

3. MVdefaultX may only be set equal to a specific MV stored in the HMVP table;

a. In one example, the specific MV refers to reference list X.

b. In one example, the specific MV refers to a specific reference picture in reference list X, such as the reference picture with index 0.

Figure 29A:
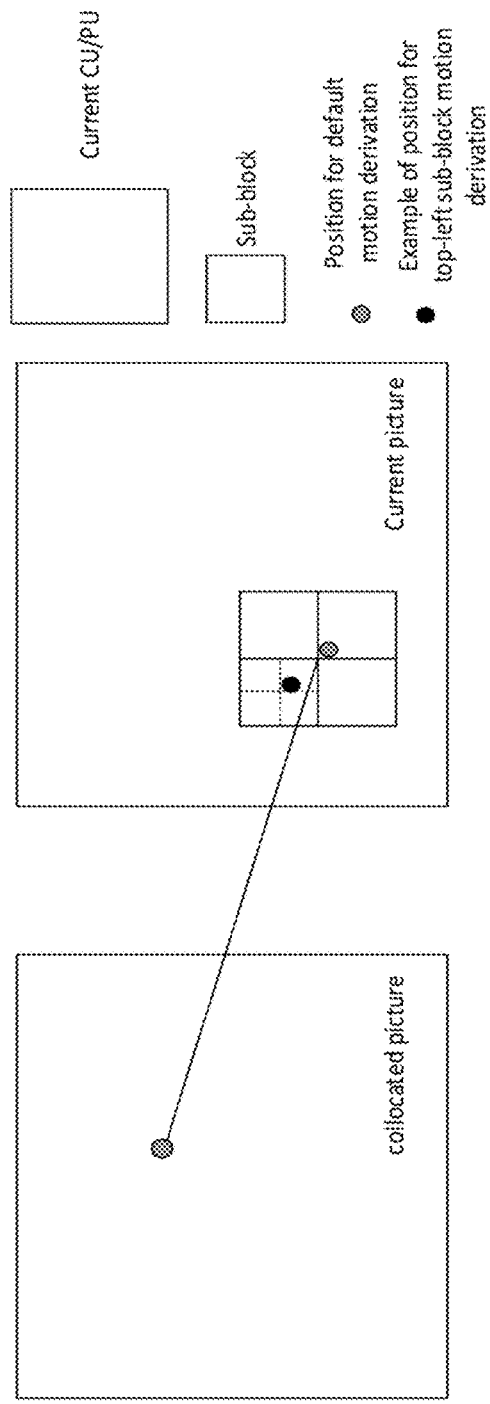
FIGS. 29A and 29B show existing and proposed examples of locations for identification of default motion information, respectively.
Figure 29B:
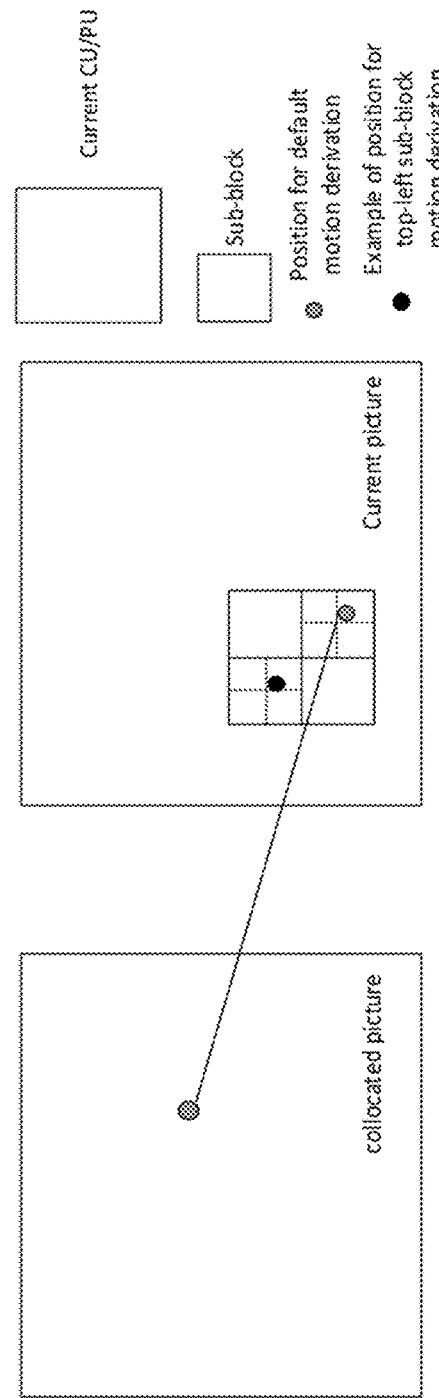

4. MVdefaultX may be set equal to the predefined default MV if the specific MV stored in the HMVP table cannot be found;
   a. In one example, only the first element stored in the HMVP table is searched.
   b. In one example, only the last element stored in the HMVP table is searched.
   c. In one example, some or all elements stored in the HMVP table is searched.
5. MVdefaultX obtained from the HMVP table may be scaled to the collocated picture if it does not refer to it.
6. MVdefaultX obtained from the HMVP cannot refer to the current picture itself.
c) In one example, MVdefaultX (X=0 or 1) is derived from a neighbouring block.
   i. The neighbouring blocks may include block A0, A1, B0, B1, B2 in FIG. 22.
      1. For example, only one of these blocks is used to derive MVdefaultX.
      2. Alternatively, some or all of these blocks are used to derive MVdefaultX.
         a. These blocks are checked in order until a valid MVdefaultX is found.
      3. If no valid MVdefaultX can be found from selected one or more neighbouring blocks, it is set equal to a predefined default MV such as (0, 0).
         a. The predefined default MV may be signaled in VPS/SPS/PPS/slice header/tile group header/CTU/CU.
   ii. No valid MVdefaultX can be found from a specific neighbouring block if
      1. The specific neighbouring block does not exist;
      2. The specific neighbouring block is not inter-coded;
   iii. MVdefaultX may only be set equal to a specific MV stored in the specific neighbouring block;
      1. In one example, the specific MV refers to reference list X.
      2. In one example, the specific MV refers to a specific reference picture in reference list X., such as the reference picture with index 0
   iv. MVdefaultX obtained from the specific neighbouring block may be scaled to a specific reference picture, such as the reference picture with index 0 in reference list X.
   v. MVdefaultX obtained from the specific neighbouring block cannot refer to the current picture itself.
9. For either sub-block or non-sub-block ATMVP candidate, if a temporal block for a sub-block/whole block in the collocated picture is coded with CPR mode, a default motion candidate may be utilized instead.
   a) In one example, the default motion candidate may be defined as the motion candidate associated with the center position of current block (e.g., MVdefault0 and/or MVdefault1 used in ATMVP as disclosed in 2.3.5.1.2).
   b) In one example, the default motion candidate may be defined as (0, 0) motion vector and reference picture index equal to 0 for both reference picture lists, if available.
10. It is proposed that the default motion information for the ATMVP process (e.g., MVdefault0 and MVdefault1 used in ATMVP as disclosed in 2.3.5.1.2) may be derived based on the location of a position that is used in the sub-block motion information derivation process. With this proposed method, for that sub-block, there is no need to further derive motion information since the default motion information will be directly assigned.
    a) In one example, instead of using the center position of the current block, the center position of a sub-block (e.g., a center sub-block) within the current block may be utilized.
    b) An example of existing and proposed implementations are shown in FIGS. 29A and 29B, respectively.
11. It is proposed that the ATMVP candidate is always available with the following methods:
    a) Suppose the center point of the current block is (x0, y0), then locate a corresponding position of (x0,y0) as M=(x0+MV'x, y0+MV'y) in the collocated picture. Find the block Z covering M. If Z is intra-coded, then MVdefault0, MVdefault1 are derived by some methods proposed in Item 6.
    b) Alternatively, Block Z is not located to get the motion information, some methods proposed in Item 8 are directly applied to get MVdefault0 and MVdefault1.
    c) Alternatively, the default motion candidate used in ATMVP process is always available. If it is set to unavailable based on current design (e.g., the temporal block is intra coded), other motion vectors may be utilized instead for the default motion candidate.
       i. In one example, the solutions in international application PCT/CN2018/124639, incorporated by reference herein, may be applied.
    d) Alternatively, furthermore, whether ATMVP candidate is always available depend on other high-level syntax information.
       i. In one example, only when the ATMVP enabling flag at slice/tile/picture header or other video units is set to true is inferred to be true, the ATMVP candidate may be always set to be available.
       ii. In one example, the above methods may be only applicable when ATMVP enabling flag in slice header/picture header or other video units is set to true and current picture is not an IRAP picture and current picture is not inserted to RefPicList0 with reference index equal to 0.
    e) A fixed index or a fixed group of indices is assigned to ATMVP candidates. When ATMVP candidates are always unavailable, the fixed index/group index may be inferred to other kinds of motion candidates (such as affine candidates).
12. It is proposed that whether the Zero motion affine merge candidate is put into the sub-block merge candidate list should depend on whether affine prediction is enabled.
    a) For example, if affine usage flag is off (sps_affine_enabled_flag is equal to 0), the Zero motion affine merge candidate is not put into the sub-block merge candidate list.
    b) Alternatively, furthermore, default motion vector candidates which are non-affine candidate are added instead.
13. It is proposed that non-affine padding candidate may be put into the sub-block merge candidate list.
    a) Zero motion non-affine padding candidate may be added if the sub-block merge candidate list is not fulfilled.
    b) When such a padding candidate is chosen, the affine_flag of the current block should be set to be 0.

c) Alternatively, Zero motion non-affine padding candidate is put into the sub-block merge candidate list if the sub-block merge candidate list is not fulfilled and affine usage flag is off.
14. Suppose MV0 and MV1 represent the MVs in reference list 0 and reference list 1 of the block covering a corresponding position (e.g., MV0 and MV1 may be MVZ_0 and MVZ_1 or MVZS_0 and MVZS_1 described in section 2.3.5.1.2). MV0' and MV1' represent the MVs in reference list 0 and reference list 1 to be derived for the current block or sub-block. Then the MV0' and MV1' should be derived by scaling.
    a) MV0, if the collocated picture is in reference list 1;
    b) MV1, if the collocated picture is in reference list 0.
15. The ATMVP and/or TMVP enabling/disabling flag may be inferred to be false for a slice/tile or other kinds of video units when current picture is treated as a reference picture with index set to M (e.g., 0) in a reference picture list X (PicRefListX, e.g., X=0). Here, M may be equal to the target reference picture index that motion information of a temporal block shall be scaled to for PicRefListX during ATMVP/TMVP processes.
    a) Alternatively, furthermore, the above method is only applicable when the current picture is an Intra Random Access Point (IRAP) picture.
    b) In one example, ATMVP and/or TMVP enabling/disabling flag may be inferred to be false when current picture is treated as a reference picture with index set to M (e.g., 0) in a PicRefListX and/or current picture is treated as a reference picture with index set to N (e.g., 0) in a PicRefListY. The variable M and N represent the target reference picture index used in TMVP or ATMVP process.
    c) For the ATMVP process, it is restricted that a confirming bitstream shall follow the rule that the collocated picture wherein motion information of current block is derived from shall not be the current picture.
    d) Alternatively, when the above conditions are true, the ATMVP or TMVP process is not invoked.
16. It is proposed that if a reference picture with index set to M (e.g., 0) in a reference picture list X (PicRefListX, e.g., X=0) for the current block is the current picture, ATMVP may be still enabled for this block.
    a) In one example, all sub-blocks' motion information are point to the current picture.
    b) In one example, when obtaining the sub-block's motion information from a temporal block, the temporal block shall be coded with at least one reference picture pointing to the current picture of the temporal block.
    c) In one example, when obtaining the sub-block's motion information from a temporal block, no scaling operations are applied.
17. Coding methods of sub-block merge index are aligned regardless the usage of ATMVP or not.
    a) In one example, for the first L bins, they are context coded. For the remaining bins, they are bypass coded. In one example, L is set to 1.
    b) Alternatively, for all bins, they are context coded.
18. The MV($MV_x$, $MV_y$) used in ATMVP to locate a corresponding block in a different picture (e.g., the TMV in 0) may be right-shifted to the integer precision (denoted as (MVx', MVy')) with the same rounding method as in the MV scaling process.
    a) Alternatively, the MV used in ATMVP to locate a corresponding block in a different picture (e.g., the TMV in 0) may be right-shifted to the integer precision with the same rounding method as in the MV averaging process.
    b) Alternatively, the MV used in ATMVP to locate a corresponding block in a different picture (e.g., the TMV in 0) may be right-shifted to the integer precision with the same rounding method as in the adaptive MV resolution (AMVR) process.
19. The MV(MVx, MVy) used in ATMVP to locate a corresponding block in a different picture (e.g., the TMV in 0) may be right-shifted to the integer precision (denoted as (MVx', MVy')) by rounding toward zero.
    a) For example, MVx'=(MVx+((1<<N)>>1)−(MVx>=0? 1:0))>>N; N is an integer presenting the MV resolution, e.g. N=4.
        i. For example, MVx'=(MVx+(MVx>=0?7:8))>>4.
    b) For example, MVy'=(MVy+((1<<N)>>1)−(MVy>=0?1:0))>>N; N is an integer presenting the MV resolution, e.g. N=4.
        i. For example, MVy'=(MVy+(MVy>=0?7:8))>>4.
20. In one example, MV(MVx, MVy) in bullet 18 and bullet 19 is used to locate a corresponding block to derive the default motion information used in ATMVP, such as using the center position of the sub-block and the shifted MV, or using the top-left position of current block and the shifted MV.
    a) In one example, MV(MVx, MVy) is used to locate a corresponding block to derive the motion information of a sub-block in current block during the ATMVP process, such as using the center position of the sub-block and the shifted MV.
21. The proposed methods in bullet 18, 19, 20 may be also applied to other coding tools that require to locate a reference block in a different picture or current picture with a motion vector.
22. The MV(MVx, MVy) used in ATMVP to locate a corresponding block in a different picture (e.g., the TMV in 0) may be scaled even it points to the collocated picture.
    a) In one example, if the width and/or height of the collocated picture (or the conformance window in it) is different from that of the current picture (or the conformance window in it), the MV may be scaled.
    b) Suppose the width and height of (the conformance window) of the collocated picture are denoted as W1 and H1, respectively. The width and height of (the conformance window of) the current picture are denoted as W2 and H2, respectively. Then MV(MVx, MVy) may be scaled as MVx'=MVx*W1/W2 and MVy'=MVy*H1/H2.
23. The center point of the current block (such as position (x0, y0) in 2.3.5.1.2) used to derive motion information in the ATMVP process may be further modified by scaling and/or adding offsets.
    a) In one example, if the width and/or height of the collocated picture (or the conformance window in it) is different from that of the current picture (or the conformance window in it), the center point may be further modified.
    b) Suppose the top-left position of the conformance window in the collocated picture are denoted as X1 and Y1. The top-left position of the conformance window defined in the current picture are denoted as X2 and Y2. The width and height of (the conformance window of) the collocated picture are denoted as W1 and H1, respectively. The width and height of (the conformance window) of the current picture are denoted as W2 and H2, respectively. Then (x0, y0) may be modified as x0'=(x0−X2)*W1/W2+X1 and y0'=(y0−Y2)*H1/H2+Y1.
  i. Alternatively, x0'=x0*W1/W2, y0'=y0*H1/H2.
24. The corresponding position (such as position M in 2.3.5.1.2) used to derive motion information in the ATMVP process may be further modified by scaling and/or adding offsets
  a) In one example, if the width and/or height of the collocated picture (or the conformance window in it) is different from that of the current picture (or the conformance window in it), the corresponding position may be further modified.
  b) Suppose the top-left position of the conformance window in the collocated picture are denoted as X1 and Y1. The top-left position of the conformance window defined in the current picture are denoted as X2 and Y2. The width and height of (the conformance window of) the collocated picture are denoted as W1 and H1, respectively. The width and height of (the conformance window) of the current picture are denoted as W2 and H2, respectively. Then M(x, y) may be modified as x'=(x−X2)*W1/W2+X1 and y'=(y−Y2)*H1/H2+Y1.
    i. Alternatively, x'=x*W1/W2, y'=y*H1/H2.

Sub-Picture Related

25. In one example, the width of a sub-picture S ending at the (j−1) column may be set equal to j minus the left-most column of the sub-picture S, if the position (i, j) and (i, j−1) belong to different sub-pictures.
  a) An embodiment based on an existing implementation is highlighted as below.

NumSubPics=0 for(i=0;i.<NumSubPicGridRows;i++){ for(j=0;j<NumSubPicGridCols;j++){ if(i==0)

SubPicTop[subpic_grid_idx[i][j]]=0 else if(subpic_grid_idx[i][j]!=subpic_grid_idx[i−1][j]){

SubPicTop[subpic_grid_idx[i][j]]=i

SubPicHeight[subpic_grid_idx[i−1][j]]=
i−SubPicTop[subpic_grid_idx[i−1][j]]

} if(j==0)

SubPicLeft[subpic_grid_idx[i][j]]=0 else if(subpic_grid_idx[i][j]!=subpic_grid_idx[i][j−1]){

SubPicLeft[subpic_grid_idx[i][j]]=j

SubPicWidth[subpic_grid_idx[i][j−1]]=
j−SubPicLeft[subpic_grid_idx[i][j−1]]

} if(i==NumSubPicGridRows−1)

SubPicHeight[subpic_grid_idx[i][j]]=
i−SubPicTop[subpic_grid_idx[i−1][j]]+1
  if(j==NumSubPicGridRows−1)

SubPicWidth[subpic_grid_idx[i][j]]=
j−SubPicLeft[subpic_grid_idx[i][j−1]]+1 if(subpic_grid_idx[i][j]>NumSubPics)

NumSubPics=subpic_grid_idx[i][j]

}

} (7-7)

26. In one example, the height of a sub-picture S ending at the (NumSubPicGridRows−1) row may be set equal to (NumSubPicGridRows−1) minus the top-most row of the sub-picture S then plus one.
  a) An embodiment based on an existing implementation is highlighted as below.

NumSubPics=0 for(i=0;i.<NumSubPicGridRows;i++){ for(j=0;j<NumSubPicGridCols;j++){ if(i==0)

SubPicTop[subpic_grid_idx[i][j]]=0 else if(subpic_grid_idx[i][j]!=subpic_grid_idx[i−1][j]){

SubPicTop[subpic_grid_idx[i][j]]=i

SubPicHeight[subpic_grid_idx[i−1][j]]=
i−SubPicTop[subpic_grid_idx[i−1][j]]

} if(j==0)

SubPicLeft[subpic_grid_idx[i][j]]=0 else if(subpic_grid_idx[i][j]!=subpic_grid_idx[i][j−1]){

SubPicLeft[subpic_grid_idx[i][j]]=j

SubPicWidth[subpic_grid_idx[i][j]]=
j−SubPicLeft[subpic_grid_idx[i][j−1]]

} if(i==NumSubPicGridRows−1)

SubPicHeight[subpic_grid_idx[i][j]]=
i−SubPicTop[subpicgrid idx[i][j]]+1
  if(j==NumSubPicGridRows−1)

SubPicWidth[subpic_grid_idx[i][j]]= j−SubPicLeft[subpic_grid_idx[i][j−1]]+1 if(subpic_grid_idx[i][j]>NumSubPics)

NumSubPics=subpic_grid_idx[i][j]  (7-7)

27. In one example, the width of a sub-picture S ending at the (NumSubPicGridColumns−1) column may be set equal to (NumSubPicGridColumns−1) minus the leftmost column of the sub-picture S then plus 1.
   a) An embodiment based on an existing implementation is highlighted as below.

NumSubPics=0 for(i=0;i<NumSubPicGridRows;i++){ for(j=0;j<NumSubPicGridCols;j++){ if(i==0)

SubPicTop[subpic_grid_idx[i][j]]=0 else if(subpic_grid_idx[i][j]!=subpic_grid_idx[i−1][j]){

SubPicTop[subpic_grid_idx[i][j]]=i

SubPicHeight[subpic_grid_idx[i−1][j]]= i−SubPicTop[subpic_grid_idx[i−1][j]]

} if(j==0)

SubPicLeft[subpic_grid_idx[i][j]]=0 else if(subpic_grid_idx[i][j]!=subpic_grid_idx[i][j−1]){

SubPicLeft[subpic_grid_idx[i][j]]=j

SubPicWidth[subpic_grid_idx[i][j]]= j−SubPicLeft[subpic_grid_idx[i][j−1]]

} if(i==NumSubPicGridRows−1)

SubPicHeight[subpic_grid_idx[i][j]]= i−SubPicTop[subpic_grid_idx[i−1][j]]+1
   if(j==NumSubPicGridColumns−1)

SubPicWidth[subpic_grid_idx[i][j]]= j−SubPicLeft[subpic_grid_idx[i][j]]+1 if(subpic_grid_idx[i][j]>NumSubPics)

NumSubPics=subpic_grid_idx[i][j]  (7-7)

28. The sub-picture grid must be integer times of the CTU size.
   a) An embodiment based on an existing implementation is highlighted as below.

subpic_grid_col_width_minus1 plus 1 specifies the width of each element of the subpicture identifier grid in units of CtbSizeY. The length of the syntax element is Ceil(Log 2(pic_width_max_in_luma_samples/CtbSizeY)) bits.

The variable NumSubPicGridCols is derived as follows:

NumSubPicGridCols=(pic_width_max_in_luma_samples+
subpic_grid_col_width_minus1*CtbSizeY+CtbSizeY−1)/
(subpic_grid_col_width_minus1*CtbSizeY+CtbSizeY)  (7-5)

subpic_grid_row_height_minus1 plus 1 specifies the height of each element of the subpicture identifier grid in units of 4 samples. The length of the syntax element is Ceil(Log 2(pic_height_max_in_luma_samples/CtbSizeY)) bits.

The variable NumSubPicGridRows is derived as follows:

NumSubPicGridRows=(pic_height_max_in_luma_samples+
subpic_grid_row_height_minus1*CtbSizeY+
CtbSizeY−1)/
(subpic_grid_row_height_minus1*CtbSizeY+
CtbSizeY)  (7-6)

29. A conformance constrain is added to guarantee that sub-pictures cannot be overlapped with each other, and all the sub-pictures must cover the whole picture.
   a) An embodiment based on an existing implementation is highlighted as below Any subpic_grid_idx[i][j] must be equal to idx if the following conditions are both satisfied:

i>=SubPicTop[idx] and i<SubPicTop[idx]+SubPicHeight[idx].

j>=SubPicLeft[idx] and j<SubPicLeft[idx]+SubPicWidth[idx].

Any subpic_grid_idx[i][j] must be different to idx if the following conditions are not both satisfied:

i>=SubPicTop[idx] and i<SubPicTop[idx]+SubPicHeight[idx].

j>=SubPicLeft[idx] and j<SubPicLeft[idx]+SubPicWidth[idx].

RPR related

30. A syntax element (such as a flag), denoted as RPR_flag, is signaled to indicate whether RPR may be used or not in a video unit (e.g., sequence). RPR_flag may be signaled in SPS, VPS, or DPS.
   a) In one example, if RPR is signaled not to be used (e.g. RPR_flag is 0) all width/height signaled in PPS must be the same to the maximum width/maximum height signaled in SPS.
   b) In one example, if RPR is signaled not to be used (e.g. RPR_flag is 0) all width/height in PPS is not signaled and inferred to be the maximum width/maximum height signaled in SPS.
   c) In one example, if RPR is signaled not to be used (e.g. RPR_flag is 0), conformance window information is not used in the decoding process. Otherwise (RPR is signaled to be used), conformance window information may be used in the decoding process.

31. It is proposed that the interpolation filters used in the motion compensation process to derive the prediction block of a current block may be selected depending on whether the resolution of the reference picture is different to the current picture, or whether the width and/or height of the reference picture is larger that of the current picture.
   a. In one example, the interpolation filters with less taps may be applied when condition A is satisfied, wherein condition A depends on the dimensions of the current picture and/or the reference picture.

i. In one example, condition A is the resolution of the reference picture is different to the current picture.
ii. In one example, condition A is the width and/or height of the reference picture is larger than that of the current picture.
iii. In one example, condition A is W1>a*W2 and/or H1>b*H2, wherein (W1, H1) represents the width and height of the reference picture and (W2, H2) represents the width and height of the current picture, a and b are two factors, e.g. a=b=1.5.
iv. In one example, condition A may also depend on whether bi-prediction is used.
  1) Condition A is satisfied is satisfied only when bi-prediction is used for the current block.
v. In one example, condition A may depend on M and N, where M and N represent the width and height of the current block.
  1) For example, condition A is satisfied only when M*N<=T, where T is an integer such as 64.
  2) For example, condition A is satisfied only when M<=T1 or N<=T2, where T1 and T2 are integers, e.g. T1=T2=4.
  3) For example, condition A is satisfied only when M<=T1 and N<=T2, where T1 and T2 are integers, e.g. T1=T2=4.
  4) For example, condition A is satisfied only when M*N<=T, or M<=T1 or N<=T2, where T, T1 and T2 are integers, e.g. T=64, T1=T2=4.
  5) In one example, the smaller condition in above sub-bullets may be replaced by greater.
vi. In one example, 1-tap filters are applied. In other words, an integer pixel without filtering is output as the interpolation result.
vii. In one example, bi-linear filters are applied when the resolution of the reference picture is different to the current picture.
viii. In one example, 4-tap filters or 6-tap filters are applied when the resolution of the reference picture is different to the current picture, or the width and/or height of the reference picture is larger than that of the current picture.
  1) The 6-tap filters may also be used for the affine motion compensation.
  2) The 4-tap filters may also be used for interpolation for chroma samples.
b. Whether to and/or how to apply the methods disclosed in bullet 31 may depend on the color components.
  i. For example, the methods are only applied on the luma component.
c. Whether to and/or how to apply the methods disclosed in bullet 31 may depend on the interpolation filtering direction.
  i. For example, the methods are only applied on horizontal filtering.
  ii. For example, the methods are only applied on vertical filtering.

CIIP Related

32. Intra prediction signal used in CIP process may be done in TU level instead of CU level (e.g., using reference samples outside the TU instead of CU).
  a) In one example, if either CU width or height is greater than the max transform block size, the CU may be split to multiple TUs and intra/inter prediction may be generated for each TU, e.g., using reference samples outside the TU.
  b) In one example, if the maximum transform size K is smaller than 64 (such as K=32), then the intra-prediction used in CIIP is performed in a recursive way like in a normal intra-code block.
  c) For example, a KM×KN CIIP coded block where M and N are integers are split into MN of K×K blocks, Intra-prediction is done for each K×K block. The intra-prediction for a later coded/decoded K×K block may depend on the reconstruction samples of a previously coded/decoded K×K block.

5. Additional Example Embodiments (Boldfaced Shows Changes Made to the Current Version of the Standard)

5.1 Embodiment #1: An Example of Syntax Design in SPS/PPS/Slice Header/Tile Group Header The changes compared to the VTM3.0.1rc1 reference software is highlighted in large size bold face font as follow:

| | |
|---|---|
| if( sps_temporal_mvp_enabled_flag ) | |
|   slice_temporal_mvp_enabled_flag | u(1) |
| if( slice_type = = B ) | |
|   mvd_l1_zero_flag | u(1) |
| if( slice_temporal_mvp_enabled_flag ) { | |
|   if( slice_type = = B ) | |
|     collocated_from_l0_flag | u(1) |
| } | |
| ... | |
| if(!sps_affine_enabled_flag){ | |
|   if(!(sps_sbtmvp_enabled_flag && | |
| slice_temporal_mvp_enabled_flag )) | |
|     MaxSubBlockMergeListSize = 0 | |
|   else | |
|     MaxSubBlockMergeListSize = 1 | |
| } | |
| else{ | |
|   five_minus_max_num_affine_merge_cand | ue(v) |
|   MaxSubBlockMergeListSize = 5- five_minus_max_num_affine_merge_cand | |
| } | |

5.2 Embodiment #2: An Example of Syntax Design in SPS/PPS/Slice Header/Tile Group Header

| 7.3.2.1 Sequence parameter set RBSP syntax | |
|---|---|
| | Descriptor |
| seq_parameter_set_rbsp( ) { | |
|   sps_seq_parameter_set_id | ue(v) |
|   chroma_format_idc | ue(v) |
|   ... | |
|   sps_ref_wraparound_enabled_flag | u(1) |
|   if( sps_ref_wraparound_enabled_flag ) | |
|     sps_ref_wraparound_offset | ue(v) |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   ... | |
| } | |
| rbsp_trailing_bits( ) | |
| } | | sps_sbtmvpsenabledtflag equal to 1 specifies that sub-block-based temporal motion vector predictors may be used in decoding of pictures with all slices having slice_type not equal to I in the CVS. sps_sbtmvp_enabledjflag equal to 0 specifies that subblock-based temporal motion vector predictors are not used in the CVS. When sps_sbtmvp_enabled_flag is not present, it is inferred to be equal to 0.

five_minus_max_num_subblock_merge_cand specifies the maximum number of subblock-based merging motion vector prediction (MVP) candidates supported in the slice subtracted from 5. When five_minus_max_num_subblock_tmerge_cand is not present, it is inferred to be equal to 5−sps_sbtmvpsenabledtflag. The maximum number of subblock-based merging MVP candidates, MaxNumSubblockMergeC and is derived as follows:

MaxNumSubblockMergeCand=5−five_minus_max_num_subblock_merge_cand(7-45)

The value of MaxNumSubblockMergeCand shall be in the range of 0 to 5, inclusive.

8.3.4.2 Derivation Process for Motion Vectors and Reference Indices in Subblock Merge Mode Inputs to this Process are:
. . . [No changes to the current VVC specification draft].
Outputs of this Process are:
. . . [No changes to the current VVC specification draft].

The variables numSbX, numSbY and the subblock merging candidate list, subblockMergeCandList are derived by the following ordered steps:

When sps_sbtmvp_enabled_flag is equal to 1 and (current picture is an IRAP and index 0 of reference picture list 0 is the current picture) is not true, the following applies:

The derivation process for merging candidates from neighbouring coding units as specified in clause 8.3.2.3 is invoked with the luma coding block location (xCb, yCb), the luma coding block width cbWidth, the luma coding block height cbHeight and the luma coding block width as inputs, and the output being the availability flags availableFlagA0, availableFlagA1, availableFlagB0, availableFlagB1 and availableFlagB2, the reference indices refIdxLXA0, refIdxLXA1, refIdxLXB0, refIdxLXB1 and refIdxLXB2, the prediction list utilization flags predFlagLXA0, predFlagLXA1, predFlagLXB0, predFlagLXB1 and predFlagLXB2, and the motion vectors mvLXA0, mvLXA1, mvLXB0, mvLXB1 and mvLXB2, with X being 0 or 1.

The derivation process for subblock-based temporal merging candidates as specified in clause 8.3.4.3 is invoked with the luma location (xCb, yCb), the luma coding block width cbWidth, the luma coding block height cbHeight, the availability flags availableFlagA0, availableFlagA1, availableFlagB0, availableFlagB1, the reference indices refIdxLXA0, refIdxLXA1, refIdxLXB0, refIdxLXB1, the prediction list utilization flags predFlagLXA0, predFlagLXA1, predFlagLXB0, predFlagLXB1 and the motion vectors mvLXA0, mvLXA1, mvLXB0, mvLXB1 as inputs and the output being the availability flag availableFlagSbCol, the number of luma coding subblocks in horizontal direction numSbX and in vertical direction numSbY, the reference indices refIdxLXSbCol, the luma motion vectors mvLXSbCol[xSbIdx][ySbIdx] and the prediction list utilization flags predFlagLXSbCol[xSbIdx][ySbIdx] with xSbIdx=0 . . . numSbX−1, ySbIdx=0 . . . numSbY−1 and X being 0 or 1.

When sps_affine_enabled_flag is equal to 1, the sample locations (xNbA0, yNbA0), (xNbA1, yNbA1), (xNbA2, yNbA2), (xNbB0, yNbB0), (xNbB1, yNbB1), (xNbB2, yNbB2), (xNbB3, yNbB3), and the variables numSbX and numSbY are derived as follows:

[No changes to the current VVC specification draft].

5.3 Embodiment #3 an Example of MV Rounding

The syntax changes are based on an existing implementation.
8.5.5.3 Derivation Process for Subblock-Based Temporal Merging Candidates

. . .

The location (xColSb, yColSb) of the collocated subblock inside ColPic is derived as follows.
1. The following applies:

yColSb=Clip3(yCtb,Min(CurPicHeightInSamplesY−1,yCtb+(1<<CtbLog 2SizeY)−1),ySb+((tempMv[1]+8−(tempMv[1]>=0))>>4))

If subpic_treated_as_pic_flag[SubPicIdx] is equal to 1, the following applies:

xColSb=Clip3(xCtb,Min(SubPicRightBoundaryPos,xCtb+(1<<CtbLog2SizeY)+3),xSb+((tempMv[0]+8+(tempMV[0]>=0))>>4))

Otherwise (subpic_treated_as_pic_flag[SubPicIdx] is equal to 0), the following applies:

xColSb=Clip3(xCtb,Min(CurPicWidthInSamplesY−1,xCtb+(1<<CtbLog2SizeY)+3),xSb+(tempMv[0]+8+(tempMV[0]>=0))>>4))

. . .

8.5.5.4 Derivation Process for Subblock-Based Temporal Merging Base Motion Data

. . .

The location (xColCb, yColCb) of the collocated block inside ColPic is derived as follows.
The following applies:

yColCb=Clip3(yCtb,Min(CurPicHeightInSamplesY−1,yCtb+(1<<CtbLog 2SizeY)−1),yColCtrCb+((tempMv[1]+8−(tempMv[1]>=0))>>4))

If subpic_treated_as_pic_flag[SubPicIdx] is equal to 1, the following applies:

xColCb=Clip3(xCtb,Min(SubPicRightBoundaryPos,xCtb+(1<<CtbLog2SizeY)+3),xColCtrCb+((tempMv[0]+8+(tempMV[0]>=0))>>4))

Otherwise (subpic_treated_as_pic_flag[SubPicIdx] is equal to 0, the following applies:

xColCb=Clip3(xCtb,Min(CurPicWidthInSamplesY−1,xCtb+(1<<CtbLog2 SizeY)+3),xColCtrCb+((tempMv[0]+8+(tempMV[0]>=0))>>4))

5.3 Embodiment #3: An Example of MV Rounding

The syntax changes are based on an existing implementation.
8.5.5.3 Derivation Process for Subblock-Based Temporal Merging Candidates

. . .

The location (xColSb, yColSb) of the collocated subblock inside ColPic is derived as follows.
1. The following applies:

yColSb=Clip3(yCtb,Min(CurPicHeightInSamplesY−1,yCtb+(1<<CtbLog2SizeY)−1),ySb+((tempMv[1]+8−(tempMv[1]>=0))>>4))

If subpic_treated_as_pic_flag[SubPicIdx] is equal to 1, the following applies:

xColSb=Clip3(xCtb,Min(SubPicRightBoundaryPos,xCtb+(1<<CtbLog2SizeY)+3),xSb+((tempMv[0]+8+(tempMV[0]>=0))>>4))

Otherwise (subpic_treated_as_pic_flag[SubPicIdx] is equal to 0), the following applies:

$$xColSb=Clip3(xCtb,Min(CurPicWidthInSamplesY-1, xCtb+(1<<CtbLog2SizeY)+3),xSb+(tempMv[0]+ 8+(tempMV[0]>=0))>>4)) \quad (5)$$

. . .

8.5.5.4 Derivation Process for Subblock-Based Temporal Merging Base Motion Data
. . .

The location (xColCb, yColCb) of the collocated block inside ColPic is derived as follows.
The following applies:

$$yColCb=Clip3(yCtb,Min(CurPicHeightInSamplesY-1,yCtb+(1<<CtbLog2SizeY)-1),yColCtrCb+ ((tempMv[1]+8-(tempMv[1]>=0))>>4))$$

If subpic_treated_as_pic_flag[SubPicIdx] is equal to 1, the following applies:

$$xColCb=Clip3(xCtb,Min(SubPicRightBoundaryPos, xCtb+(1<<CtbLog2SizeY)+3),xColCtrCb+ ((tempMv[0]+8+(tempMV[0]>=0))>>4))$$

Otherwise (subpic_treated_as_pic_flag[SubPicIdx] is equal to 0, the following applies:

$$xColCb=Clip3(xCtb,Min(CurPicWidthInSamplesY-1, xCtb+(1<<CtbLog2SizeY)+3),xColCtrCb+ ((tempMv[0]+8+(tempMV[0]>=0))>>4))$$

5.4 Embodiment #4: A Second Example of MV Rounding 8.5.5.3 Derivation Process for Subblock-Based Temporal Merging Candidates
Inputs to this Process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.
  the availability flag availableFlagA1 of the neighbouring coding unit,
  the reference index refIdxLXA$_1$ of the neighbouring coding unit with X being 0 or 1,
  the prediction list utilization flag predFlagLXA$_1$ of the neighbouring coding unit with X being 0 or 1,
  the motion vector in 1/16 fractional-sample accuracy mvLXA$_1$ of the neighbouring coding unit with X being 0 or 1.
Outputs of this Process are:
  the availability flag availableFlagSbCol,
  the number of luma coding subblocks in horizontal direction numSbX and in vertical direction numSbY,
  the reference indices refIdxL0SbCol and refIdxL1SbCol,
  the luma motion vectors in 1/16 fractional-sample accuracy mvL0SbCol[xSbIdx][ySbIdx] and mvL1SbCol[xSbIdx][ySbIdx] with xSbIdx=0 . . . numSbX−1, ySbIdx=0 . . . numSbY−1,
  the prediction list utilization flags predFlagL0SbCol[xSbIdx][ySbIdx] and predFlagL1SbCol[xSbIdx][ySbIdx] with xSbIdx=0 . . . numSbX−1, ySbIdx=0 . . . numSbY−1.
The availability flag availableFlagSbCol is derived as follows.
  If one or more of the following conditions is true, availableFlagSbCol is set equal to 0.

slice_temporal_mvp_enabled_flag is equal to 0.
sps_sbtmvp_enabled_flag is equal to 0.
cbWidth is less than 8.
cbHeight is less than 8.
Otherwise, the following ordered steps apply:
  1. The location (xCtb, yCtb) of the top-left sample of the luma coding tree block that contains the current coding block and the location (xCtr, yCtr) of the below-right center sample of the current luma coding block are derived as follows:

$$xCtb=(xCb>>CtuLog2Size)<<CtuLog2Size \quad (8\text{-}542)$$

$$yCtb=(yCb>>CtuLog2Size)<<CtuLog2Size \quad (8\text{-}543)$$

$$xCtr=xCb+(cbWidth/2) \quad (8\text{-}544)$$

$$yCtr=yCb+(cbHeight/2) \quad (8\text{-}545)$$

2. The luma location (xColCtrCb, yColCtrCb) is set equal to the top-left sample of the collocated luma coding block covering the location given by (xCtr, yCtr) inside ColPic relative to the top-left luma sample of the collocated picture specified by ColPic.
  3. The derivation process for subblock-based temporal merging base motion data as specified in clause 8.5.5.4 is invoked with the location (xCtb, yCtb), the location (xColCtrCb, yColCtrCb), the availability flag availableFlagA$_1$, and the prediction list utilization flag predFlagLXA$_1$, and the reference index refIdxLXA$_1$, and the motion vector mvLXA$_1$, with X being 0 and 1 as inputs and the motion vectors ctrMvLX, and the prediction list utilization flags ctrPredFlagLX of the collocated block, with X being 0 and 1, and the temporal motion vector tempMv as outputs.
  4. The variable availableFlagSbCol is derived as follows:
    If both ctrPredFlagL0 and ctrPredFlagL1 are equal to 0, availableFlagSbCol is set equal to 0.
    Otherwise, availableFlagSbCol is set equal to 1.
When availableFlagSbCol is equal to 1, the following applies:
  The variables numSbX, numSbY, sbWidth, sbHeight and refIdxLXSbCol are derived as follows:

$$numSbX=cbWidth>>3 \quad (8\text{-}546)$$

$$numSbY=cbHeight>>3 \quad (8\text{-}547)$$

$$sbWidth=cbWidth/numSbX \quad (8\text{-}548)$$

$$sbHeight=cbHeight/numSbY \quad (8\text{-}549)$$

$$refIdxLXSbCol=0 \quad (8\text{-}550)$$

For xSbIdx=0 . . . numSbX−1 and ySbIdx=0 . . . numSbY−1, the motion vectors mvLXSbCol[xSbIdx][ySbIdx] and prediction list utilization flags predFlagLXSbCol[xSbIdx][ySbIdx] are derived as follows:
    The luma location (xSb, ySb) specifying the top-left sample of the current coding subblock relative to the top-left luma sample of the current picture is derived as follows:

$$xSb=xCb+xSbIdx*sbWidth+sbWidth/2 \quad (8\text{-}551)$$

$$ySb=yCb+ySbIdx*sbHeight+sbHeight/2 \quad (8\text{-}552)$$

The location (xColSb, yColSb) of the collocated subblock inside ColPic is derived as follows.

1. The following applies:

$$yColSb=Clip3(yCtb,Min(CurPicHeightInSamplesY-1,\\yCtb+(1<<CtbLog2SizeY)-1),ySb+((tempMv\\[1]+8-(tempMv[1]>=0?1:0))>>4)) \quad (8\text{-}553)$$

If subpic_treated_as_pic_flag[SubPicIdx] is equal to 1, the following applies:

$$xColSb=Clip3(xCtb,Min(SubPicRightBoundaryPos,\\xCtb+(1<<CtbLog2SizeY)+3),xSb+((tempMv\\[0]+8-(tempMv[0]>=0?1:0))>>4)) \quad (8\text{-}554)$$

Otherwise (subpic_treated_as_pic_flag[SubPicIdx] is equal to 0), the following applies:

$$xColSb=Clip3(xCtb,Min(CurPicWidthInSamplesY-1,\\xCtb+(1<<CtbLog2SizeY)+3),xSb+((tempMv\\[0]+8-(tempMv[0]>=0?1:0))>>4)) \quad (8\text{-}555)$$

The variable currCb specifies the luma coding block covering the current coding subblock inside the current picture.
The variable colCb specifies the luma coding block covering the modified location given by ((xColSb>>3)<<3, (yColSb>>3)<<3) inside the ColPic.
The luma location (xColCb, yColCb) is set equal to the top-left sample of the collocated luma coding block specified by colCb relative to the top-left luma sample of the collocated picture specified by ColPic.
The derivation process for collocated motion vectors as specified in clause 8.5.2.12 is invoked with currCb, colCb, (xColCb, yColCb), refIdxL0 set equal to 0 and sbFlag set equal to 1 as inputs and the output being assigned to the motion vector of the subblock mvL0SbCol[xSbIdx][ySbIdx] and availableFlagL0SbCol.
The derivation process for collocated motion vectors as specified in clause 8.5.2.12 is invoked with currCb, colCb, (xColCb, yColCb), refIdxL1 set equal to 0 and sbFlag set equal to 1 as inputs and the output being assigned to the motion vector of the subblock mvL1SbCol[xSbIdx][ySbIdx] and availableFlagL1SbCol.
When availableFlagL0SbCol and availableFlagL1SbCol are both equal to 0, the following applies for X being 0 and 1:

$$mvLXSbCol[xSbIdx][ySbIdx]=ctrMvLX \quad (8\text{-}556)$$

$$predFlagLXSbCol[xSbIdx][ySbIdx]=ctrPredFlagLX \quad (8\text{-}557)$$

8.5.5.4 Derivation process for subblock-based temporal merging base motion data Inputs to this process are:
the location (xCtb, yCtb) of the top-left sample of the luma coding tree block that contains the current coding block,
the location (xColCtrCb, yColCtrCb) of the top-left sample of the collocated luma coding block that covers the below-right center sample.
the availability flag availableFlagA1 of the neighbouring coding unit,
the reference index refIdxLXA$_1$ of the neighbouring coding unit,
the prediction list utilization flag predFlagLXA1 of the neighbouring coding unit,
the motion vector in 1/16 fractional-sample accuracy mvLXA$_1$ of the neighbouring coding unit.
Outputs of this process are:
the motion vectors ctrMvL0 and ctrMvL1,
the prediction list utilization flags ctrPredFlagL0 and ctrPredFlagL1,
the temporal motion vector tempMv.
The variable tempMv is set as follows:

$$tempMv[0]=0 \quad (8\text{-}558)$$

$$tempMv[1]=0 \quad (8\text{-}559)$$

The variable currPic specifies the current picture.
When availableFlagA$_1$ is equal to TRUE, the following applies:
If all of the following conditions are true, tempMv is set equal to mvL0A$_1$:
predFlagL0A$_1$ is equal to 1,
DiffPicOrderCnt(ColPic, RefPicList[0][refIdxL0A1]) is equal to 0,
Otherwise, if all of the following conditions are true, tempMv is set equal to mvL1A$_1$:
slice_type is equal to B,
predFlagL1A$_1$ is equal to 1,
DiffPicOrderCnt(ColPic, RefPicList[1][refIdxL1A$_1$]) is equal to 0.
The location (xColCb, yColCb) of the collocated block inside ColPic is derived as follows.
The following applies:

$$yColCb=Clip3(yCtb,Min(CurPicHeightInSamplesY-\\1,yCtb+(1<<CtbLog2SizeY)-1),yColCtrCb+\\((tempMv[1]+8-(tempMv[1]>=0?1:0))>>4)) \quad (8\text{-}560)$$

If subpic_treated_as_pic_flag[SubPicIdx] is equal to 1, the following applies:

$$xColCb=Clip3(xCtb,Min(SubPicRightBoundaryPos,\\xCtb+(1<<CtbLog2SizeY)+3),xColCtrCb+\\((tempMv[0]+8-(tempMv[0]>=0?1:0))>>4)) \quad (8\text{-}561)$$

Otherwise (subpic_treated_as_pic_flag[SubPicIdx] is equal to o, the following applies:

$$xColCb=Clip3(xCtb,Min(CurPicWidthInSamplesY-1,\\xCtb+(1<<CtbLog2SizeY)+3),xColCtrCb+\\((tempMv[0]+8-(tempMv[0]>=0?1:0))>>4)) \quad (8\text{-}562)$$

The array colPredMode is set equal to the prediction mode array CuPredMode[0] of the collocated picture specified by ColPic.
The motion vectors ctrMvL0 and ctrMvL1, and the prediction list utilization flags ctrPredFlagL0 and ctrPredFlagL1 are derived as follows:
If colPredMode[xColCb][yColCb] is equal to MODE_INTER, the following applies:
The variable currCb specifies the luma coding block covering (xCtrCb,yCtrCb) inside the current picture.
The variable colCb specifies the luma coding block covering the modified location given by ((xColCb>>3)<<3, (yColCb>>3)<<3) inside the ColPic.
The luma location (xColCb, yColCb) is set equal to the top-left sample of the collocated luma coding block specified by colCb relative to the top-left luma sample of the collocated picture specified by ColPic.
The derivation process for collocated motion vectors specified in clause 8.5.2.12 is invoked with currCb, colCb, (xColCb, yColCb), refIdxL0 set equal to 0, and sbFlag set equal to 1 as inputs and the output being assigned to ctrMvL0 and ctrPredFlagL0.
The derivation process for collocated motion vectors specified in clause 8.5.2.12 is invoked with currCb, colCb, (xColCb, yColCb), refIdxL1 set equal to 0, and sbFlag set equal to 1 as inputs and the output being assigned to ctrMvL1 and ctrPredFlagL1.

Otherwise, the following applies:

ctrPredFlag*L*0=0 (8-563)

ctrPredFlag*L*1=0 (8-564)

5.5 Embodiment #5: A Third Example of MV Rounding 8.5.5.3 Derivation Process for Subblock-Based Temporal Merging Candidates Inputs to this Process are:
- a luma location (xCb, yCb) of the top-left sample of the current luma coding block relative to the top-left luma sample of the current picture,
- a variable cbWidth specifying the width of the current coding block in luma samples,
- a variable cbHeight specifying the height of the current coding block in luma samples.
- the availability flag availableFlag$A_1$ of the neighbouring coding unit,
- the reference index refIdxLXA1 of the neighbouring coding unit with X being 0 or 1,
- the prediction list utilization flag predFlagLX$A_1$ of the neighbouring coding unit with X being 0 or 1,
- the motion vector in 1/16 fractional-sample accuracy mvLX$A_1$ of the neighbouring coding unit with X being 0 or 1.

Outputs of this Process are:
- the availability flag availableFlagSbCol,
- the number of luma coding subblocks in horizontal direction numSbX and in vertical direction numSbY,
- the reference indices refIdxL0SbCol and refIdxL1SbCol,
- the luma motion vectors in 1/16 fractional-sample accuracy mvL0SbCol[xSbIdx][ySbIdx] and mvL1SbCol[xSbIdx][ySbIdx] with xSbIdx=0 . . . numSbX−1, ySbIdx=0 . . . numSbY−1,
- the prediction list utilization flags predFlagL0SbCol[xSbIdx][ySbIdx] and predFlagL1SbCol[xSbIdx][ySbIdx] with xSbIdx=0 . . . numSbX−1, ySbIdx=0 . . . numSbY−1.

The availability flag availableFlagSbCol is derived as follows.

If one or more of the following conditions is true, availableFlagSbCol is set equal to 0.
slice_temporal_mvp_enabled_flag is equal to 0.
sps_sbtmvp_enabled_flag is equal to 0.
cbWidth is less than 8.
cbHeight is less than 8.

Otherwise, the following ordered steps apply:
5. The location (xCtb, yCtb) of the top-left sample of the luma coding tree block that contains the current coding block and the location (xCtr, yCtr) of the below-right center sample of the current luma coding block are derived as follows:

*x*Ctb=(*x*Cb>>CtuLog2Size)<<CtuLog2Size (8-542)

*y*Ctb=(*y*Cb>>CtuLog2Size)<<CtuLog2Size (8-543)

*x*Ctr=*x*Cb+(cbWidth/2) (8-544)

*y*Ctr=*y*Cb+(cbHeight/2) (8-545)

6. The luma location (xColCtrCb, yColCtrCb) is set equal to the top-left sample of the collocated luma coding block covering the location given by (xCtr, yCtr) inside ColPic relative to the top-left luma sample of the collocated picture specified by ColPic.

7. The derivation process for subblock-based temporal merging base motion data as specified in clause 8.5.5.4 is invoked with the location (xCtb, yCtb), the location (xColCtrCb, yColCtrCb), the availability flag availableFlagA1, and the prediction list utilization flag predFlagLXA1, and the reference index refIdxLX$A_1$, and the motion vector mvLX$A_1$, with X being 0 and 1 as inputs and the motion vectors ctrMvLX, and the prediction list utilization flags ctrPredFlagLX of the collocated block, with X being 0 and 1, and the temporal motion vector tempMv as outputs.

8. The variable availableFlagSbCol is derived as follows:
   If both ctrPredFlagL0 and ctrPredFlagL1 are equal to 0, availableFlagSbCol is set equal to 0.
   Otherwise, availableFlagSbCol is set equal to 1.

When availableFlagSbCol is equal to 1, the following applies:
The variables numSbX, numSbY, sbWidth, sbHeight and refIdxLXSbCol are derived as follows:

numSb*X*=cbWidth>>3 (8-546)

numSb*Y*=cbHeight>>3 (8-547)

sbWidth=cbWidth/numSb*X* (8-548)

sbHeight=cbHeight/numSb*Y* (8-549)

refIdx*LX*SbCol=0 (8-550)

For xSbIdx=0 . . . numSbX−1 and ySbIdx=0 . . . numSbY−1, the motion vectors mvLXSbCol[xSbIdx][ySbIdx] and prediction list utilization flags predFlagLXSbCol[xSbIdx][ySbIdx] are derived as follows:
The luma location (xSb, ySb) specifying the top-left sample of the current coding subblock relative to the top-left luma sample of the current picture is derived as follows:

*x*Sb=*x*Cb+*x*SbIdx*sbWidth+sbWidth/2 (8-551)

*y*Sb=*y*Cb+*y*SbIdx*sbHeight+sbHeight/2 (8-552)

The location (xColSb, yColSb) of the collocated subblock inside ColPic is derived as follows.
1. The following applies:

*y*ColSb=Clip3(*y*Ctb,Min(CurPicHeightInSamplesY−1,*y*Ctb+(1<<CtbLog2Size*Y*)−1),*y*Sb+((tempMv[1]+(tempMv[1]>=0?7:8))>>4)) (8-553)

If subpic_treated_as_pic_flag[SubPicIdx] is equal to 1, the following applies:

*x*ColSb=Clip3(*x*Ctb,Min(SubPicRightBoundaryPos, *x*Ctb+(1<<CtbLog2Size*Y*)+3),*x*Sb+((tempMv[0]+(tempMv[0]>=0?7:8))>>4)) (8-554)

Otherwise (subpic_treated_as_pic_flag[SubPicIdx] is equal to 0), the following applies:

*x*ColSb=Clip3(*x*Ctb,Min(CurPicWidthInSamples*Y*−1, *x*Ctb+(1<<CtbLog2Size*Y*)+3),*x*Sb+((tempMv[0]+(tempMv[0]>=0?7:8))>>4)) (8-555)

The variable currCb specifies the luma coding block covering the current coding subblock inside the current picture.
The variable colCb specifies the luma coding block covering the modified location given by ((xColSb>>3)<<3, (yColSb>>3)<<3) inside the ColPic.

The luma location (xColCb, yColCb) is set equal to the top-left sample of the collocated luma coding block specified by colCb relative to the top-left luma sample of the collocated picture specified by ColPic.

The derivation process for collocated motion vectors as specified in clause 8.5.2.12 is invoked with currCb, colCb, (xColCb, yColCb), refIdxL0 set equal to 0 and sbFlag set equal to 1 as inputs and the output being assigned to the motion vector of the subblock mvL0SbCol[xSbIdx][ySbIdx] and availableFlagL0SbCol.

The derivation process for collocated motion vectors as specified in clause 8.5.2.12 is invoked with currCb, colCb, (xColCb, yColCb), refIdxL1 set equal to 0 and sbFlag set equal to 1 as inputs and the output being assigned to the motion vector of the subblock mvL1SbCol[xSbIdx][ySbIdx] and availableFlagL1SbCol.

When availableFlagL0SbCol and availableFlagL1SbCol are both equal to 0, the following applies for X being 0 and 1:

$$mvLXSbCol[xSbIdx][ySbIdx]=ctrMvLX \quad (8\text{-}556)$$

$$predFlagLXSbCol[xSbIdx][ySbIdx]=ctrPredFlagLX \quad (8\text{-}557)$$

8.5.5.4 Derivation Process for Subblock-Based Temporal Merging Base Motion Data

Inputs to this Process are:
the location (xCtb, yCtb) of the top-left sample of the luma coding tree block that contains the current coding block,
the location (xColCtrCb, yColCtrCb) of the top-left sample of the collocated luma coding block that covers the below-right center sample.
the availability flag availableFlagA1 of the neighbouring coding unit,
the reference index refIdxLXA$_1$ of the neighbouring coding unit,
the prediction list utilization flag predFlagLXA1 of the neighbouring coding unit,
the motion vector in 1/16 fractional-sample accuracy mvLXA$_1$ of the neighbouring coding unit.

Outputs of this Process are:
the motion vectors ctrMvL0 and ctrMvL1,
the prediction list utilization flags ctrPredFlagL0 and ctrPredFlagL1,
the temporal motion vector tempMv.

The variable tempMv is set as follows:

$$tempMv[0]=0 \quad (8\text{-}558)$$

$$tempMv[1]=0 \quad (8\text{-}559)$$

The variable currPic specifies the current picture.
When availableFlagA1 is equal to TRUE, the following applies:
If all of the following conditions are true, tempMv is set equal to mvL0A$_1$:
predFlagL0A$_1$ is equal to 1,
DiffPicOrderCnt(ColPic, RefPicList[0][refIdxL0A$_1$]) is equal to 0,
Otherwise, if all of the following conditions are true, tempMv is set equal to mvL1A$_1$:
slice_type is equal to B,
predFlagL1A$_1$ is equal to 1,
DiffPicOrderCnt(ColPic, RefPicList[1][refIdxL1A$_1$]) is equal to 0.

The location (xColCb, yColCb) of the collocated block inside ColPic is derived as follows.
The following applies:

$$yColCb=Clip3(yCtb,Min(CurPicHeightInSamplesY-1,yCtb+(1<<CtbLog2SizeY)-1),yColCtrCb+((tempMv[1]+(tempMv[1]>=0?7:8))>>4)) \quad (8\text{-}560)$$

If subpic_treated_as_pic_flag[SubPicIdx] is equal to 1, the following applies:

$$xColCb=Clip3(xCtb,Min(SubPicRightBoundaryPos,xCtb+(1<<CtbLog2SizeY)+3),xColCtrCb+((tempMv[0]+(tempMv[0]>=0?7:8))>>4)) \quad (8\text{-}561)$$

Otherwise (subpic_treated_as_pic_flag[SubPicIdx] is equal to o, the following applies:

$$xColCb=Clip3(xCtb,Min(CurPicWidthInSamplesY-1,xCtb+(1<<CtbLog2SizeY)+3),xColCtrCb+((tempMv[0]+(tempMv[0]>=0?7:8))>>4)) \quad (8\text{-}562)$$

The array colPredMode is set equal to the prediction mode array CuPredMode[0] of the collocated picture specified by ColPic.
The motion vectors ctrMvL0 and ctrMvL1, and the prediction list utilization flags ctrPredFlagL0 and ctrPredFlagL1 are derived as follows:
If colPredMode[xColCb][yColCb] is equal to MODE_INTER, the following applies:
The variable currCb specifies the luma coding block covering (xCtrCb,yCtrCb) inside the current picture.
The variable colCb specifies the luma coding block covering the modified location given by ((xColCb>>3)<<3, (yColCb>>3)<<3) inside the ColPic.
The luma location (xColCb, yColCb) is set equal to the top-left sample of the collocated luma coding block specified by colCb relative to the top-left luma sample of the collocated picture specified by ColPic.
The derivation process for collocated motion vectors specified in clause 8.5.2.12 is invoked with currCb, colCb, (xColCb, yColCb), refIdxL0 set equal to 0, and sbFlag set equal to 1 as inputs and the output being assigned to ctrMvL0 and ctrPredFlagL0.
The derivation process for collocated motion vectors specified in clause 8.5.2.12 is invoked with currCb, colCb, (xColCb, yColCb), refIdxL1 set equal to 0, and sbFlag set equal to 1 as inputs and the output being assigned to ctrMvL1 and ctrPredFlagL1.
Otherwise, the following applies:

$$ctrPredFlagL0=0 \quad (8\text{-}563)$$

$$ctrPredFlagL1=0 \quad (8\text{-}564)$$

8.5.6.3 Fractional Sample Interpolation Process
8.5.6.3.1 General
Inputs to this Process are:
a luma location (xSb, ySb) specifying the top-left sample of the current coding subblock relative to the top-left luma sample of the current picture,
a variable sbWidth specifying the width of the current coding subblock,
a variable sbHeight specifying the height of the current coding subblock,
a motion vector offset mvOffset,
a refined motion vector refMvLX,
the selected reference picture sample array refPicLX,
the half sample interpolation filter index hpelIfIdx,
the bi-directional optical flow flag bdofFlag,
a variable cIdx specifying the colour component index of the current block.

Outputs of this Process are:
- an (sbWidth+brdExtSize)×(sbHeight+brdExtSize) array predSamplesLX of prediction sample values.

The prediction block border extension size brdExtSize is derived as follows:

brdExtSize=(bdofFlag||(inter_affine_flag[xSb][ySb]
&& sps_affine_prof_enabled_flag))?2:0  (8-752)

The variable fRefWidth is set equal to the PicOutputWidthL of the reference picture in luma samples.
The variable fRefHeight is set equal to PicOutputHeightL of the reference picture in luma samples.
The motion vector mvLX is set equal to (refMvLX−mvOffset).
If cIdx is equal to 0, the following applies:
- The scaling factors and their fixed-point representations are defined as hori_scale_fp=((fRefWidth<<14)+(PicOutputWidth$L$>>1))/PicOutputWidth$L$  (8-753)

vert_scale_fp=((fRefHeight<<14)+(PicOutputHeight$L$>>1))/PicOutputHeight$L$  (8-754)

- Let (xIntL, yIntL) be a luma location given in full-sample units and (xFracL, yFracL) be an offset given in 1/16-sample units. These variables are used only in this clause for specifying fractional-sample locations inside the reference sample arrays refPicLX.
- The top-left coordinate of the bounding block for reference sample padding (xSbInt$_L$, ySbInt$_L$) is set equal to (xSb+(mvLX[0]>>4), ySb+(mvLX[1]>>4)).
- For each luma sample location ($x_L$=0 ... sbWidth−1+brdExtSize, $y_L$=0 ... sbHeight−1+brdExtSize) inside the prediction luma sample array predSamplesLX, the corresponding prediction luma sample value predSamplesLX[$x_L$][$y_L$] is derived as follows:
- Let (refxSb$_L$, refySb$_L$) and (refx$_L$, refy$_L$) be luma locations pointed to by a motion vector (refMvLX[0], refMvLX[1]) given in 1/16-sample units. The variables refxSb$_L$, refx$_L$, refySb$_L$, and refy$_L$ are derived as follows:

refxSb$_L$=((xSb<<4)+refMvLX[0])*hori_scale_fp  (8-755)

refx$_L$=((Sign(refxSb)*((Abs(refxSb)+128)>>8)+$x_L$*
((hori_scale_fp+8)>>4))+32)>>6  (8-756)

refySb$_L$=((ySb>>4)+refMvLX[1])*vert_scale_fp  (8-757)

refy$L$=((Sign(refySb)*((Abs(refySb)+128)>>8)+$y_L$*
((vert_scale_fp+8)>>4))+32)>>6  (8-758)

The variables xInt$_L$, yInt$_L$, xFrac$_L$ and yFrac$_L$ are derived as follows:

xInt$_L$=refx$_L$>>4  (8-759)

yInt$_L$=refy$_L$>>4  (8-760)

xFrac$_L$=refx$_L$ & 15  (8-761)

yFrac$_L$=refy$_L$ & 15  (8-762)

using6TapFlag is set to be 1 if all the conditions below are satisfied:

cbWidth[0][xSb][ySb]<=4||cbHeight[0][xSb]
[ySb]<=4||cbWidth[0][xSb][ySb]*cbHeight[0]
[xSb][ySb]<=64.

PredFlag$L$0[xSb][ySb]==1 && PredFlag$L$1[xSb]
[ySb]==1.

If bdofFlag is equal to TRUE or (sps_affine_prof_enabled_flag is equal to TRUE and inter_affine_flag[xSb][ySb] is equal to TRUE), and one or more of the following conditions are true, the prediction luma sample value predSamplesLX[$x_L$][$y_L$] is derived by invoking the luma integer sample fetching process as specified in clause 8.5.6.3.3 with (xInt$_L$+(xFrac$_L$>>3)−1), yInt$_L$+(yFrac$_L$>>3)−1) and refPicLX as inputs.
1. $x_L$ is equal to 0.
2. $x_L$ is equal to sbWidth+1.
3. $y_L$ is equal to 0.
4. $y_L$ is equal to sbHeight+1.

Otherwise, the prediction luma sample value predSamplesLX[xL][yL] is derived by invoking the luma sample 8-tap interpolation filtering process as specified in clause 8.5.6.3.2 with (xInt$_L$−(brdExtSize>0?1:0), yIntL−(brdExtSize>0?1:0)), (xFracL, yFracL), (xSbInt$_L$, ySbint$_L$), refPicLX, hpelIfIdx, sbWidth, sbHeight and (xSb, ySb) and using6TapFlag as inputs.

Otherwise (cIdx is not equal to 0), the following applies:
Let (xInt$_C$, yInt$_C$) be a chroma location given in full-sample units and (xFrac$_C$, yFrac$_C$) be an offset given in 1/32 sample units. These variables are used only in this clause for specifying general fractional-sample locations inside the reference sample arrays refPicLX.

The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 ... sbWidth−1, yC=0 ... sbHeight−1) inside the prediction chroma sample arrays predSamplesLX, the corresponding prediction chroma sample value predSamplesLX[xC][yC] is derived as follows:

Let (refxSb$_C$, refySb$_C$) and (refx$_C$, refy$_C$) be chroma locations pointed to by a motion vector (mvLX[0], mvLX[1]) given in 1/32-sample units. The variables refxSb$_C$, refySb$_C$, refx$_C$ and refy$_C$ are derived as follows:

refxSb$_C$=((xSb/SubWidthC<<5)+
mvLX[0])*hori_scale_fp  (8-763)

refx$_C$=((Sign(refxSb$_C$)*((Abs(refxSb$_C$)+256)>>9)+
xC*((hori_scale_fp+8)>>4))+16)>>5  (8-764)

refySb$_C$=((ySb/SubHeightC>>5)+mvLX[1])*vert_scale_fp  (8-765)

refy$_C$=((Sign(refySb$_C$)*((Abs(refySb$_C$)+256)>>9)+
yC*((vert_scale_fp+8)>>4))+16)>>5  (8-766)

The variables xInt$_C$, yInt$_C$, xFrac$_C$ and yFrac$_C$ are derived as follows:

xInt$_C$=refx$_C$>>5  (8-767)

yInt$_C$=refy$_C$>>5  (8-768)

xFrac$_C$=refy$_C$ & 31  (8-769)

yFrac$_C$=refy$_C$ & 31  (8-770)

The prediction sample value predSamplesLX[xC][yC] is derived by invoking the process specified in clause 8.5.6.3.4 with (xInt$_C$, yInt$_C$), (xFrac$_C$, yFrac$_C$), (xSbIntC, ySbIntC), sbWidth, sbHeight and refPicLX as inputs.

8.5.6.3.2 Luma Sample Interpolation Filtering Process

Inputs to this Process are:
- a luma location in full-sample units ($xInt_L$, $yInt_L$),
- a luma location in fractional-sample units ($xFrac_L$, $yFrac_L$),
- a luma location in full-sample units ($xSbInt_L$, $ySbInt_L$) specifying the top-left sample of the bounding block for reference sample padding relative to the top-left luma sample of the reference picture,
- the luma reference sample array $refPicLx_L$,
- the half sample interpolation filter index hpelIfIdx,
- a variable sbWidth specifying the width of the current subblock,
- a variable sbHeight specifying the height of the current subblock,
- a luma location (xSb, ySb) specifying the top-left sample of the current subblock relative to the top-left luma sample of the current picture,
- a flag using6TapFlag specifying whether the 6-tap interpolation filter used.

Output of this process is a predicted luma sample value $predSampleLx_L$

The variables shift1, shift2 and shift3 are derived as follows:
The variable shift1 is set equal to Min(4, $BitDepth_Y$−8), the variable shift2 is set equal to 6 and the variable shift3 is set equal to Max(2, 14−$BitDepth_Y$).
The variable picW is set equal to pic_width_in_luma_samples and the variable picH is set equal to pic_height_in_luma_samples.

The luma interpolation filter coefficients $f_L[p]$ for each 1/16 fractional sample position p equal to $xFrac_L$ or $yFrac_L$ are derived as follows:
If at least one of the following conditions are satisfied, the luma interpolation filter coefficients $f_L[p]$ are specified in Table 8-12.
- MotionModelIdc[xSb][ySb] is greater than 0, and sbWidth and sbHeight are both equal to 4,
- using6TapFlag is equal to 1.

Otherwise, the luma interpolation filter coefficients $f_L[p]$ are specified in Table 8-11 depending on hpelIfIdx.

The luma locations in full-sample units ($xInt_i$, $yInt_i$) are derived as follows for i=0 . . . 7:

If subpic_treated_as_pic_flag[SubPicIdx] is equal to 1, the following applies:

$xInt_i$=Clip3(SubPicLeftBoundaryPos,SubPicRightBoundaryPos,$xInt_L$+i−3)  (8-771)

$yInt_i$=Clip3(SubPicTopBoundaryPos,SubPicBotBoundaryPos,$yInt_L$+i−3)  (8-772)

Otherwise (subpic_treated_as_pic_flag[SubPicIdx] is equal to 0), the following applies:

$xInt_i$=Clip3(0,picW−1,sps_ref_wraparound_enabled_flag?ClipH((sps_ref_wraparound_offset_minus1+1)*MinCbSizeY,picW,$xInt_L$+i−3): $xInt_L$+i−3)  (8-773)

$yInt_i$=Clip3(0,picH−1,$yInt_L$+i−3)  (8-774)

The luma locations in full-sample units are further modified as follows for i=0 . . . 7:

$xInt_i$=Clip3($xSbInt_L$−3,$xSbInt_L$+sbWidth+4,$xInt_i$)  (8-775)

$yInt_i$=Clip3($ySbInt_L$−3,$ySbInt_L$+sbHeight+4,$yInt_i$)  (8-776)

The predicted luma sample value $predSampleLx_L$ is derived as follows:
If both $xFrac_L$ and $yFrac_L$ are equal to 0, the value of $predSampleLx_L$ is derived as follows:

$predSampleLx_L$=$refPicLx_L$[$xInt_3$][$yInt_3$]<<shift3  (8-777)

Otherwise, if $xFrac_L$ is not equal to 0 and $yFrac_L$ is equal to 0, the value of $predSampleLx_L$ is derived as follows:

$$predSampleLX_L = \left(\sum_{i=0}^{7} f_L[xFrac_L][i] * refPicLX_L[xInt_i][yInt_3]\right) >> \text{shift1} \quad (8\text{-}778)$$

Otherwise, if $xFrac_L$ is equal to 0 and $yFrac_L$ is not equal to 0, the value of $predSampleLx_L$ is derived as follows:

$$predSampleLX_L = \left(\sum_{i=0}^{7} f_L[yFrac_L][i] * refPicLX_L[xInt_3][yInt_i]\right) >> \text{shift1} \quad (8\text{-}779)$$

Otherwise, if $xFrac_L$ is not equal to 0 and $yFrac_L$ is not equal to 0, the value of $predSampleLx_L$ is derived as follows:
The sample array temp[n] with n=0 . . . 7, is derived as follows:

$$temp[n] = \left(\sum_{i=0}^{7} f_L[xFrac_L][i] * refPicLX_L[xInt_i][yInt_n]\right) >> \text{shift1} \quad (8\text{-}780)$$

The predicted luma sample value $predSampleLx_L$ is derived as follows:

$$predSampleLX_L = \left(\sum_{i=0}^{7} f_L[yFrac_L][i] * temp[i]\right) >> \text{shift2} \quad (8\text{-}781)$$

TABLE 8-11

Specification of the luma interpolation filter coefficients $f_L[p]$ for each 1/16 fractional sample position p.

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |

TABLE 8-11-continued

Specification of the luma interpolation filter coefficients $f_L[\,p\,]$ for each 1/16 fractional sample position p.

| Fractional sample position p | interpolation filter coefficients | | | | | | | |
|---|---|---|---|---|---|---|---|---|
| | $f_L[\,p\,][\,0\,]$ | $f_L[\,p\,][\,1\,]$ | $f_L[\,p\,][\,2\,]$ | $f_L[\,p\,][\,3\,]$ | $f_L[\,p\,][\,4\,]$ | $f_L[\,p\,][\,5\,]$ | $f_L[\,p\,][\,6\,]$ | $f_L[\,p\,][\,7\,]$ |
| (hpelIfIdx = = 0) | | | | | | | | |
| 8 | 0 | 3 | 9 | 20 | 20 | 9 | 3 | 0 |
| (hpelIfIdx = = 1) | | | | | | | | |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

TABLE 8-12

Specification of the luma interpolation filter coefficients $f_L[\,p\,]$ for each 1/16 fractional sample position p for affine motion mode.

| Fractional sample position p | interpolation filter coefficients | | | | | | | |
|---|---|---|---|---|---|---|---|---|
| | $f_L[\,p\,][\,0\,]$ | $f_L[\,p\,][\,1\,]$ | $f_L[\,p\,][\,2\,]$ | $f_L[\,p\,][\,3\,]$ | $f_L[\,p\,][\,4\,]$ | $f_L[\,p\,][\,5\,]$ | $f_L[\,p\,][\,6\,]$ | $f_L[\,p\,][\,7\,]$ |
| 1 | 0 | 1 | −3 | 63 | 4 | −2 | 1 | 0 |
| 2 | 0 | 1 | −5 | 62 | 8 | −3 | 1 | 0 |
| 3 | 0 | 2 | −8 | 60 | 13 | −4 | 1 | 0 |
| 4 | 0 | 3 | −10 | 58 | 17 | −5 | 1 | 0 |
| 5 | 0 | 3 | −11 | 52 | 26 | −8 | 2 | 0 |
| 6 | 0 | 2 | −9 | 47 | 31 | −10 | 3 | 0 |
| 7 | 0 | 3 | −11 | 45 | 34 | −10 | 3 | 0 |
| 8 | 0 | 3 | −11 | 40 | 40 | −11 | 3 | 0 |
| 9 | 0 | 3 | −10 | 34 | 45 | −11 | 3 | 0 |
| 10 | 0 | 3 | −10 | 31 | 47 | −9 | 2 | 0 |
| 11 | 0 | 2 | −8 | 26 | 52 | −11 | 3 | 0 |
| 12 | 0 | 1 | −5 | 17 | 58 | −10 | 3 | 0 |
| 13 | 0 | 1 | −4 | 13 | 60 | −8 | 2 | 0 |
| 14 | 0 | 1 | −3 | 8 | 62 | −5 | 1 | 0 |
| 15 | 0 | 1 | −2 | 4 | 63 | −3 | 1 | 0 |

Figure 30:
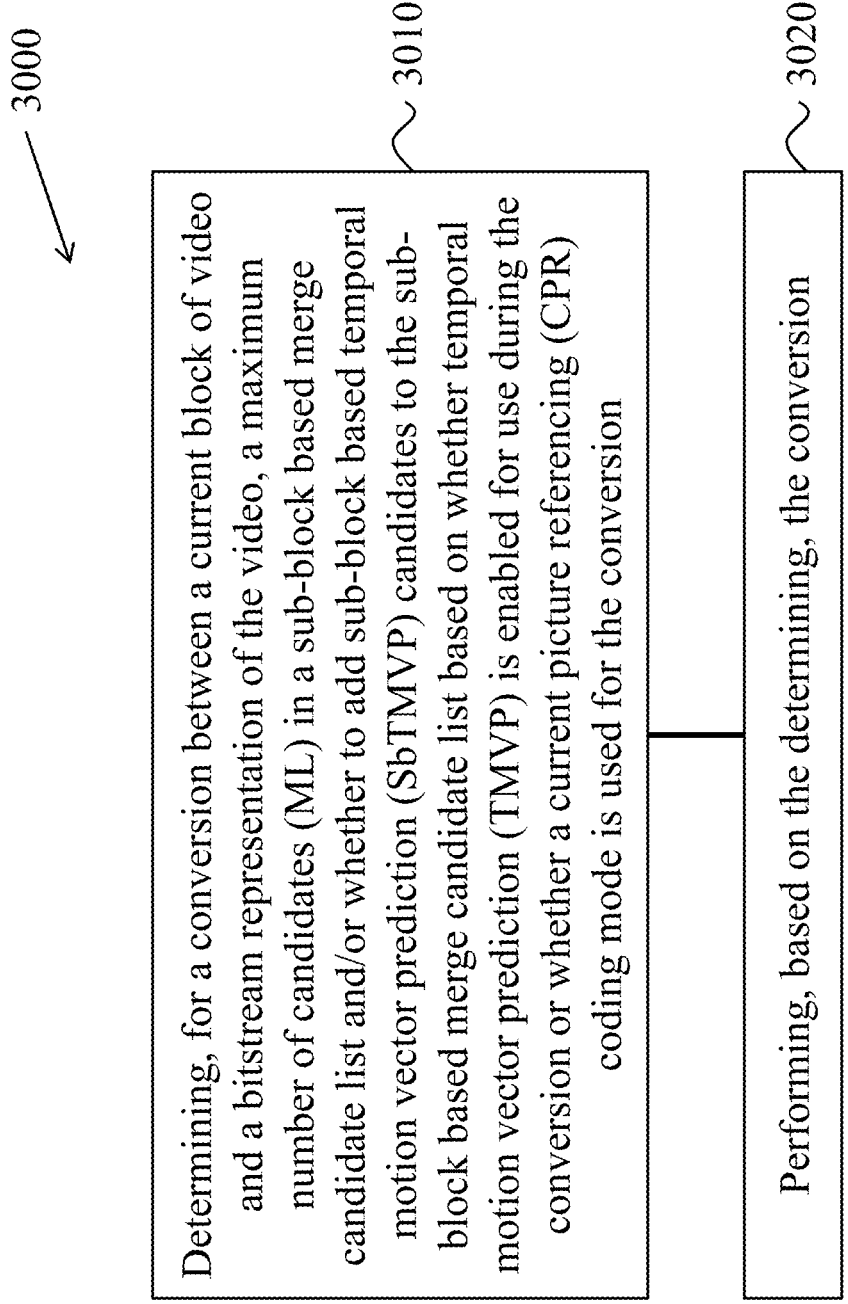

FIG. 30 is a flowchart for a method 3000 for video processing. The method 3000 includes, at operation 3010, determining, for a conversion between a current block of video and a bitstream representation of the video, a maximum number of candidates (ML) in a sub-block based merge candidate list and/or whether to add sub-block based temporal motion vector prediction (SbTMVP) candidates to the sub-block based merge candidate list based on whether temporal motion vector prediction (TMVP) is enabled for use during the conversion or whether a current picture referencing (CPR) coding mode is used for the conversion.

The method 3000 includes, at operation 3020, performing, based on the determining, the conversion.

Figure 31:
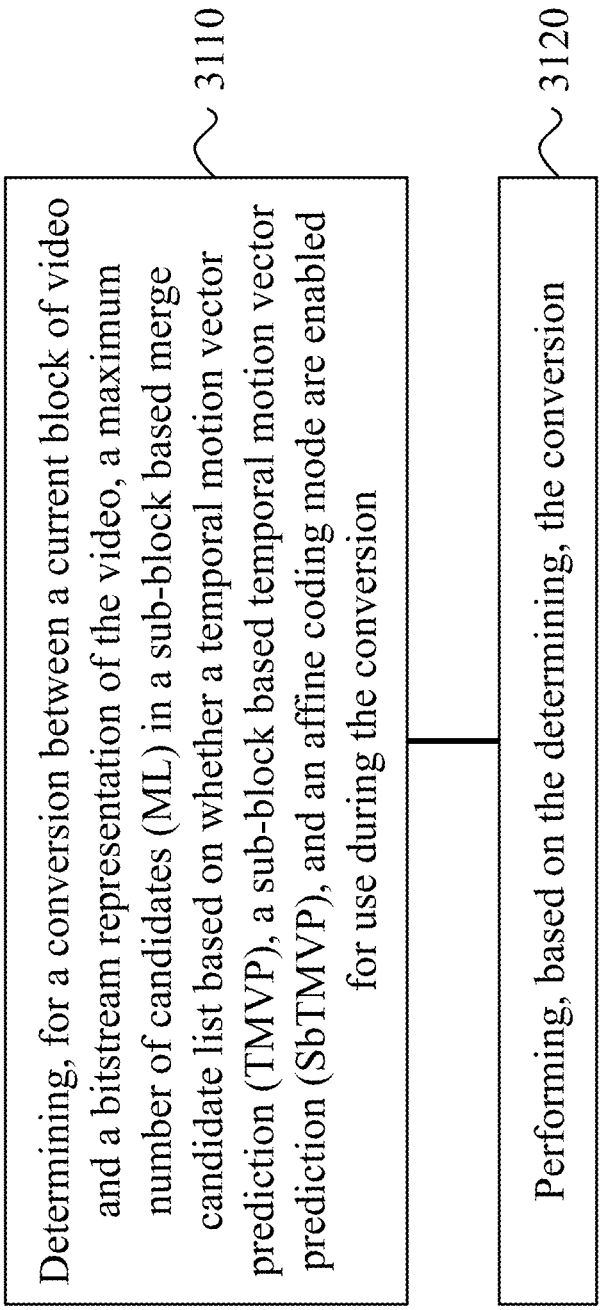

FIG. 31 is a flowchart for a method 3100 for video processing. The method 3100 includes, at operation 3110, determining, for a conversion between a current block of video and a bitstream representation of the video, a maximum number of candidates (ML) in a sub-block based merge candidate list based on whether a temporal motion vector prediction (TMVP), a sub-block based temporal motion vector prediction (SbTMVP), and an affine coding mode are enabled for use during the conversion.

The method 3100 includes, at operation 3120, performing, based on the determining, the conversion.

Figure 32:
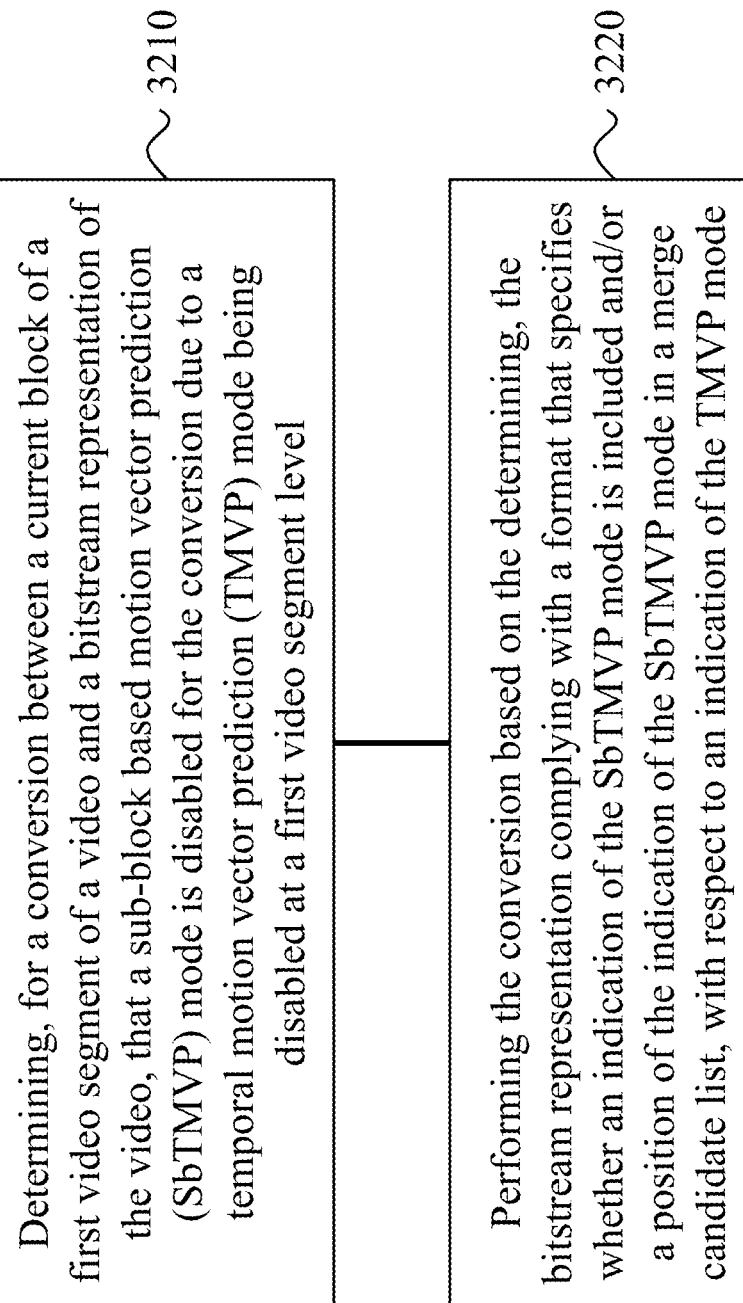

FIG. 32 is a flowchart for a method 3200 for video processing. The method 3200 includes, at operation 3210, determining, for a conversion between a current block of a first video segment of a video and a bitstream representation of the video, that a sub-block based motion vector prediction (SbTMVP) mode is disabled for the conversion due to a temporal motion vector prediction (TMVP) mode being disabled at a first video segment level.

The method 3200 includes, at operation 3220, performing the conversion based on the determining, the bitstream representation complying with a format that specifies whether an indication of the SbTMVP mode is included and/or a position of the indication of the SbTMVP mode in a merge candidate list, with respect to an indication of the TMVP mode.

FIG. 33 is a flowchart for a method 3300 for video processing. The method 3300 includes, at operation 3310, performing a conversion between a current block of a video that is coded using a sub-block based temporal motion vector prediction (SbTMVP) tool or a temporal motion vector prediction (TMVP) tool and a bitstream representation of the video, a coordinate of a corresponding position of the current block or a sub-block of the current block being selectively masked using a mask based on a compression of motion vectors associated with the SbTMVP tool or the TMVP tool, and an application of the mask comprising computing a bitwise AND operation between a value of the coordinate and a value of the mask.

Figure 34:
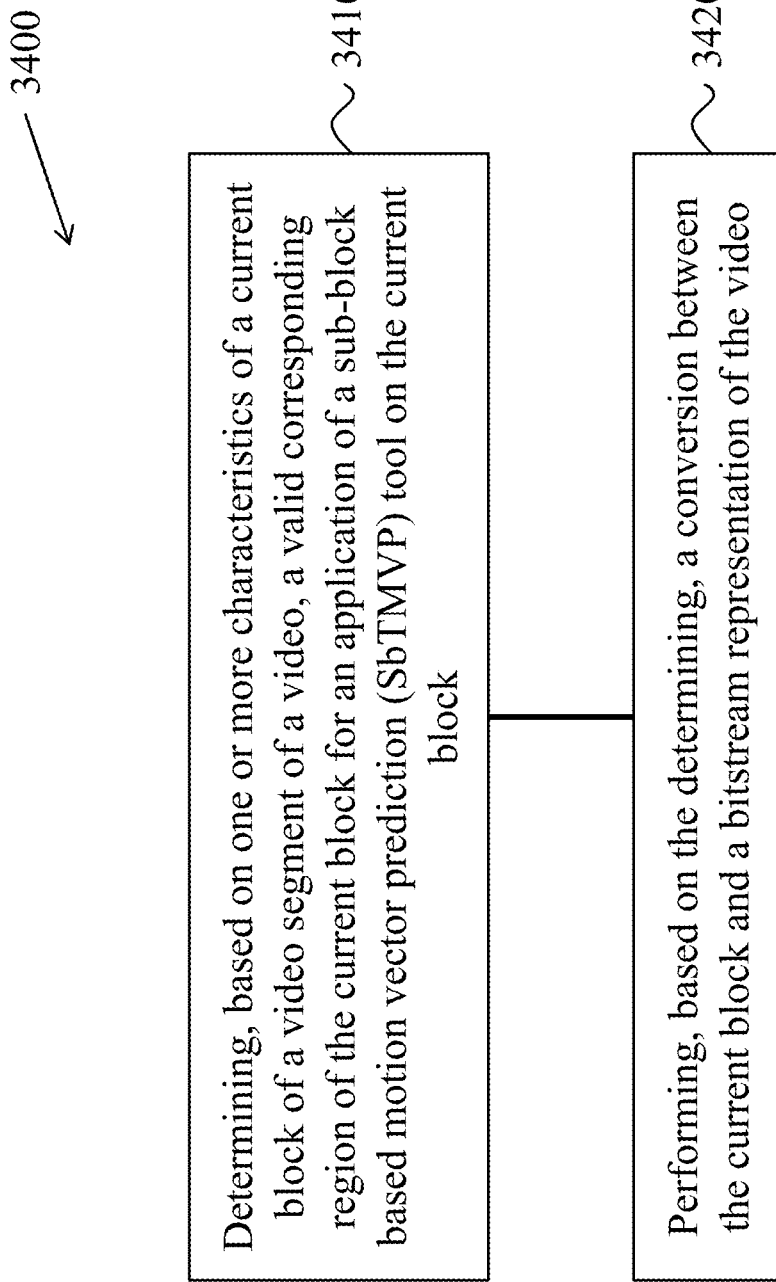

FIG. 34 is a flowchart for a method 3400 for video processing. The method 3400 includes, at operation 3410, determining, based on one or more characteristics of a current block of a video segment of a video, a valid corresponding region of the current block for an application of a sub-block based motion vector prediction (SbTMVP) tool on the current block.

The method 3400 includes, at operation 3420, performing, based on the determining, a conversion between the current block and a bitstream representation of the video.

Figure 35:
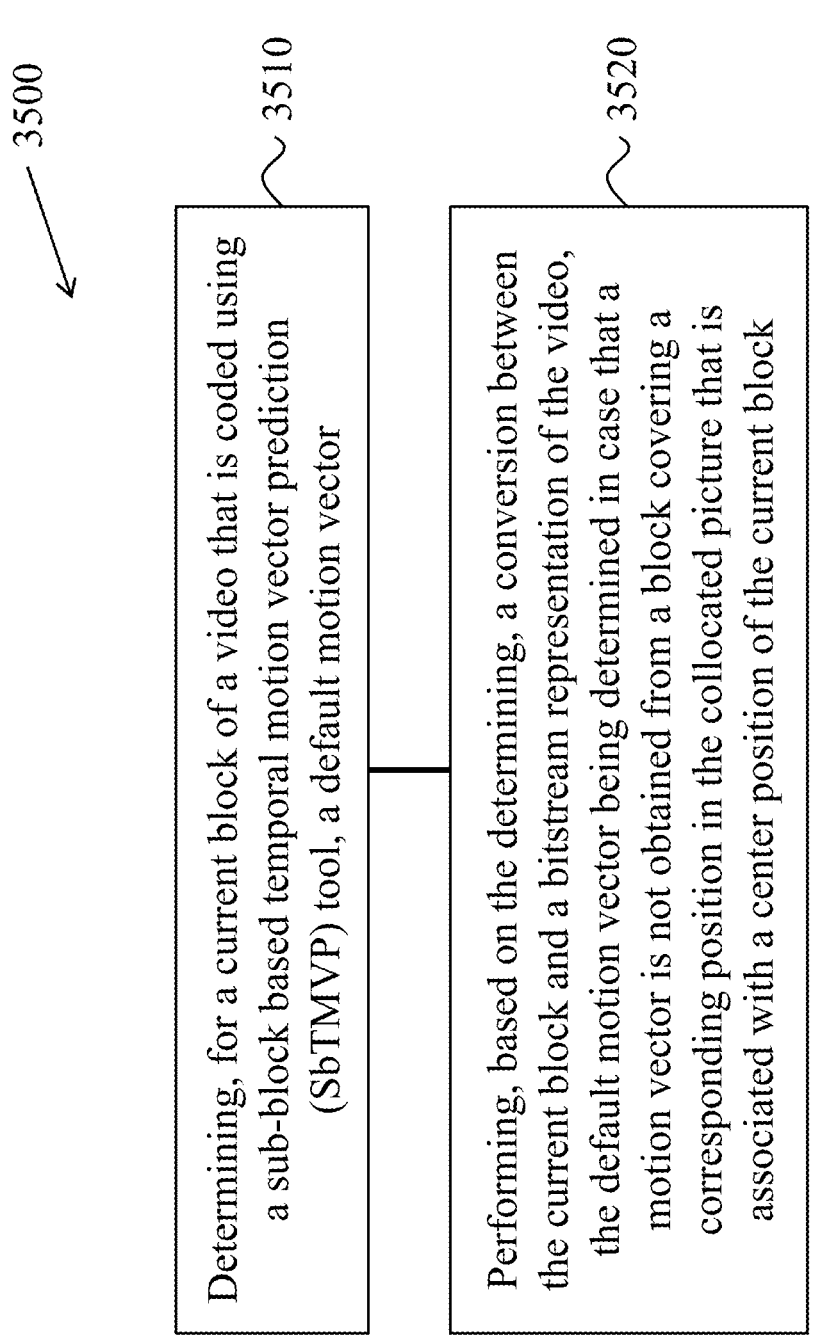

FIG. 35 is a flowchart for a method 3500 for video processing. The method 3500 includes, at operation 3510, determining, for a current block of a video that is coded using a sub-block based temporal motion vector prediction (SbTMVP) tool, a default motion vector.

The method 3500 includes, at operation 3520, performing, based on the determining, a conversion between the current block and a bitstream representation of the video, the default motion vector being determined in case that a motion vector is not obtained from a block covering a corresponding position in the collocated picture that is associated with a center position of the current block.

FIG. 36 is a flowchart for a method 3600 for video processing. The method 3600 includes, at operation 3610, inferring, for a current block of a video segment of a video, that a sub-block based temporal motion vector prediction (SbTMVP) tool or a temporal motion vector prediction (TMVP) tool is disabled for the video segment in case that a current picture of the current block is a reference picture with an index set to M in a reference picture list X, M and X being integers, and X=0 or X=1.

The method 3600 includes, at operation 3620, performing, based on the inferring, a conversion between the current block and a bitstream representation of the video.

FIG. 37 is a flowchart for a method 3700 for video processing. The method 3700 includes, at operation 3710, determining, for a current block of a video, that an application of an sub-block based temporal motion vector prediction (SbTMVP) tool is enabled in case that a current picture of the current block is a reference picture with an index set to M in a reference picture list X, M and X being integers.

The method 3700 includes, at operation 3720, performing, based on the determining, a conversion between the current block and a bitstream representation of the video.

FIG. 38 is a flowchart for a method 3800 for video processing. The method 3800 includes, at operation 3810, performing a conversion between a current block of a video and a bitstream representation of the video, the current block being coded using a sub-block based coding tool, wherein performing the conversion comprises using a plurality of bins (N) to code a sub-block merge index with a unified method in case that a sub-block based temporal motion vector prediction (SbTMVP) tool is enabled or disabled.

Figure 39:
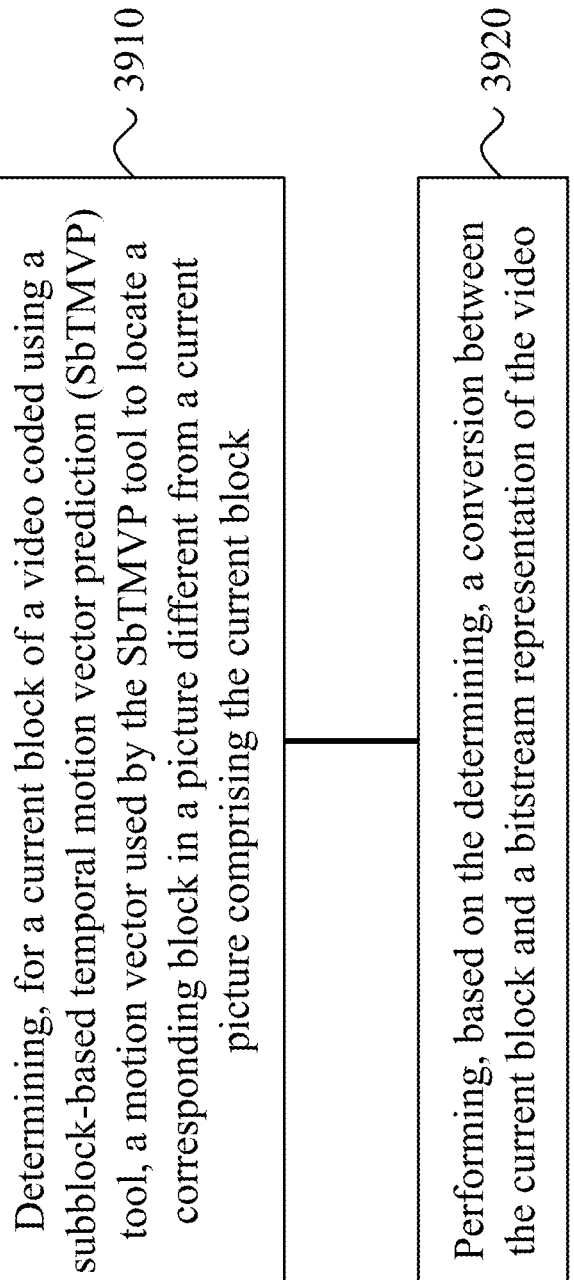

FIG. 39 is a flowchart for a method 3900 for video processing. The method 3900 includes, at operation 3910, determining, for a current block of a video coded using a sub-block based temporal motion vector prediction (SbTMVP) tool, a motion vector used by the SbTMVP tool to locate a corresponding block in a picture different from a current picture comprising the current block.

The method 3900 includes, at operation 3920, performing, based on the determining, a conversion between the current block and a bitstream representation of the video.

Figure 40:
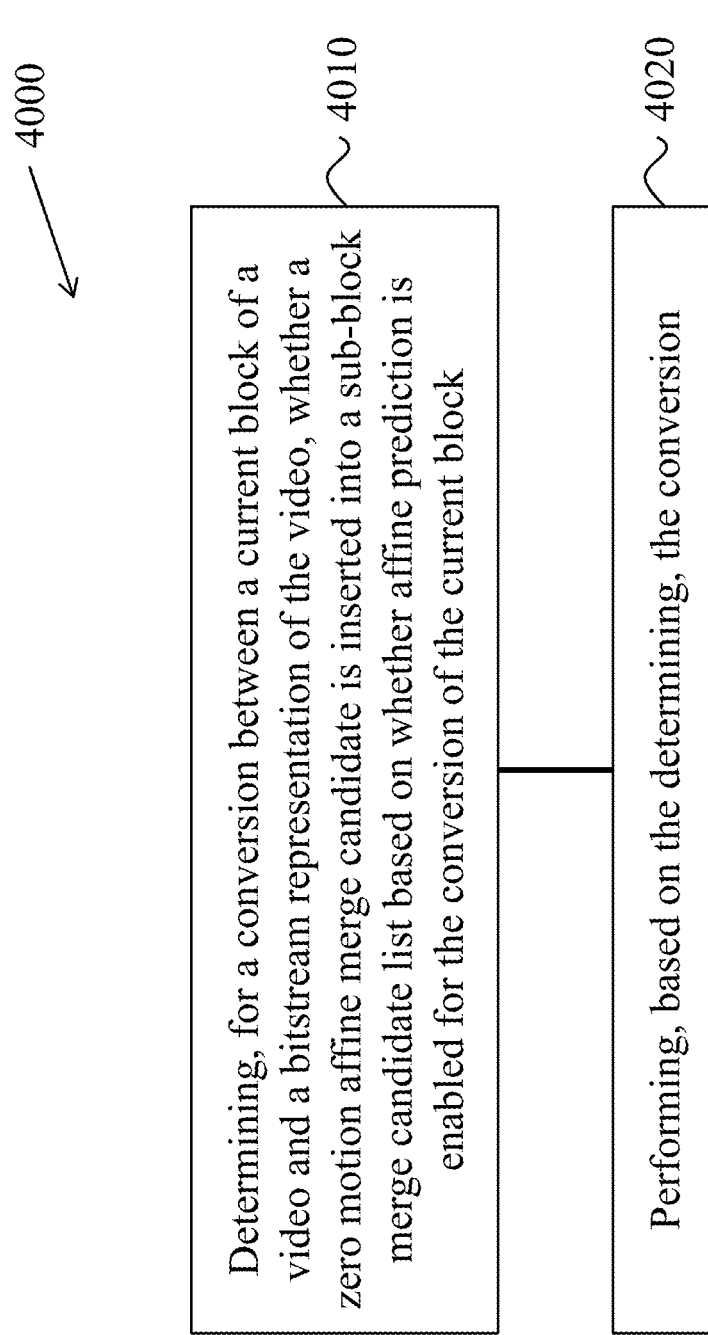

FIG. 40 is a flowchart for a method 4000 for video processing. The method 4000 includes, at operation 4010, determining, for a conversion between a current block of a video and a bitstream representation of the video, whether a zero motion affine merge candidate is inserted into a sub-block merge candidate list based on whether affine prediction is enabled for the conversion of the current block.

The method 4000 includes, at operation 4020, performing, based on the determining, the conversion.

Figure 41:
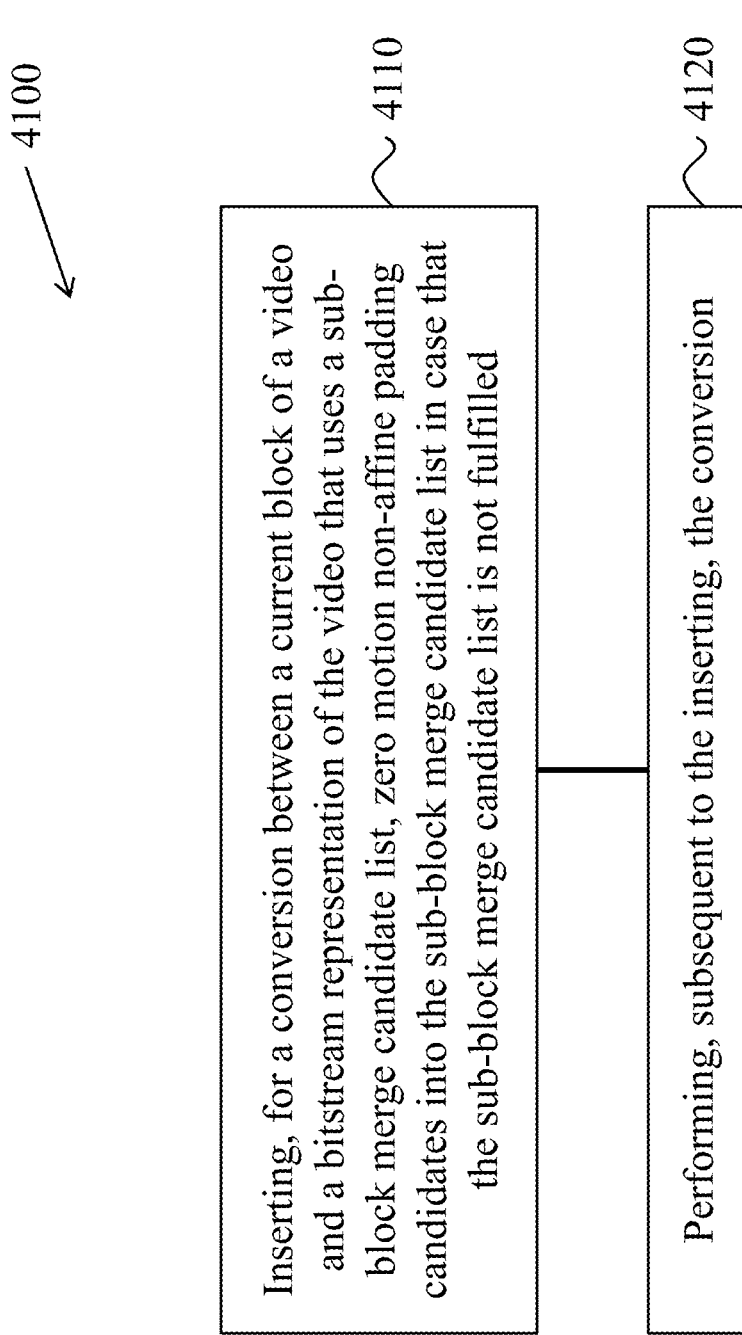

FIG. 41 is a flowchart for a method 4100 for video processing. The method 4100 includes, at operation 4110, inserting, for a conversion between a current block of a video and a bitstream representation of the video that uses a sub-block merge candidate list, zero motion non-affine padding candidates into the sub-block merge candidate list in case that the sub-block merge candidate list is not fulfilled.

The method 4100 includes, at operation 4120, performing, subsequent to the inserting, the conversion.

Figure 42:
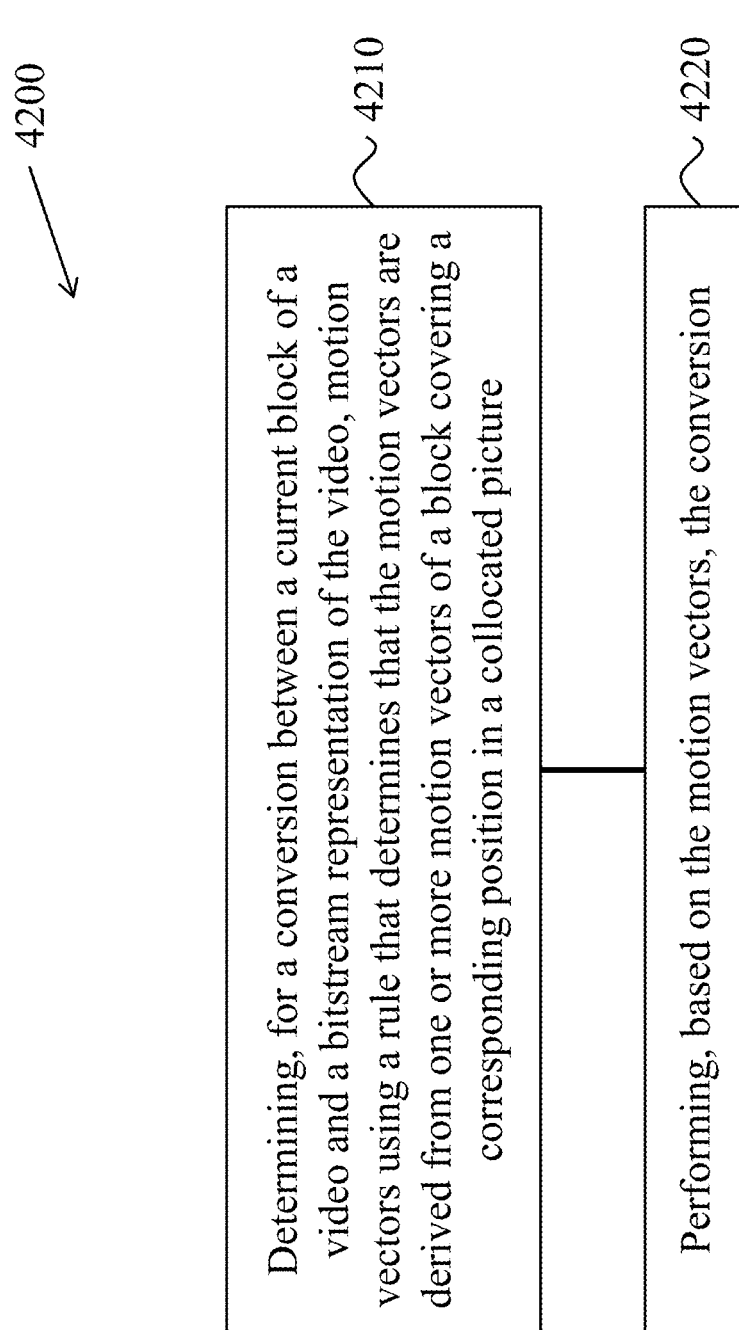

FIG. 42 is a flowchart for a method 4200 for video processing. The method 4200 includes, at operation 4210, determining, for a conversion between a current block of a video and a bitstream representation of the video, motion vectors using a rule that determines that the motion vectors are derived from one or more motion vectors of a block covering a corresponding position in a collocated picture.

The method 4200 includes, at operation 4220, performing, based on the motion vectors, the conversion.

Figure 43:
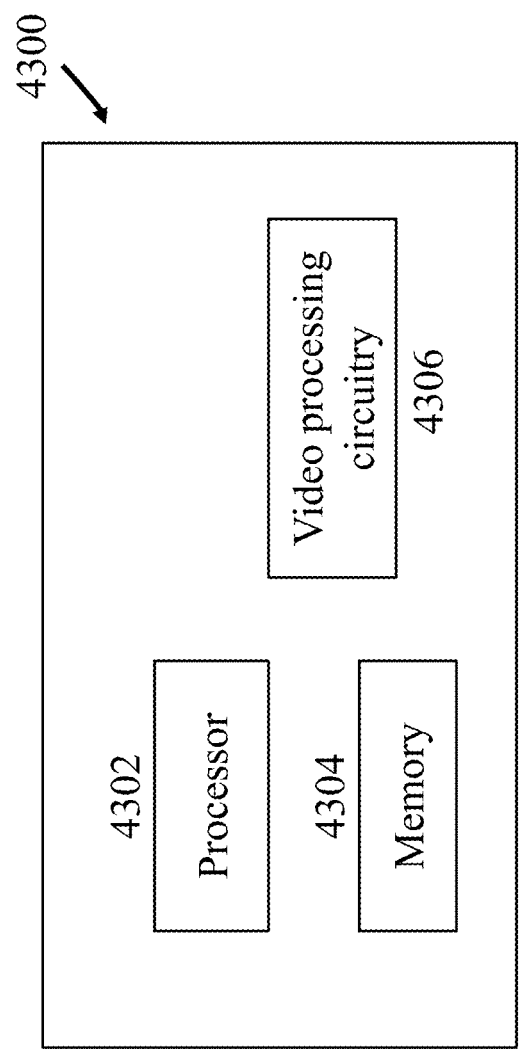
FIG. 43 is a block diagram of an example of a hardware platform for implementing a visual media decoding or a visual media encoding technique described in the present document.

FIG. 43 is a block diagram of a video processing apparatus 4300. The apparatus 4300 may be used to implement one or more of the methods described herein. The apparatus 4300 may be embodied in a smartphone, tablet, computer, Internet of Things (IoT) receiver, and so on. The apparatus 4300 may include one or more processors 4302, one or more memories 4304 and video processing hardware 4306. The processor(s) 4302 may be configured to implement one or more methods described in the present document. The memory (memories) 4304 may be used for storing data and code used for implementing the methods and techniques described herein. The video processing hardware 4306 may be used to implement, in hardware circuitry, some techniques described in the present document.

In some embodiments, the video coding methods may be implemented using an apparatus that is implemented on a hardware platform as described with respect to FIG. 43.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 44:
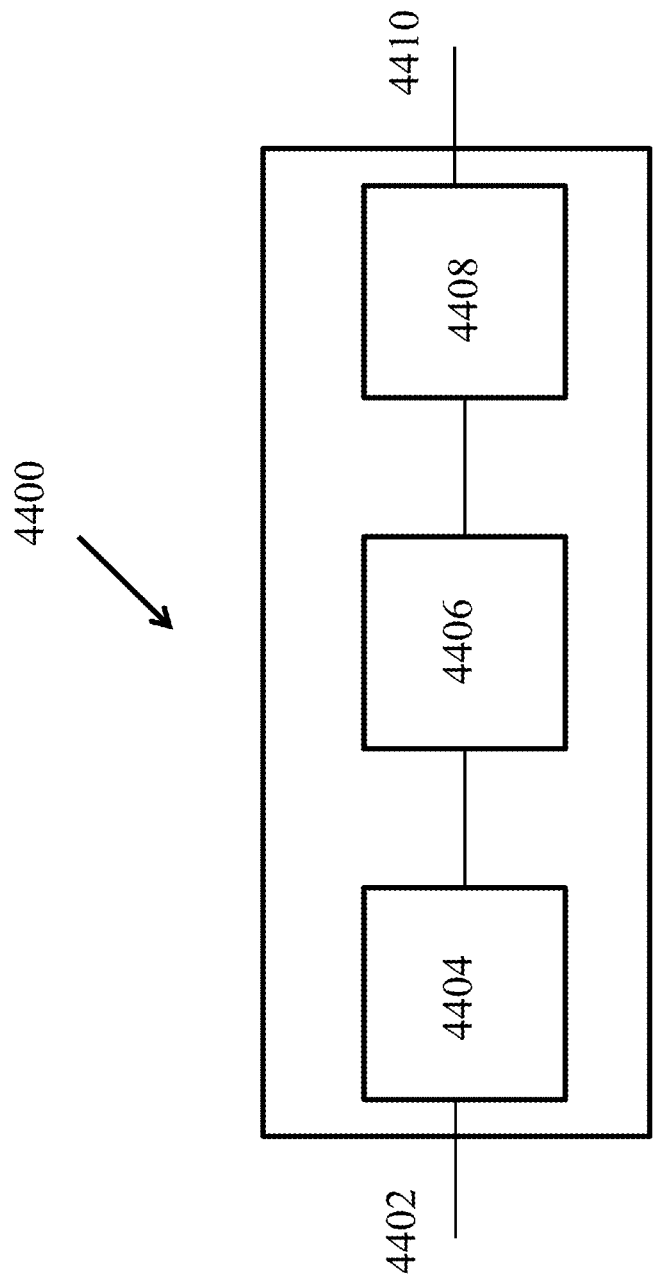
FIG. 44 is a block diagram of an example video processing system in which disclosed techniques may be implemented.

FIG. 44 is a block diagram showing an example video processing system 4400 in which various techniques disclosed herein may be implemented. Various implementations may include some or all of the components of the system 4400. The system 4400 may include input 4402 for receiving video content. The video content may be received in a raw or uncompressed format, e.g., 8 or 10 bit multi-component pixel values, or may be in a compressed or encoded format. The input 4402 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4400 may include a coding component 4404 that may implement the various coding or encoding methods described in the present document. The coding component 4404 may reduce the average bitrate of video from the input 4402 to the output of the coding component 4404 to produce a coded representation of the video. The coding techniques are therefore sometimes called video compression or video transcoding techniques. The output of the coding component 4404 may be either stored, or transmitted via a communication connected, as represented by the component 4406. The stored or communicated bitstream (or coded) representation of the video received at the input 4402 may be used by the component 4408 for generating pixel values or displayable video that is sent to a display interface 4410. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the following technical solutions can be implemented:

A1. A method of video processing, comprising: determining, for a conversion between a current block of video and a bitstream representation of the video, a maximum number of candidates (ML) in a sub-block based merge candidate list and/or whether to add sub-block based temporal motion vector prediction (SbTMVP) candidates to the sub-block based merge candidate list based on whether temporal motion vector prediction (TMVP) is enabled for use during the conversion or whether a current picture referencing (CPR) coding mode is used for the conversion; and performing, based on the determining, the conversion.

A2. The method of solution A1, wherein the use of the SbTMVP candidates is disabled due to a determination that the TMVP tool is disabled or an SbTMVP tool is disabled.

A3. The method of solution A2, wherein determining ML comprises: excluding the SbTMVP candidates from the sub-block based merge candidate list based on whether the SbTMVP tool or the TMVP tool are disabled.

A4. A method of video processing, comprising: determining, for a conversion between a current block of video and a bitstream representation of the video, a maximum number of candidates (ML) in a sub-block based merge candidate list based on whether a temporal motion vector prediction (TMVP), a sub-block based temporal motion vector prediction (SbTMVP), and an affine coding mode are enabled for use during the conversion; and performing, based on the determining, the conversion.

A5. The method of solution A4, wherein ML is set on-the-fly and signaled in the bitstream representation due to a determination that the affine coding mode is enabled.

A6. The method of solution A4, wherein ML is predefined due to a determination that the affine coding mode is disabled.

A7. The method of solution A2 or A6, wherein determining ML comprises: setting ML to zero due to a determination that the TMVP tool is disabled, an SbTMVP tool is enabled and the affine coding mode for the current block is disabled.

A8. The method of solution A2 or A6, wherein determining ML comprises: setting ML to one due to a determination that an SbTMVP tool is enabled, the TMVP tool is enabled and the affine coding mode for the current block is disabled.

A9. The method of solution $A_1$, wherein the use of the SbTMVP candidates is disabled due to a determination that a SbTMVP tool is disabled or a collocated reference picture of a current picture of the current block is the current picture.

A10. The method of solution A9, wherein determining ML comprises: excluding the SbTMVP candidates from the sub-block based merge candidate list based on whether the SbTMVP tool is disabled or the collocated reference picture of the current picture is the current picture.

A11. The method of solution A9, wherein determining ML comprises: setting ML to zero due to a determination that the collocated reference picture of the current picture is the current picture, and affine coding for the current block is disabled.

A12. The method of solution A9, wherein determining ML comprises: setting ML to one due to a determination that the SbTMVP tool is enabled, the collocated reference picture of the current picture is not the current picture, and affine coding for the current block is disabled.

A13. The method of solution A1, wherein the use of the SbTMVP candidates is disabled due to a determination that an SbTMVP tool is disabled or a reference picture with reference picture index 0 in reference picture list 0 (L0) is a current picture of the current block.

A14. The method of solution A13, wherein determining ML comprises: excluding the SbTMVP candidates from the sub-block based merge candidate list based on whether the SbTMVP tool is disabled or the reference picture with reference picture index 0 in L0 is the current picture.

A15. The method of solution A10 or A13 wherein determining ML comprises: setting ML to zero due to a determination that the SbTMVP tool is enabled, the reference picture with reference picture index 0 in L0 is the current picture, and affine coding for the current block is disabled.

A16. The method of solution A13, wherein determining ML comprises: setting ML to one due to a determination that the SbTMVP tool is enabled, the reference picture with reference picture index 0 in L0 is not the current picture, and affine coding for the current block is disabled.

A17. The method of solution A1, wherein the use of the SbTMVP candidates is disabled due to a determination that a SbTMVP tool is disabled or a reference picture with reference picture index 0 in reference picture list 1 (L1) is a current picture of the current block.

A18. The method of solution A17, wherein determining ML comprises: excluding the SbTMVP candidates from the sub-block based merge candidate list based on whether the SbTMVP tool is disabled or the reference picture with reference picture index 0 in L1 is the current picture.

A19. The method of solution A17, wherein determining ML comprises: setting ML to zero due to a determination that the SbTMVP tool is enabled, the reference picture with reference picture index 0 in L1 is the current picture, and affine coding for the current block is disabled.

A20. The method of solution A17, wherein determining ML comprises: setting ML to one due to a determination that the SbTMVP tool is enabled, the reference picture with reference picture index 0 in L1 is not the current picture, and affine coding for the current block is disabled.

A21. A method of video processing, comprising: determining, for a conversion between a current block of a first video segment of a video and a bitstream representation of the video, that a sub-block based motion vector prediction (SbTMVP) mode is disabled for the conversion due to a temporal motion vector prediction (TMVP) mode being disabled at a first video segment level; and performing the conversion based on the determining, wherein the bitstream representation complies with a format that specifies whether an indication of the SbTMVP mode is included and/or a position of the indication of the SbTMVP mode in a merge candidate list, with respect to an indication of the TMVP mode.

A22. The method of solution A21, wherein the first video segment is a sequence, slice, a tile or a picture.

A23. The method of solution A21, wherein the format specifies an omission of the indication of the SbTMVP mode due to an inclusion of the indication of the TMVP mode at the first video segment level.

A24. The method of solution A21, wherein the format specifies that the indication of the SbTMVP mode is at the first video segment level after the indication of the TMVP mode in a decoding order.

A25. The method of any of solutions A21 to A24, wherein the format specifies that the indication of the SbTMVP mode is omitted due to a determination that the TMVP mode is indicated as being disabled.

A26. The method of solution A21, wherein the format specifies that the indication of the SbTMVP mode is included at a sequence level for the video and omitted at a second video segment level.

A27. The method of solution A26, wherein a second video segment at the second video segment level is a slice, a tile or a picture.

A28. The method of any of solutions A1 to A27, the conversion generates the current block from the bitstream representation.

A29. The method of any of solutions A1 to A27, wherein the conversion generates the bitstream representation from the current block.

A30. The method of any of solutions A1 to A27, wherein performing the conversion comprises parsing the bitstream representation based on one or more decoding rules.

A31. An apparatus in a video system comprising a processor and a non-transitory memory with instructions thereon, wherein the instructions upon execution by the processor, cause the processor to implement the method in any one of solutions A1 to A30.

A32. A computer program product stored on a non-transitory computer readable media, the computer program product including program code for carrying out the method in any one of solutions A1 to A30.

In some embodiments, the following technical solutions can be implemented:

B1. A method of video processing, comprising: performing a conversion between a current block of a video that is coded using a sub-block based temporal motion vector prediction (SbTMVP) tool or a temporal motion vector prediction (TMVP) tool and a bitstream representation of the video, wherein a coordinate of a corresponding position of the current block or a sub-block of the current block is selectively masked using a mask based on a compression of motion vectors associated with the SbTMVP tool or the TMVP tool, and wherein an application of the mask comprises computing a bitwise AND operation between a value of the coordinate and a value of the mask.

B2. The method of solution B1, wherein the coordinate is (xN, yN) and the mask (MASK) is an integer equal to ~(2M−1), wherein M is an integer, wherein the application of the mask results in a masked coordinate (xN', yN'), wherein xN'=xN&MASK and yN'=yN&MASK, and wherein "~" is the bitwise NOT operation and "&" is the bitwise AND operation.

B3. The method of solution B2, wherein M=3 or M=4.

B4. The method of solution B2 or B3, wherein a plurality of sub-blocks of size 2K×2K share a same motion information based on the compression of the motion vectors, and wherein K is an integer not equal to M.

B5. The method of solution B4, wherein M=K+1.

B6. The method of solution B1, wherein the mask is not applied upon a determination that the motion vectors associated with the SbTMVP tool or the TMVP tool are not compressed.

B7. The method of any of solutions B1 to B6, wherein the mask for the SbTMVP tool is identical to the mask for the TMVP tool.

B8. The method of any of solutions B1 to B6, wherein the mask for the ATMVP tool is different from the mask for the TMVP tool.

B9. The method of solution B1, wherein a type of the compression is no compression, 8×8 compression or 16×16 compression.

B10. The method of solution B9, wherein the type of the compression is signaled in a video parameter set (VPS), a sequence parameter set (SPS), a picture parameter set (PPS), a slice header or a tile group header.

B11. The method of solution B9 or B10, wherein the type of the compression is based on a standard profile, level or tier corresponding to the current block.

B12. A method of video processing, comprising: determining, based on one or more characteristics of a current block of a video segment of a video, a valid corresponding region of the current block for an application of a sub-block based motion vector prediction (SbTMVP) tool on the current block; and performing, based on the determining, a conversion between the current block and a bitstream representation of the video.

B13. The method of solution B12, wherein the one or more characteristics comprises a height or a width of the current block.

B14. The method of solution B12, wherein the one or more characteristics comprises a type of a compression of motion vectors associated with the current block.

B15. The method of solution B14, wherein the valid corresponding region is a first size due to a determination that the type of the compression comprises no compression, and wherein the valid corresponding region is a second size that is larger than the first size due to a determination that the type of compression comprises K×K compression.

B16. The method of solution B12, wherein a size of the valid corresponding region is based on a basic region with size M×N that is smaller than a size of a coding tree unit (CTU) region, and wherein a size of the current block is W×H.

B17. The method of solution B16, wherein the size of the CTU region is 128×128, and wherein M=64 and N=64.

B18. The method of solution B16, wherein the valid corresponding region is a collocated basic region and an extension in a collocated picture due to a determination that W<M and H<N.

B19. The method of solution B16, wherein the current block is partitioned into several parts upon a determination that W>M and H>N, and wherein each of the several parts comprises an individual valid corresponding region for the application of the SbTMVP tool.

B20. A method of video processing, comprising: determining, for a current block of a video that is coded using a sub-block based temporal motion vector prediction (SbTMVP) tool, a default motion vector; and performing, based on the determining, a conversion between the current block and a bitstream representation of the video, wherein the default motion vector is determined due to a determination that a motion vector is not obtained from a block covering a corresponding position in the collocated picture that is associated with a center position of the current block.

B21. The method of solution B20, wherein the default motion vector is set to (0, 0).

B22. The method of solution B20, wherein the default motion vector is derived from a history-based motion vector prediction (HMVP) table.

B23. The method of solution B22, wherein the default motion vector is set to (0, 0) due to a determination that the HMVP table is empty.

B24. The method of solution B22, wherein the default motion vector is predefined and signaled in a video parameter set (VPS), a sequence parameter set (SPS), a picture parameter set (PPS), a slice header, a tile group header, a coding tree unit (CTU) or a coding unit (CU).

B25. The method of solution B22, wherein the default motion vector is set to a first element stored in the HMVP table due to a determination that the HMVP table is non-empty.

B26. The method of solution B22, wherein the default motion vector is set to a last element stored in the HMVP table due to a determination that the HMVP table is non-empty.

B27. The method of solution B22, wherein the default motion vector is set to a specific motion vector stored in the HMVP table due to a determination that the HMVP table is non-empty.

B28. The method of solution B27, wherein the specific motion vector refers to reference list 0.

B29. The method of solution B27, wherein the specific motion vector refers to reference list 1.

B30. The method of solution B27, wherein the specific motion vector refers to a specific reference picture in reference list 0.

B31. The method of solution B27, wherein the specific motion vector refers to a specific reference picture in reference list 1.

B32. The method of solution B30 or B31, wherein the specific reference picture has index 0.

B33. The method of solution B27, wherein the specific motion vector refers to a collocated picture.

B34. The method of solution B22, wherein the default motion vector is set to a predefined default motion vector due to a determination that a search process in the HMVP table cannot find a specific motion vector.

B35. The method of solution B34, wherein the search process searches only the first element or only the last element of the HMVP table.

B36. The method of solution B34, wherein the search process searches only a subset of elements of the HMVP table.

B37. The method of solution B22, wherein the default motion vector does not refer to a current picture of the current block.

B38. The method of solution B22, wherein the default motion vector is scaled to a collocated picture due to a determination that the default motion vector does not refer to the collocated picture.

B39. The method of solution B20, wherein the default motion vector is derived from a neighboring block.

B40. The method of solution B39, wherein an upper right corner of the neighboring block (A0) is directly adjacent to a lower left corner to the current block, or a lower right corner of the neighboring block (A1) is directly adjacent to the lower left corner to the current block, or a lower left corner of the neighboring block (B0) is directly adjacent to an upper right corner of the current block, or a lower right corner of the neighboring block (B1) is directly adjacent to the upper right corner of the current block, or a lower right corner of the neighboring block (B2) is directly adjacent to an upper left corner of the current block.

B41. The method of solution B40, wherein the default motion vector is derived from only one of neighboring blocks A0, A1, B0, B1 and B2.

B42. The method of solution B40, wherein the default motion vector is derived from one or more of neighboring blocks A0, A1, B0, B1 and B2.

B43. The method of solution B40, wherein the default motion vector is set to a predefined default motion vector due to a determination that a valid default motion vector cannot be found in any of the neighboring blocks A0, A1, B0, B1 and B2.

B44. The method of solution B43, wherein the predefined default motion vector is signaled in a video parameter set (VPS), a sequence parameter set (SPS), a picture parameter set (PPS), a slice header, a tile group header, a coding tree unit (CTU) or a coding unit (CU).

B45. The method of solution B43 or B44, wherein the predefined default motion vector is (0, 0).

B46. The method of solution B39, wherein the default motion vector is set to a specific motion vector from the neighboring block.

B47. The method of solution B46, wherein the specific motion vector refers to reference list 0.

B48. The method of solution B46, wherein the specific motion vector refers to reference list 1.

B49. The method of solution B46, wherein the specific motion vector refers to a specific reference picture in reference list 0.

B50. The method of solution B46, wherein the specific motion vector refers to a specific reference picture in reference list 1.

B51. The method of solution B49 or B50, wherein the specific reference picture has index 0.

B52. The method of solution B46, wherein the specific motion vector refers to a collocated picture.

B53. The method of solution B20, wherein the default motion vector is used due to a determination that the block covering the corresponding position in the collocated picture is intra-coded.

B54. The method of solution B20, wherein the derivation method is modified due to a determination that the block covering the corresponding position in the collocated picture is not located.

B55. The method of solution B20, wherein a default motion vector candidate is always available.

B56. The method of solution B20, wherein the default motion vector is derived in an alternate manner upon a determination that a default motion vector candidate is set to unavailable.

B57. The method of solution B20, wherein an availability of the default motion vector is based on syntax information in the bitstream representation associated with the video segment.

B58. The method of solution B57, wherein the syntax information comprises an indication of enabling the SbTMVP tool, and wherein the video segment is a slice, a tile or a picture.

B59. The method of solution B58, wherein a current picture of the current block is not an intra random access point (IRAP) picture and the current picture is not inserted to a reference picture list 0 (L0) with a reference index 0.

B60. The method of solution B20, wherein a fixed index or a fixed group of indices is assigned to candidates associated with the SbTMVP tool due to a determination that the SbTMVP tool is enabled, and wherein the fixed index or the fixed group of indices is assigned to candidates associated with a coding tool other than the SbTMVP tool due to a determination that the SbTMVP tool is disabled.

B61. A method of video processing, comprising: inferring, for a current block of a video segment of a video, that a sub-block based temporal motion vector prediction (SbTMVP) tool or a temporal motion vector prediction (TMVP) tool is disabled for the video segment due to a determination that a current picture of the current block is a reference picture with an index set to M in a reference picture list X, wherein M and X are integers, and wherein X=0 or X=1; and performing, based on the inferring, a conversion between the current block and a bitstream representation of the video.

B62. The method of solution B61, wherein M corresponds to a target reference picture index that motion information of a temporal block is scaled to for the reference picture list X for the SbTMVP tool or the TMVP tool.

B63. The method of solution B61, wherein the current picture is an intra random access point (IRAP) picture.

B64. A method of video processing, comprising: determining, for a current block of a video, that an application of an sub-block based temporal motion vector prediction (SbTMVP) tool is enabled due to a determination that a current picture of the current block is a reference picture with an index set to M in a reference picture list X, wherein M and X are integers; and performing, based on the determining, a conversion between the current block and a bitstream representation of the video.

B65. The method of solution B64, wherein motion information corresponding to each sub-block of the current block refers to the current picture.

B66. The method of solution B64, wherein motion information for a sub-block of the current block is derived from a temporal block, and wherein the temporal block is coded with at least one reference picture that refers to a current picture of the temporal block.

B67. The method of solution B66, wherein the conversion excludes a scaling operation.

B68. A method of video processing, comprising: performing a conversion between a current block of a video and a bitstream representation of the video, wherein the current block is coded using a sub-block based coding tool, and wherein performing the conversion comprises using a plurality of bins (N) to code a sub-block merge index with a unified method due to a determination that a sub-block based temporal motion vector prediction (SbTMVP) tool is enabled or disabled.

B69. The method of solution B68, wherein a first number of bins (L) of the plurality of bins are context coded, and wherein a second number of bins (N-L) are bypass coded.

B70. The method of solution B69, wherein L=1.

B71. The method of solution B68, wherein each of the plurality of bins is context coded.

B72. The method of any of solutions B1 to B71, the conversion generates the current block from the bitstream representation.

B73. The method of any of solutions B1 to B71, wherein the conversion generates the bitstream representation from the current block.

B74. The method of any of solutions B1 to B71, wherein performing the conversion comprises parsing the bitstream representation based on one or more decoding rules.

B75. An apparatus in a video system comprising a processor and a non-transitory memory with instructions thereon, wherein the instructions upon execution by the processor, cause the processor to implement the method in any one of solutions B1 to B74.

B76. A computer program product stored on a non-transitory computer readable media, the computer program product including program code for carrying out the method in any one of solutions B1 to B74.

In some embodiments, the following technical solutions can be implemented:

C1. A method of video processing, comprising: determining, for a current block of a video coded using a subblock-based temporal motion vector prediction (SbTMVP) tool, a motion vector used by the SbTMVP tool to locate a corresponding block in a picture different from a current picture comprising the current block; and performing, based on the determining, a conversion between the current block and a bitstream representation of the video.

C2. The method of solution C1, wherein the motion vector is set to a default motion vector.

C3. The method of solution C2, wherein the default motion vector is (0, 0).

C4. The method of solution C2, wherein the default motion vector is signaled in a video parameter set (VPS), a sequence parameter set (SPS), a picture parameter set (PPS), a slice header, a tile group header, a coding tree unit (CTU) or a coding unit (CU).

C5. The method of solution C1, wherein motion vector is set to a motion vector stored in a history-based motion vector prediction (HMVP) table.

C6. The method of solution C5, wherein the motion vector is set to a default motion vector due to a determination that the HMVP table is empty.

C7. The method of solution C6, wherein the default motion vector is (0, 0).

C8. The method of solution C5, wherein the motion vector is set to a first motion vector stored in the HMVP table due to a determination that the HMVP table is non-empty.

C9. The method of solution C5, wherein the motion vector is set to a last motion vector stored in the HMVP table due to a determination that the HMVP table is non-empty.

C10. The method of solution C5, wherein the motion vector is set to a specific motion vector stored in the HMVP table due to a determination that the HMVP table is non-empty.

C11. The method of solution C10, wherein the specific motion vector refers to reference list 0.

C12. The method of solution C10, wherein the specific motion vector refers to reference list 1.

C13. The method of solution C10, wherein the specific motion vector refers to a specific reference picture in reference list 0.

C14. The method of solution C10, wherein the specific motion vector refers to a specific reference picture in reference list 1.

C15. The method of solution C13 or 14, wherein the specific reference picture has index 0.

C16. The method of solution C10, wherein the specific motion vector refers to a collocated picture.

C17. The method of solution C5, wherein the motion vector is set to a default motion vector due to a determination that a search process in the HMVP table cannot find a specific motion vector.

C18. The method of solution C17, wherein the search process searches only the first element or only the last element of the HMVP table.

C19. The method of solution C17, wherein the search process searches only a subset of elements of the HMVP table.

C20. The method of solution C5, wherein the motion vector stored in the HMVP table does not refer to the current picture.

C21. The method of solution C5, wherein the motion vector stored in the HMVP table is scaled to a collocated picture due to a determination that the motion vector stored in the HMVP table does not refer to the collocated picture.

C22. The method of solution C1, wherein the motion vector is set to a specific motion vector of a specific neighboring block.

C23. The method of solution C22, wherein an upper right corner of the specific neighboring block (A0) is directly adjacent to a lower left corner to the current block, or a lower right corner of the specific neighboring block (A1) is directly adjacent to the lower left corner to the current block, or a lower left corner of the specific neighboring block (B0) is directly adjacent to an upper right corner of the current block, or a lower right corner of the specific neighboring block (B1) is directly adjacent to the upper right corner of the current block, or a lower right corner of the specific neighboring block (B2) is directly adjacent to an upper left corner of the current block.

C24. The method of solution C1, wherein the motion vector is set to a default motion vector due to a determination that a specific neighboring block does not exist.

C25. The method of solution C1, wherein the motion vector is set to a default motion vector due to a determination that a specific neighboring block is not inter-coded.

C26. The method of solution C22, wherein the specific motion vector refers to reference list 0.

C27. The method of solution C22, wherein the specific motion vector refers to reference list 1.

C28. The method of solution C22, wherein the specific motion vector refers to a specific reference picture in reference list 0.

C29. The method of solution C22, wherein the specific motion vector refers to a specific reference picture in reference list 1.

C30. The method of solution C28 or C29, wherein the specific reference picture has index 0.

C31. The method of solution C22 or C23, wherein the specific motion vector refers to a collocated picture.

C32. The method of solution C22 or C23, wherein the motion vector is set to a default motion vector due to a determination that the specific neighboring block does not refer to the collocated picture.

C33. The method of any of solutions C24 to C32, wherein the default motion vector is (0, 0).

C34. The method of solution C1, wherein the motion vector is set to a default motion vector due to a determination that a specific motion vector stored in a specific neighboring block cannot be found.

C35. The method of solution C22, wherein the specific motion vector is scaled to a collocated picture due to a determination that the specific motion vector not refer to the collocated picture.

C36. The method of solution C22, wherein the specific motion vector does not refer to the current picture.

C37. The method of any of solutions C1 to C36, the conversion generates the current block from the bitstream representation.

C38. The method of any of solutions C1 to C36, wherein the conversion generates the bitstream representation from the current block.

C39. The method of any of solutions C1 to C36, wherein performing the conversion comprises parsing the bitstream representation based on one or more decoding rules.

C40. An apparatus in a video system comprising a processor and a non-transitory memory with instructions thereon, wherein the instructions upon execution by the processor, cause the processor to implement the method in any one of solutions C1 to C39.

C41. A computer program product stored on a non-transitory computer readable media, the computer program product including program code for carrying out the method in any one of solutions C1 to C39.

In some embodiments, the following technical solutions can be implemented:

D1. A method of video processing, comprising: determining, for a conversion between a current block of a video and a bitstream representation of the video, whether a zero motion affine merge candidate is inserted into a sub-block merge candidate list based on whether affine prediction is enabled for the conversion of the current block; and performing, based on the determining, the conversion.

D2. The method of solution D1, wherein the zero motion affine merge candidate is not inserted into the sub-block merge candidate list due to a determination that an affine usage flag in the bitstream representation is off.

D3. The method of solution D2, further comprising: inserting default motion vector candidates that are non-affine candidates into the sub-block merge candidate list due to a determination that the affine usage flag is off.

D4. A method of video processing, comprising: inserting, for a conversion between a current block of a video and a bitstream representation of the video that uses a sub-block merge candidate list, zero motion non-affine padding candidates into the sub-block merge candidate list due to a determination that the sub-block merge candidate list is not fulfilled; and performing, subsequent to the inserting, the conversion.

D5. The method of solution D4, further comprising: setting an affine usage flag of the current block to zero.

D6. The method of solution D4, wherein the inserting is further based on whether an affine usage flag in the bitstream representation is off.

D7. A method of video processing, comprising: determining, for a conversion between a current block of a video and a bitstream representation of the video, motion vectors using a rule that determines that the motion vectors are derived from one or more motion vectors of a block covering a corresponding position in a collocated picture; and performing, based on the motion vectors, the conversion.

D8. The method of solution D7, wherein the one or more motion vectors comprise MV0 and MV1 that represent motion vectors in reference list 0 and reference list 1, respectively, and wherein the motion vectors to be derived comprise MV0' and MV1' that that represent motion vectors in the reference list 0 and the reference list 1.

D9. The method of solution D8, wherein MV0' and MV1' are derived based on MV0 due to a determination that a collocated picture is in the reference list 0.

D10. The method of solution D8, wherein MV0' and MV1' are derived based on MV1 due to a determination that a collocated picture is in the reference list 1.

D11. The method of any of solutions D1 to D10, the conversion generates the current block from the bitstream representation.

D12. The method of any of solutions D1 to D10, wherein the conversion generates the bitstream representation from the current block.

D13. The method of any of solutions D1 to D10, wherein performing the conversion comprises parsing the bitstream representation based on one or more decoding rules.

D14. An apparatus in a video system comprising a processor and a non-transitory memory with instructions thereon, wherein the instructions upon execution by the processor, cause the processor to implement the method in any one of solutions D1 to D13.

D15. A computer program product stored on a non-transitory computer readable media, the computer program product including program code for carrying out the method in any one of solutions D1 to D13.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of video processing, comprising:
   inserting, for a conversion between a current block of a video and a bitstream of the video that uses a sub-block merge candidate list, a non-affine merge padding candidate or an affine merge padding candidate into the sub-block merge candidate list when the sub-block merge candidate list is not filled, wherein whether to insert the non-affine merge padding candidate or the affine merge padding candidate is based on whether an affine usage flag in the bitstream is on or off, and wherein the affine usage flag is used to indicate whether an affine mode is enabled and to determine which one of the non-affine merge padding candidate or the affine merge padding candidate is inserted into the sub-block merge candidate list; and
   performing, subsequent to the inserting, the conversion,
   wherein the non-affine merge padding candidate is a default non-affine merge padding candidate, or the affine merge padding candidate is a default affine merge padding candidate,
   wherein the non-affine merge padding candidate is a zero non-affine candidate, or the affine merge padding candidate is a zero affine candidate, and
   wherein, when the affine usage flag is off, the affine merge padding candidate is not inserted into the sub-block merge candidate list or the non-affine merge padding candidate is inserted into the sub-block merge candidate list.

2. The method of claim 1, further comprising:
   determining motion vectors using a rule that determines that the motion vectors are derived from one or more motion vectors of a block covering a corresponding position in a collocated picture.

3. The method of claim 2, wherein the one or more motion vectors comprise MV0 and MV1 that represent motion vectors in reference list 0 and reference list 1, respectively, and wherein the motion vectors to be derived comprise MV0' and MV1' that represent motion vectors in the reference list 0 and the reference list 1, respectively.

4. The method of claim 3, wherein MV0' and MV1' are derived based on MV0 in case that the collocated picture is in the reference list 0.

5. The method of claim 3, wherein MV0' and MV1' are derived based on MV1 in case that the collocated picture is in the reference list 1.

6. The method of claim 1, wherein the conversion decodes the current block from the bitstream.

7. The method of claim 1, wherein the conversion encodes the current block into the bitstream.

8. The method of claim 1, wherein performing the conversion comprises parsing the bitstream based on one or more decoding rules.

9. A video processing apparatus comprising a processor and a non-transitory memory with instructions thereon, wherein the instructions upon execution by the processor, cause the processor to:
   insert, for a conversion between a current block of a video and a bitstream of the video that uses a sub-block merge candidate list, a non-affine merge padding candidate or an affine merge padding candidate into the sub-block merge candidate list when the sub-block merge candidate list is not filled, wherein whether to insert the non-affine merge padding candidate or the affine merge padding candidate is based on whether an affine usage flag in the bitstream is on or off, and wherein the affine usage flag is used to indicate whether an affine mode is enabled and to determine which one of the non-affine merge padding candidate or the affine merge padding candidate is inserted into the sub-block merge candidate list; and
   perform, subsequent to the inserting, the conversion,
   wherein the non-affine merge padding candidate is a default non-affine merge padding candidate, or the affine merge padding candidate is a default affine merge padding candidate, wherein the non-affine merge padding candidate is a zero non-affine candidate, or the affine merge padding candidate is a zero affine candidate, and wherein, when the affine usage flag is off, the affine merge padding candidate is not inserted into the sub-block merge candidate list or the non-affine merge padding candidate is inserted into the sub-block merge candidate list.

10. The video processing apparatus of claim 9, wherein the instructions upon execution by the processor, cause the processor to:

determine motion vectors using a rule that determines that the motion vectors are derived from one or more motion vectors of a block covering a corresponding position in a collocated picture.

11. A non-transitory computer-readable recording medium storing a bitstream of a video which is generated by a method performed by a video processing apparatus, wherein the method comprises:

inserting a non-affine merge padding candidate or an affine merge padding candidate into a sub-block merge candidate list when the sub-block merge candidate list is not filled, wherein whether to insert the non-affine merge padding candidate or the affine merge padding candidate is based on whether an affine usage flag in the bitstream is on or off, and wherein the affine usage flag is used to indicate whether an affine mode is enabled and to determine which one of the non-affine merge padding candidate or the affine merge padding candidate is inserted into the sub-block merge candidate list; and generating the bitstream based on the inserting, wherein the non-affine merge padding candidate is a default non-affine merge padding candidate, or the affine merge padding candidate is a default affine merge padding candidate, wherein the non-affine merge padding candidate is a zero non-affine candidate, or the affine merge padding candidate is a zero affine candidate, and wherein, when the affine usage flag is off, the affine merge padding candidate is not inserted into the sub-block merge candidate list or the non-affine merge padding candidate is inserted into the sub-block merge candidate list.

12. The method of claim 1, wherein the non-affine merge padding candidate is not inserted into the sub-block merge candidate list in case that the affine usage flag in the bitstream is on.

13. The method of claim 1, wherein the affine merge padding candidate is inserted into the sub-block merge candidate list in case that the affine usage flag is on.

* * * * *